US011334036B2

(12) United States Patent
Yang et al.

(10) Patent No.: US 11,334,036 B2
(45) Date of Patent: May 17, 2022

(54) POWER GRID AWARE MACHINE LEARNING DEVICE

(71) Applicant: Microsoft Technology Licensing, LLC, Redmond, WA (US)

(72) Inventors: Weiwei Yang, Seattle, WA (US); Christopher Miles White, Seattle, WA (US); Kateryna Lytvynets, Redmond, WA (US); Darren Keith Edge, Cambridge (GB); Amber D. Hoak, Poulsbo, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 25 days.

(21) Appl. No.: 16/814,596

(22) Filed: Mar. 10, 2020

(65) Prior Publication Data

US 2021/0003974 A1 Jan. 7, 2021

Related U.S. Application Data

(63) Continuation-in-part of application No. 16/460,344, filed on Jul. 2, 2019, now Pat. No. 11,036,250.

(51) Int. Cl.
*G05B 13/02* (2006.01)
*G05B 13/04* (2006.01)
(Continued)

(52) U.S. Cl.
CPC ......... *G05B 13/027* (2013.01); *G05B 13/048* (2013.01); *G06N 3/0445* (2013.01); *G06N 3/08* (2013.01)

(58) Field of Classification Search
CPC .. G05B 13/027; G05B 13/048; G06N 3/0445; G06N 3/08; G06N 3/006; G06N 3/0454;
(Continued)

(56) References Cited

U.S. PATENT DOCUMENTS

| 2012/0245753 A1 | 9/2012 | Forbes, Jr. | |
| 2014/0018969 A1* | 1/2014 | Forbes, Jr. | H02J 3/32 700/295 |

(Continued)

FOREIGN PATENT DOCUMENTS

| EP | 3316209 A1 | 5/2018 |
| WO | 2019075186 A1 | 4/2019 |

OTHER PUBLICATIONS

Habiballah, et al., "Battery Management System: An Overview of Its Application in the Smart Grid and Electric Vehicles", In Journal of IEEE Industrial Electronics Magazine vol. 7, Issue 2, Jun. 1, 2013, 13 Pages.

(Continued)

*Primary Examiner* — Ziaul Karim
(74) *Attorney, Agent, or Firm* — Schwegman Lundberg & Woessner, P.A.

(57) ABSTRACT

A system and method for managing operation of electrical devices includes a control module that monitors status of multiple sources of electrical power to one or more electrical devices and electrical usage of the one or more electrical devices that receive electricity from the source of electrical power. The operation of the one or more electrical devices is managed using a machine learning model that forecasts status of the at least one source of electrical power and generates operational rules for the one or more electrical devices from historical values of control parameters of the one or more electrical devices, the status of the source of electrical power, and the electrical usage of the one or more electrical devices. The system may optimize renewable energy utilization, power grid stabilization, cost of electrical power usage, and the like.

20 Claims, 33 Drawing Sheets

(51) Int. Cl.
*G06N 3/04* (2006.01)
*G06N 3/08* (2006.01)

(58) Field of Classification Search
CPC ......... G06N 3/088; Y02E 40/70; Y02E 60/00; Y02E 70/30; Y04S 10/50; Y04S 40/20; Y04S 50/10; G06Q 50/06; H02J 3/008; H02J 3/32; H02J 3/004; H02J 2203/20
See application file for complete search history.

(56) References Cited

U.S. PATENT DOCUMENTS

| | | |
|---|---|---|
| 2014/0052308 A1 | 2/2014 | Hanafusa |
| 2014/0277788 A1* | 9/2014 | Forbes, Jr. ............. G06Q 50/06 700/286 |
| 2015/0127425 A1 | 5/2015 | Greene et al. |
| 2016/0370819 A1 | 12/2016 | Forbes, Jr. |
| 2016/0377306 A1* | 12/2016 | Drees ..................... H02J 15/00 700/295 |
| 2017/0102433 A1 | 4/2017 | Wenzel et al. |
| 2017/0170684 A1 | 6/2017 | Matthey |
| 2018/0191161 A1 | 7/2018 | An et al. |
| 2018/0284735 A1* | 10/2018 | Cella ................... G05B 23/0221 |
| 2020/0112170 A1 | 4/2020 | Wang et al. |

OTHER PUBLICATIONS

"International Search Report and Written Opinion Issued in PCT Application No. PCT/US20/033896", dated Aug. 6, 2020, 8 Pages.
"Aurecon Hornsdale Power Reserve Impact Study 2018", Retrieved from: https://www.scribd.com/document/395050069/Aurecon-Hornsdale-Power-Reserve-Impact-Study-2018, Retrieved Date: May 12, 2019, 33 Pages.
"Non Final Office Action Issued in U.S. Appl. No. 16/460,344", dated Aug. 26, 2020, 12 Pages.
"Notice of Allowance Issued in U.S. Appl. No. 16/460,344", dated Feb. 24, 2021, 11 Pages.
"International Search Report and Written Opinion Issued in PCT Application No. PCT/US20/033887", dated Sep. 17, 2020, 11 Pages.

* cited by examiner

POWER GRID AWARE MACHINE LEARNING DEVICE

CROSS-REFERENCE TO RELATED APPLICATIONS

The present patent application is a continuation-in-part patent application of U.S. patent application Ser. No. 16/460,344, filed Jul. 2, 2019, entitled "Datacenter Stabilization of Regional Power Grids." The contents of that patent application are hereby incorporated by reference.

BACKGROUND

All energy markets have frequency regulation services to correct short term discrepancies between the amount of power available and the load on power distribution systems to ensure constant power frequency and thus the stability of the power grid. Generally, fluctuations in the amount of power generated and in the load can adversely affect the frequency of the power grid. The demand for frequency regulation will increase as power systems use more renewable energy sources such as solar and wind. As it is impossible to predict instantaneous weather conditions, it is also impossible to control second-to-second power generation from these sources. Current participants in the regulation market are either carbon-based power plants that are taken offline and used to supply regulation services only or dedicated battery storage facilities, such as the Homsdale Power Reserve, built with this function in mind. These facilities represent a significant hidden cost to adapting renewable energy sources to the power grid.

SUMMARY

Various details for the embodiments of the inventive subject matter are provided in the accompanying drawings and in the detailed description text below.

Techniques described herein use components of datacenters, such as backup batteries, cooling systems, compute load balancing, throttling, scheduling systems, and backup power generators using diesel, natural gas or other means to participate in a frequency regulation energy market. In sample embodiments, Machine Learning (ML), in the form of LSTM (long short-term memory) based prediction models, is used to forecast the stability of the region's power grid and to optimally orchestrate operations of the datacenter components in a manner designed to stabilize the region's power grid. For example, the datacenter may change the temperature of the cooling system, charge and discharge the backup batteries, balance and schedule computing loads, etc. based on the calculated prediction models. The result is an online control system that dynamically matches the power-usage profile of the datacenter against regulation signals, thereby enabling the datacenter to participate in the frequency regulation market without requiring any additional hardware or datacenter facilities.

Further techniques described herein expand such an approach beyond data centers by providing a device with ML capability that can be attached, installed, or retrofitted into electronic appliances, electric cars and chargers, solar, wind and other renewable sources, lighting, cooling, air ventilation elements in building and homes, battery and mechanical based energy stores, and the like. In sample embodiments, the ML capable device comprises a control module for managing operation of one or more associated electrical devices. The control module includes a first input that receives status data including control parameters relating to performance of the one or more associated electrical devices in relation to user-defined rules, a second input that receives optimization settings and the user-defined rules for optimizing power generation, power usage, and power storage of the one or more associated electrical devices based on user-defined priorities, and a processor. The processor executes instructions to manage power generation, power usage, and/or power storage by the one or more associated electrical devices using a machine learning model that generates operational rules for the one or more electrical devices from historical values of the control parameters and the optimization settings to optimize power generation, power usage, and/or power storage by the one or more associated electrical devices according to the user-defined rules. The processor may further execute the instructions to select the control parameters to optimize renewable energy utilization, power grid stabilization, smoothing out of transient irregularities in the source(s) of electrical power, cost of electrical power usage by the one or more associated electrical devices, and/or a user-specified optimization goal.

In sample embodiments, the processor executes the instructions based on a predictive machine learning model that forecasts status of at least one source of electrical power, predicts demands by the one or more associated electrical devices for the electrical power, and predicts availability of the electrical power at the times the electrical power is demanded by the one or more associated electrical devices. The predictive machine learning model may include a long short-term memory machine learning based prediction model that forecasts demand on the source(s) of electrical power by the one or more associated electrical devices from historical data. The processor may further execute the instructions to transfer learned rules from the predictive machine learning model to a newly connected electrical device.

In other sample embodiments, the processor further executes the instructions to communicate status data of the source(s) of electrical power and the one or more associated electrical devices to another control module and/or a cloud server. The processor further monitors power usage by passively monitoring status of a neighboring electrical device, a household electrical circuit, a neighborhood substation, and/or a power grid. The processor also may execute the instructions to schedule electrical charge and/or discharge functions and energy storage functions of the one or more associated electrical devices based on the status of the source(s) of electrical power, the electrical usage of the one or more associated electrical devices, and/or operational rules.

In further sample embodiments, the processor executes the instructions to use reinforcement learning, transfer learning, and/or online machine learning methods to update operational rules established using the control parameters over time based on changes in the status data of the source(s) of electrical power and electrical usage data of the one or more associated electrical devices over time.

In still further sample embodiments, the processor further executes the instructions to notify an electrical grid operator of detection of an anomaly in the electrical grid upon detection of a faulty transmission line, a faulty transformer, and a faulty substation or an anomaly in status data of the source(s) of electrical power.

In accordance with further aspects, a method of managing operation of electrical devices is provided that includes the steps of monitoring status of sources of electrical power to one or more electrical devices; monitoring electrical usage at each of the one or more electrical devices that receive electricity from the source(s) of electrical power; receiving control parameters for optimization of operation of each of the one or more electrical devices; and managing electrical power usage by each of the one or more electrical devices using a machine learning model that forecasts status of the source(s) of electrical power and generates operational rules for each of the one or more electrical devices from historical values of the control parameters, the status of the source(s) of electrical power, and the electrical usage of each of the one or more electrical devices. In sample embodiments, managing the electrical power usage includes selecting the control parameters to optimize renewable energy utilization, power grid stabilization, smoothing out of transient irregularities in the source(s) of electrical power, cost of electrical power usage by the one or more electrical devices, and/or and a user-specified optimization goal.

In sample embodiments, managing electrical power usage comprises generating instructions based on a predictive machine learning model to manage the source(s) of electrical power and the electrical devices, the predictive machine learning model forecasting status of the source(s) of electrical power, predicting demands by the one or more electrical devices for the electrical power, and predicting availability of the electrical power at the times the electrical power is demanded by the one or more electrical devices. The predictive machine learning model may comprise a long short-term memory machine learning based prediction model that forecasts demand on the source(s) of electrical power by the one or more electrical devices from historical data.

In other sample embodiments, the method further includes transferring learned rules from the predictive machine learning model to a newly connected electrical device.

In yet other sample embodiments, the method further includes communicating status data of the source(s) of electrical power and/or electrical usage data of one electrical device to another electrical device and/or a cloud server.

In still other sample embodiments, monitoring the electrical usage includes passively monitoring a status of at least one of a neighboring electrical device, a household electrical circuit, a neighborhood, a substation, and a power grid.

In further sample embodiments, the method includes scheduling electrical charge and/or discharge functions and energy storage functions of the one or more electrical devices based on the status of the source(s) of electrical power, the electrical usage of the one or more electrical devices, and/or the operational rules.

In still further sample embodiments, the method includes using reinforcement learning, transfer learning, and/or online machine learning methods to update operational rules established using the control parameters over time based on changes in the status data of the source(s) of electrical power and electrical usage data of the one or more electrical devices over time.

In additional sample embodiments, the method includes notifying an electrical grid operator of detection of an anomaly in the electrical grid upon detection of faulty transmission lines, transformers, substations, etc., or an anomaly in status data of the source(s) of electrical power.

As discussed herein, the logic, commands, or instructions that implement aspects of the methods described herein may be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter. Rather, it will be understood that the following section provides summarized examples of some of the embodiments described in the Detailed Description below.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 10 illustrates a sample dashboard display for monitoring operation of the frequency regulation energy market in a sample embodiment where

DETAILED DESCRIPTION

Figure 1:
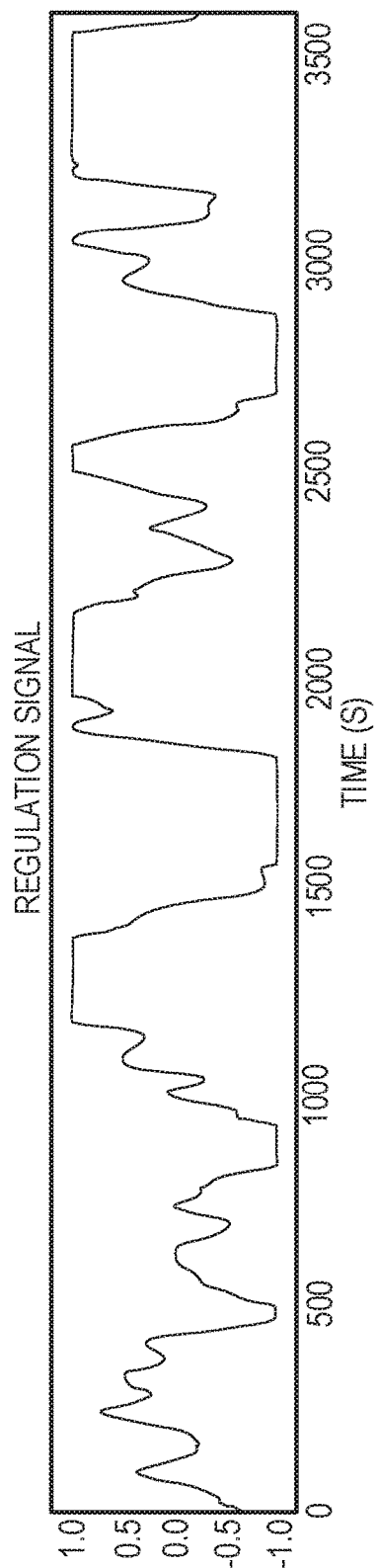
FIG. 1 is a graph of a sample regulation signal for the power grid, which updates every 2 seconds and is highly variable (though designed to have a 0 mean every 15 minutes).

The following description with respect to FIGS. 1-34 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims. The example embodiments are presented for illustrative purposes only and are not intended to be restrictive or limiting on the scope of the disclosure or the claims presented herein.

The functions described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

Data Center Embodiment

Overview

The present inventors have recognized that datacenter components such as backup batteries, cooling systems, compute load balancing, throttling, scheduling systems, and backup power generators may be used to stabilize the energy grid, without providing additional hardware or building a new site, so long as the participation is managed to minimize component degradation and to perform user specified optimizations such as grid stabilization, renewable usage, etc. Machine learning (ML) in the form of a LSTM (long short-term memory) prediction model forecasts demands and dispatches datacenter operations and services to achieve the same results as having dedicated facilities for the regulation market, without disrupting regular datacenter operations and customer service level agreements (SLAs). An immediate payout from the energy regulation market could partially or even entirely offset the electricity and/or UPS battery operating costs of the datacenter. Also, and more importantly, the system described herein will provide stability to the power grid in any region where implemented and will allow that region to use more renewable energy and bring down overall energy costs over time. Techniques are also desired that will use the power of machine learning techniques to provide optimal energy distribution and usage of conventional and renewable energy resources by a household, a neighborhood, and a region.

A multi-panel dashboard provides a holistic view of the system and allows operators to monitor the accuracy of the forecaster and online control dispatcher as well as the overall health of the regulation system. In sample embodiments, such a dashboard incorporates a forecaster, live market data, passive grid data, as well by monitoring grid status for example via frequency cycle counting, and internal component status to forecast participation efficacy and to support the decision to participate in the ancillary energy market. In the European Union, the frequency markets do not have a live signal, it is all done via passive monitoring. In a participation period where there is a live frequency regulation signal, the live frequency regulation signal and a control response to the frequency regulation signal is displayed. Post-participation results of payout benefits and predicted wear-and-tear degradation costs to the participation components are displayed in both aggregate and for the preceding participation period.

In the sample embodiments described herein, datacenters are used to stabilize the power grid in a region. It will be appreciated that the techniques described herein may also be used in other power producing environments such as dedicated battery storage facilities, renewable energy facilities, public buildings, and households. In the sample embodiments described herein, components commonly found in datacenters, such as backup batteries, cooling systems, natural gas/diesel generators, compute load balancing and throttling systems are used to smooth short-term discrepancies between an area's power generation and system load and to reduce frequency irregularities and peak energy consumption without impacting regular datacenter operations. In a particular sample embodiment, backup batteries are used to participate in the frequency regulation market under the appropriate circumstances.

A machine learning (ML)-based system forecasts energy market stability and uses forecast results to dispatch datacenter operations to maximize energy market stability, without affecting the datacenter operations. The ML-based system may, for example, predict when it would be profitable and effective to participate in the frequency regulation market using backup batteries. In such circumstances, the ML-based system provides online control of the datacenter backup batteries and perhaps other datacenter hardware or software components to respond to high-frequency high-variation regulation signals to ensure optimal signal tracking and to minimize battery degradation.

Battery Regulation System

In the United States, a frequency regulation market exists in 7 of the 10 energy wholesale markets and in all 7 of the energy wholesale markets operated by ISO (independent system operators) or RTO (regional transmission organizations). Rules of participation might differ, but the idea behind each frequency regulation market is the same—to stabilize the power grid. Without it, the utility or (power) line 50 Hz (in Europe) or 60 Hz frequency would get out of control for a region, equipment connected to the grid could get destroyed, and unexpected blackouts would occur. This issue is getting worse, and people are more at risk to such events as renewable energy sources, such as solar and wind, get more prevalent. Since no one can predict weather down to the second, there is no guarantee of constant energy production.

Current participants in the energy regulation market use hardware and facilities dedicated for that purpose. For example, Tesla opened a 100-MW capability battery storage (Hornsdale Power Reserve) in South Australia built in 2017 and, within a few months of operation, it had completely stabilized the local energy grid and reduced peak energy cost by up to 90%.

In some regulation markets, like PJM, the operator outputs an automated regulation signal (e.g., Regulation D or Regulation A signals) of the type illustrated in graph form in FIG. 1 showing the value of a regulation signal versus time for the Pennsylvania Jersey Maryland (PJM) market. It will be appreciated that the rules explained herein are specific to the PJM market but that similar rules would apply in other energy regulation markets. The regulation signal updates every 2 seconds and is highly variable (though designed to have a 0 mean every 15 minutes). The signal varies between −1 and +1. −1 means there is excess energy in the grid, and suppliers need to withdraw energy to stabilize the power grid. +1 means there is shortage in the system and suppliers need to throttle their energy usage to stabilize the power grid. The suppliers bid their regulation capabilities 1 day ahead of time, and 1-hour prior to opt in or out of participation. Then, during the participation period, suppliers are rated based on how accurately they can follow the frequency regulation signal (e.g., rated on accuracy, delay, and precision of response). Suppliers with a performance score less than 25% would not get paid for the participation period, and with an accumulated performance score less than 40% would be dropped from the program.

Compensation to the suppliers depends on the suppliers' ability to follow the automated frequency regulation control signal. The payout for participating in the PJM market, for example, is based on several factors, such as capability clearing prices, performance clearing prices, and mileage ratio (where mileage is the absolute sum of movement of the regulation signal in a given time period and the mileage ratio measures the relative movement requested from regulating resources following different signals). Such data is unpredictable, and there is generally no clear pattern in the data. For example, the capability clearing price has the highest variability and, according to 2018 PJM regulation market data, may vary from a single dollar all the way to 1400 or more per hour. The performance clearing price has less variability but no clear pattern. Also, the clearing prices are unknown to the suppliers prior to the participation period, and the payouts are settled after the participation periods. So, with the high variability of the clearing prices, there is a high variability in payouts as well.

Datacenters provide a significant percentage of worldwide energy consumption, currently projected at 1% and expected to grow dramatically over the next decade. Moreover, the datacenter components, such as the batteries in uninterruptible power supplies (UPS), are expensive and rarely used. For example, if 3 minutes of backup batteries must be available before power generators can kick in in case of a power outage, these batteries need to have 3 minutes of capacity at end of life, which means that when they are new, they could be capable of supplying up to 5 minutes of power. Those extra minutes are considered underutilized. Because batteries naturally degrade even when unused, in this case, the unused cycles are wasted opportunities. Datacenter energy usage and equipment costs thus represent a significant expense to the datacenter operator.

Using ML to forecast the efficacy of participation prior to entering into a regulation period, and avoiding participation during periods deemed unfavorable, will safeguard datacenter equipment from unnecessary wear-and-tear and maximize long-term effectiveness. Current regulation market sellers bid to participate with little or no regards to the large variation in regulation demands and payouts for participation. Blindly participating causes premature degradation of equipment and increases the capital cost of participation. The ML forecaster described herein is trained using market-specific historical data and datacenter-specific operational cost data and is adaptable to all markets and participation components. Anyone who participates in the regulation market, whether using datacenter components or dedicated site and hardware, may use the forecasting system to maximize performance.

A key input into the system is the frequency regulation signal posted by the energy grid operator. In the areas where there is no such signal, the signal may be derived by monitoring the grid status and frequency cycles. The frequency regulation signal quickly varies. For example, the PJM signal changes every two seconds. For passive monitoring, sub-second changes can be detected. Due to the nature of the energy grid, with loads being constantly added and/or shed, and energy added and consumed at unpredictable times, it is impossible to predict the future frequency regulation signal and thus it is impossible to optimize a response to ensure best tracking while staying within the safe operational limits for participation components. Greedily following the regulation signal until hitting system limits reduces efficacy. Accordingly, the inventors have trained an ML-based online control system from the historical regulation signal and its offline-solved optimal control response to develop an ML-based online control system that dispatches component control signals to manage energy usage of the components based on the current regulation signal and the status of the system. It outperforms greedy control and can be continually trained online to adapt to future changes in regulation signal shifts. By contrast, rule-based heuristics would need to rely on humans to explicitly hand craft rules which would neither scale nor capture changes in regulation signal characteristics.

In sample embodiments, the ML-based online control system is modeled as a constrained optimization that maximizes the payout while following the regulation signal and minimizing the cost of battery degradation. The state of charge of the battery is updated based on a linear differential equation, where the next state is based on the previous state plus current charge/discharge, while constraining the rate of charge/discharge between 0 and the maximum battery power, and the state of charge between the min/max allowed state of charge. The min/max allowed state of charge is set by the user with battery performance and lifetime considered, usually based on battery specifications or lab testing data published by battery manufacturers. The battery degradation cost is a negative term in the model representing the cost to participate. However, the system is not tied to any specific battery model. Since these are short/shallow cycles, instead of the traditional full charge/discharge cycles, there is no standard model for modeling the batteries in this case. The following models are proposed.

Linear Battery Cost Model

Figure 2:
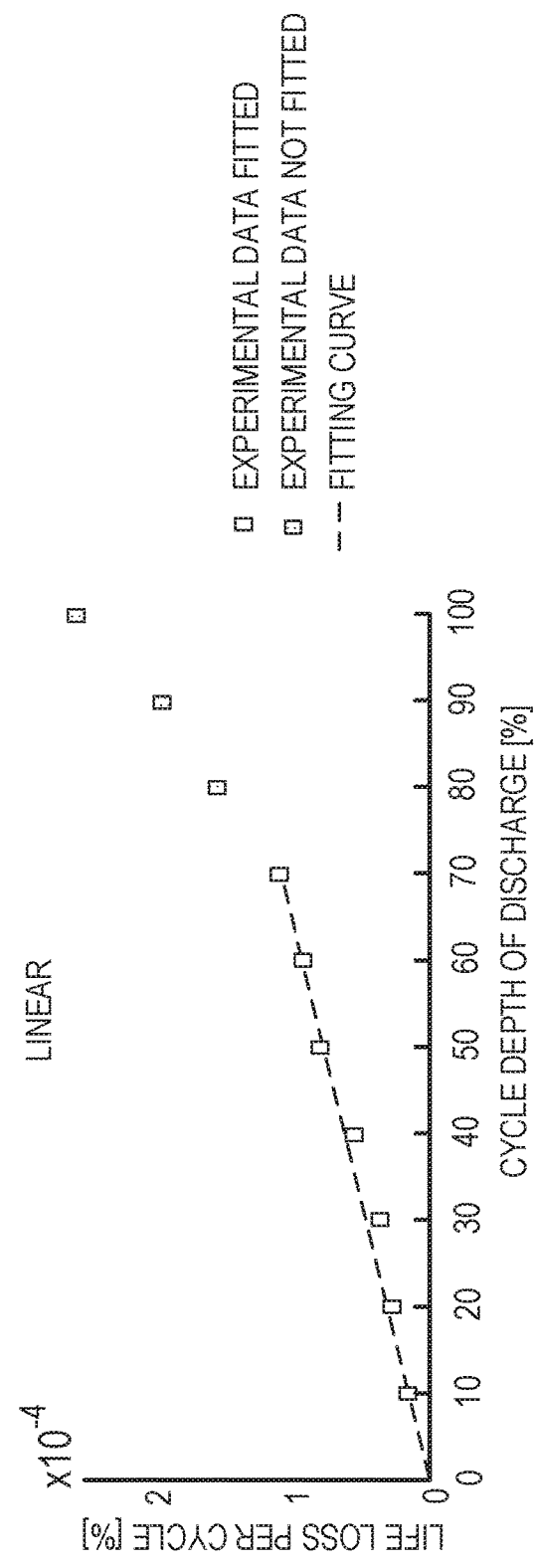
FIG. 2 illustrates a graph of a linear battery cost model used in sample embodiments to amortize the cost of a lithium-ion-based battery over its lifetime of total cycles.

In sample embodiments, a Linear model of the type illustrated in FIG. 2 is implemented in a regulation control module (FIG. 8) to amortize the cost of the battery over its lifetime of total cycles. To estimate the operational cost of a battery under a Linear degradation model, it is assumed that the battery is capable of N number of charge cycles before reaching end-of-life (EoL). N is usually established by battery manufacturers via lab testing. The battery cell cost is pro-rated into a per-MWh cost with respect to charge/discharge energy that the battery is capable of, defining $\lambda_b$ as the coefficient of linearized battery degradation costs. If the battery is limited to operation within a specific range of depth of discharge (DoD), to avoid over charge and discharge, then it can be assumed the degradation cost is linear to the amount of charge and discharge. As such, the cost of the battery following the regulation signal would be $f(b) \propto \lambda_b |b(t)|$ where $|b(t)|$ is the magnitude (absolute value) of the regulation signal at time t.

For example, the following Linear function $f(b)$ may be used:

$$f(b) \propto \lambda_b |b(t)|$$

$$\lambda_b = \frac{\lambda_{cell} \cdot 10^6}{2N \cdot (SoC_{max} - SoC_{min})}$$

$$\lambda_{cell} \sim \$300 \text{ kWh} \quad SoC_{max} = 0.8$$

$$\lambda_b = 83.33 \quad N = 3000 \quad SoC_{min} = 0.2$$

In this example, it is assumed a battery has a lifetime of 3000 charge cycles (circa 10 years of battery life at 1 cycle per day), with a battery cost defined as $\lambda_{cell} = \$300$ kWh that is operated within a state of charge (SoC) of 0.2 to 0.8, then:

$$\lambda_b = \frac{0.3 \cdot 10^6}{(2 \cdot 3000 \cdot (0.8 - 0.2))} = 83.33$$

If the regulation signal of FIG. 1 is followed fully for one hour, where the signal is posted every 2 seconds ($\Delta t = 2$ s or $\frac{1}{1800}$ hour), then the operational cost would be:

$$\text{cost} = \lambda_b \sum_0^t |b| \Delta t = 83.33 \cdot \sum |b| \cdot 1/1800 = \$46.45$$

Therefore, the cost to follow the above example signal would be $46.45 under the Linear battery cost model.

Rainflow Battery Cost Model

Figure 3:
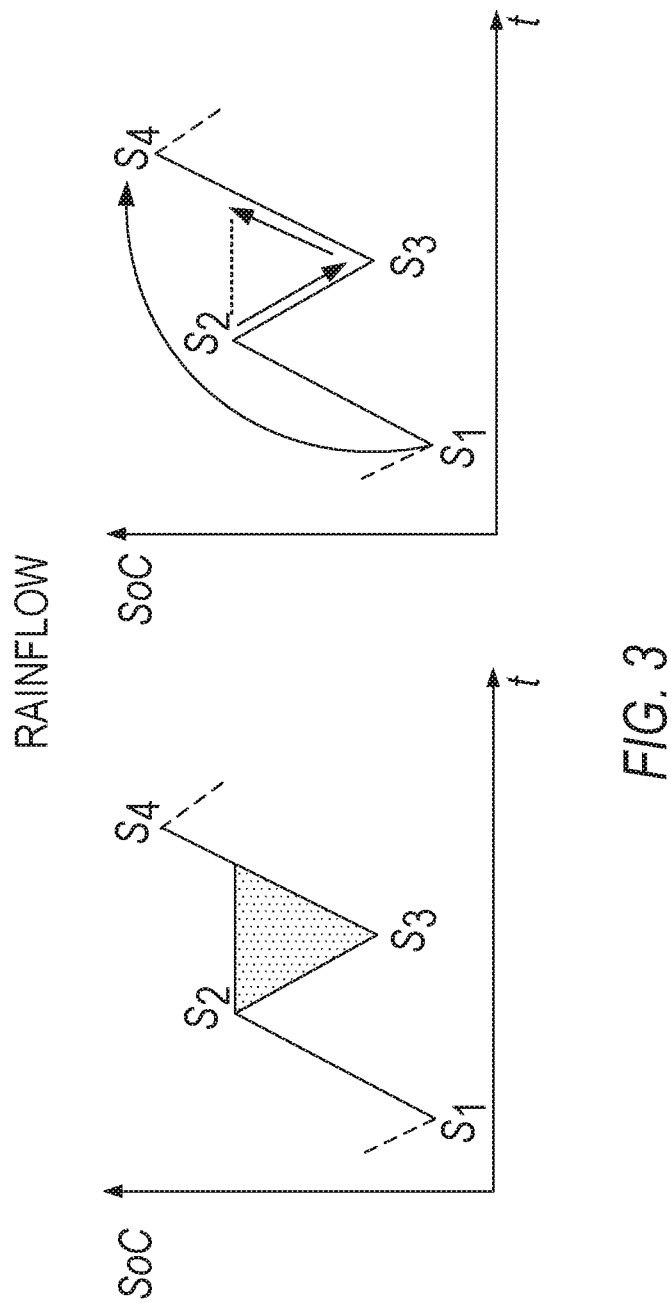
FIG. 3 illustrates a graph of a Rainflow cycle counting battery cost model used in sample embodiments to amortize the cost of a lithium-ion-based battery.

A Rainflow cycle counting model of the type illustrated in FIG. 3 may also be implemented in a regulation control module (FIG. 8) to amortize the cost of the battery over its lifetime of total cycles. The Rainflow cycle counting model is based on material stress where the stress cycles are counted using the Rainflow cycle counting method and the cost of the stress is calculated based on a stress function where x is the state of charge (SoC) of the battery and w, v are depth of charge/discharge under the Rainflow counting model. $w_i$ and $v_i$ are charge/discharge at cycle i. The calculation is thus:

$$(v, w) = \text{Rainflow}(x)$$

$$\Delta L(v, w) = \sum_{i=1}^{|v|} \frac{\Phi(v_i)}{2} + \sum_{i=1}^{|w|} \frac{\Phi(w_i)}{2}$$

$$\Phi(u) = \alpha u^\beta$$

It is noted that the charge and discharge depth do not have to be symmetrical, thus it is represented as separate terms, w and v, for completeness. L is the cost of operating the battery under a stress function, which is the sum of the stresses incurred by charge/discharges ($w_i$ and $v_i$). $\Phi$ is the stress function, in this case exponential stress functions, where $\alpha$, $\beta$ are stress constants usually generated by fitting battery test results.

These or any other appropriate models known to those skilled in the art could all be used as the cost term of the battery in the battery degradation cost model. Also, a more holistic modeling approach may be used that takes the entire system into account, using realistic hourly changing market clearing prices, and focusing on forecasting.

Online Control Module

Figure 4:
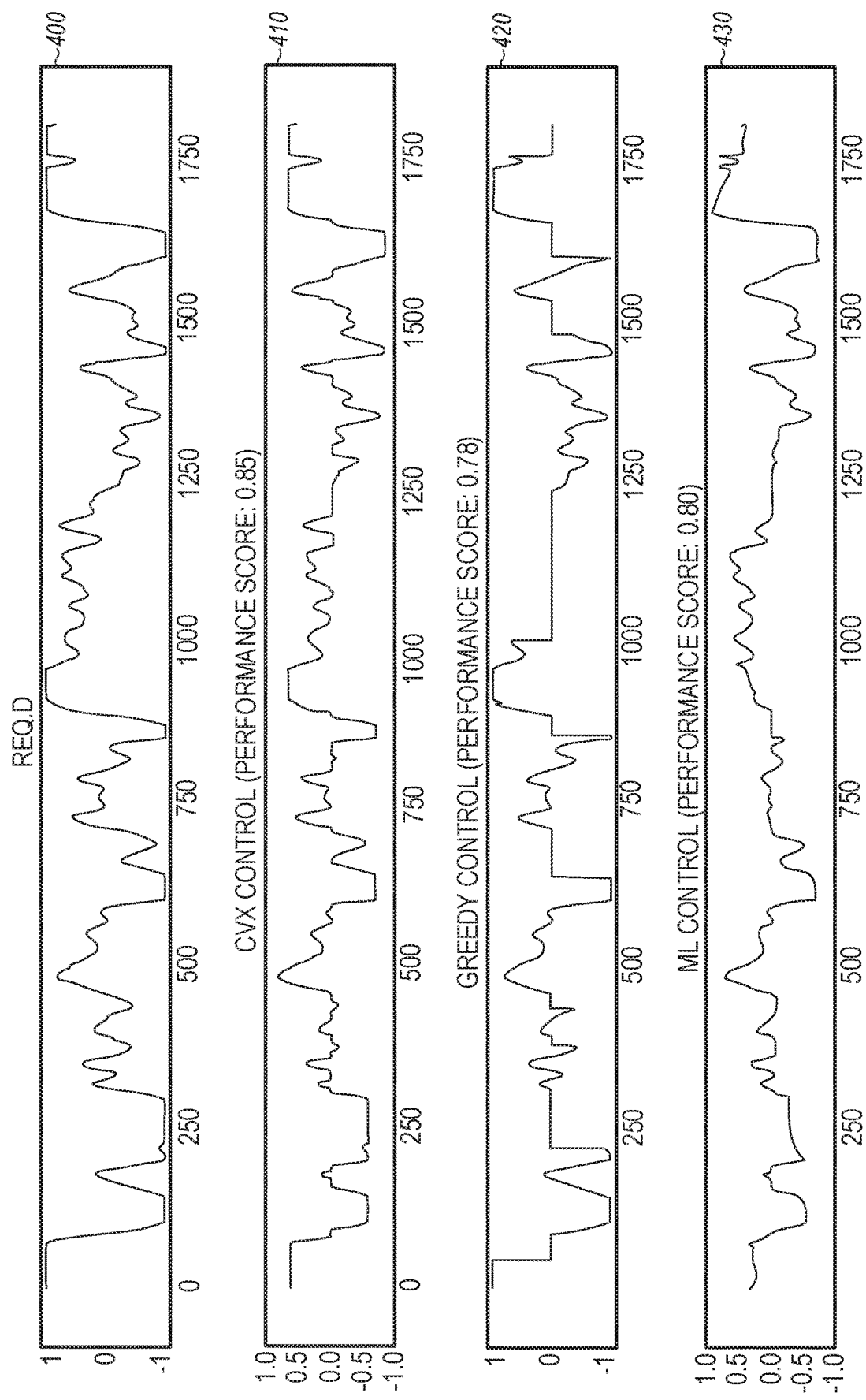
FIG. 4 illustrates from top to bottom graphs of the regulation signal (Reg-D) and the convex solver (cvx) control, greedy control, and ML control signals calculated to track the regulation signal.

If the entire regulation signal is known during a participation period, a convex solver can be used to find the optimized battery control based on the equation below for the state of charge R. FIG. 4 illustrates from top to bottom the regulation signal (Reg-D) 400 and the optimized control signal generated using a convex optimization solver 410, greedy control signal 420, and ML control signals 430. Since the regulation signal is posted every 2 seconds and is considered stochastic, it is impossible to generate an optimized instantaneous online control response. On the other hand, it is possible to use a convex optimization solver to find the optimized control post a regulation period when the entire regulation signal 400 is known for that period. If the system greedily follows the regulation signal 400 until constraints such as max/min state of charge are hit, the system performs less optimally both in terms of payout and battery degradation, as illustrated by the greedy control signal 420. Accordingly, the methods described herein leverage Machine Learning to train an optimized online battery control system. As such, there are many methods that can be used to train the online battery control module. Sample embodiments described herein train the afore-mentioned ML-based online control system based on long short-term memory (LSTM) (i.e., is trained on the previous regulation signal and its convex solutions) to generate an ML control signal 430. This ML-control approach improves on the greedy approach and provides a control strategy that can be implemented in either hardware or software to dispatch battery capability.

In a sample embodiment, a long short-term memory (LSTM) based online battery control is implemented. The LSTM network is trained by, for example, taking half a year (43800 hours) of PJM RegD training data randomly sampled from the 2018 actual PJM RegD signals, broken into one-hour intervals, where each interval represents a regulation period. Since regulation signals are designed to have a 0 mean every 15 min, it is possible to generate synthetic signals to increase training size. For example, since regulation signal ranges between −1 and +1 with a 0 mean every 15 min (450 samples at 2 second per sample), for one hour of synthetic signal, 1800 random numbers may be generated based on this distribution attribute. The current time in seconds during a regulation period, ranging from 0 to 3600 is provided. The state of charge of corresponding batteries at each time during the regulation period while following regulation signal is provided. Other factors, such as battery temperature at each time during regulation period, may also be provided. The corresponding optimized battery response given a battery degradation model is solved using a convex solver.

For example, the state of charge (R) for charge (c), discharge (d), and rate of charge/discharge (r) for energy (E) and maximum power (P) may be defined by the system of equations used by a convex solver. In the following, the first equation for maximizing R is the objective function to be maximized. R is the revenue of regulation based on charge (c), discharge (d), and regulation signal (r), f(c,d) is the cost of battery based on charge/discharge, and x is the state of charge (SoC) of the battery. Its update is based on previous state ($x_{t-1}$) plus the charge ($c_t$) and discharge ($d_t$) of the battery at the current time t. The state of charge is constrained to the max and min state of charge, and the rate of charge/discharge rate is constrained by the power rating of the battery. E is the energy rating of the battery, and $n_c$ and $n_d$ are charge/discharge efficiency coefficient. Thus:

$$\max_{c,d} R(c, d, r) - f(c, d)$$
$$\text{s.t. } x_t = x_{t-1} + \frac{\tau \eta_c}{E} c_t - \frac{\tau}{\eta_d E} d_t,$$
$$\underline{x} \le x_t \le \overline{x},$$
$$0 \le c_t \le P,$$
$$0 \le d_t \le P,$$

The input training features (defined below) are fed into an LSTM network with the solutions from the convex solver as the target for a multivariate time series forecast with a window of 15 minutes (window size is a hyper parameter that can be tuned). The trained network attempts to predict the optimized battery control, following as close to the convex solved solution as possible, given the current time, battery state of charge, and regulation signal. The ML control signal 430 in FIG. 4 is an example of the resulting battery control curve.

On the other hand, if the battery is large enough, ML online battery control may not be needed since the battery is capable of following the entire regulation signal. However, for small batteries, it is important to have such control.

Since the clearing prices vary drastically, if one were to participate every period, a lot of money could be lost because the degradation cost of the battery could be higher than the market payout price for some participation period. As a result, it is important to be able to predict when to participate in the frequency regulation market. Since the payout pricing reflects the utility of regulation, predicting the profitability of a participation period is a way to predict the benefits of providing regulation services.

The payout is calculated after the participation period, and is based on clearing price, mileage ratio and participation performance score. During the participation period, regulation service providers are scored based on how well they follow the regulation signal in terms of correlation, precision and delay. This score is called the performance score.

Each energy market has its own way of calculating payout and performance scores. For instance, the formulas the regional transmission organization PJM (Pennsylvania Jersey Maryland Interconnection LLC) uses to calculate payouts and performance scores are presented in their operating manuals and agreements. In general, the payout may be simplified as the sum of clearing prices weighted by the performance score. For example, an operator using 1 megawatt (MW) of battery capacity to follow the Reg-D signal (FIG. 4 top) with the battery dispatch response (FIG. 4 cvx control) would achieve a performance score of 0.85. Assuming, for the above example, the capability clearing price is $52, performance clearing price is $12, and mileage ratio is 2.3, then the payout would be defined as:

payout=performance score·capability clearing price+
performance score·performance clearing
price·mileage ratio Thus;

payout=0.85·52+0.85·(12·2.3)=67.66

If linear battery cost is assumed to be calculated using the Linear battery cost model described above, then the profit or loss for the given participation period is calculated as follows:

profit=payout−battery cost=67.66−46.45=$21.21

Since clearing prices, mileage ratio, regulation signal, performance score and cost to battery are unknown prior to a participation period, this profit calculation can only be done after the participation period. However, a regulation operator must opt in before a regulation period to participate. As such, a predictive model is used to predict if profits could be made by participating in the period.

Analysis of the 2018 PJM regulation market shows that there is little to no seasonal or time-based patterns in clearing prices or mileage ratio. Given the large variance and implied stochasticity of these features, a profitable period can only be found in around 20% of participation periods under the Rainflow battery degradation models and around 30% of participation periods under the Linear battery degradation models. Thus, predicting the profitable periods is advantageous, particularly for the Rainflow battery degradation model. The process of predicting a favorable participation period should be universally beneficial to anyone planning to enter the regulation market; however, the specific methods used for prediction can change depending on market conditions. In the 2018 PJM regulation market, the capability clearing price dominated payout and ranged from $0-$1300 per hour (perhaps due to irregularities in the design of clearing price calculations) which made it natural to use rare event forecasting methods. This may not hold for every market or year to year behaviors in the same market. Also, the forecast ability is not limited to a dollar profit of payout. The same principle can be applied to forecast other things, such as the most beneficial period to participate in order to stabilize the grid due to external aspects such as weather, fire, equipment, grid instability, etc. In sample embodiments, favorable times to participate in the regulation market include not only times when the profit is predicted to be favorable but also times during which a black-out event or grid equipment failure events are predicted.

Input training features used in forecasting a prediction target such as a binarized classifier suggesting favorability of participating in the energy market include any or all of the following:

Market factors (e.g., capability, performance clearing prices, mileage ratio);
Energy production and load in a regulation zone during matching regulation period;
Weather conditions in regulation zones (e.g., temperature, windspeed, rainfall);
Internal datacenter factors (e.g., power usage, compute load, cooling temperature);
Hourly statistic attributes of the regulation signal (e.g., mean, median, absolute values of the signal);
Performance scores for participation periods;
Other variant factors during a participation period; and
Previous payouts.

Figure 5:
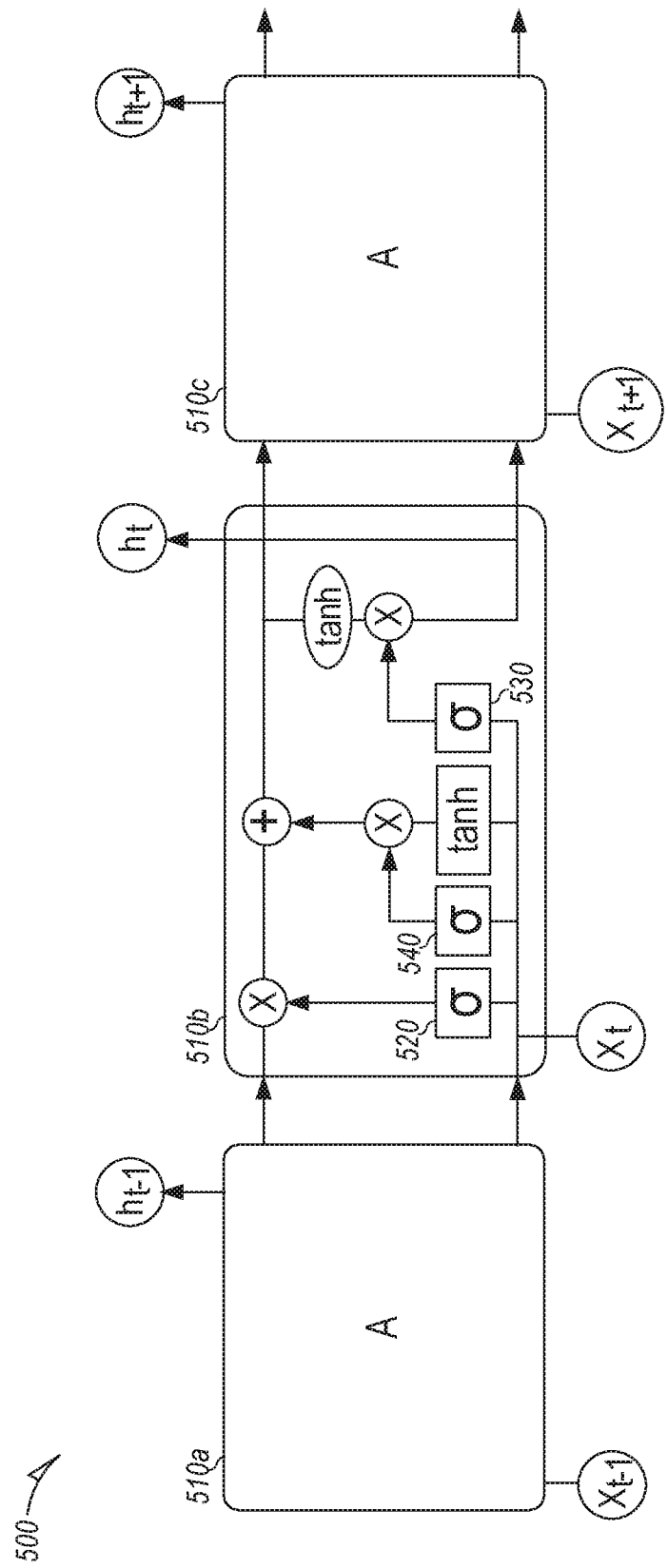
FIG. 5 illustrates a circuit diagram of an example of a long short-term memory (LSTM) based deep learning prediction model in a sample embodiment.

FIG. 5 illustrates an example of the prediction model in a sample embodiment. As illustrated, an LSTM (long short-term memory) based deep learning model 500 is provided. The LSTM 500 has a plurality of neurons (cells) 510a, 510b, 510c, etc. that process data sequentially and pass a previous state as a parameter (e.g., $x_{t-1} \rightarrow x_t \rightarrow x_{t+1}$) and output values $h_{t-1}$, $h_t$, and $h_{t+1}$, respectively. As known to those skilled in the art, LSTM networks are a form of recurrent neural network (RNN) architecture that has feedback connections and are usually used on sequential or time series data. As suggested by the name, these models extract long and short-term features from input data. An LSTM network includes a series of cells 510 composed together into layers, where each cell 510 has an input gate 520, output gate 530, and forget gate 540 as illustrated in FIG. 5.

Each cell 510 remembers values over arbitrary time intervals and the three gates regulate the flow of information into and out of the cell 510. The cell 510 is responsible for keeping track of the dependencies between the elements in the input sequence. The input gate 520 controls the extent to which a new value flows into the cell 510, the forget gate 540 controls the extent to which a value remains in the cell 510, and the output gate 530 controls the extent to which the value in the cell 510 is used to compute the output activation of the LSTM network 500. There are connections into and out of the LSTM gates, a few of which are recurrent. The weights of these connections, which are learned during training, determine how the gates operate.

Figure 6:
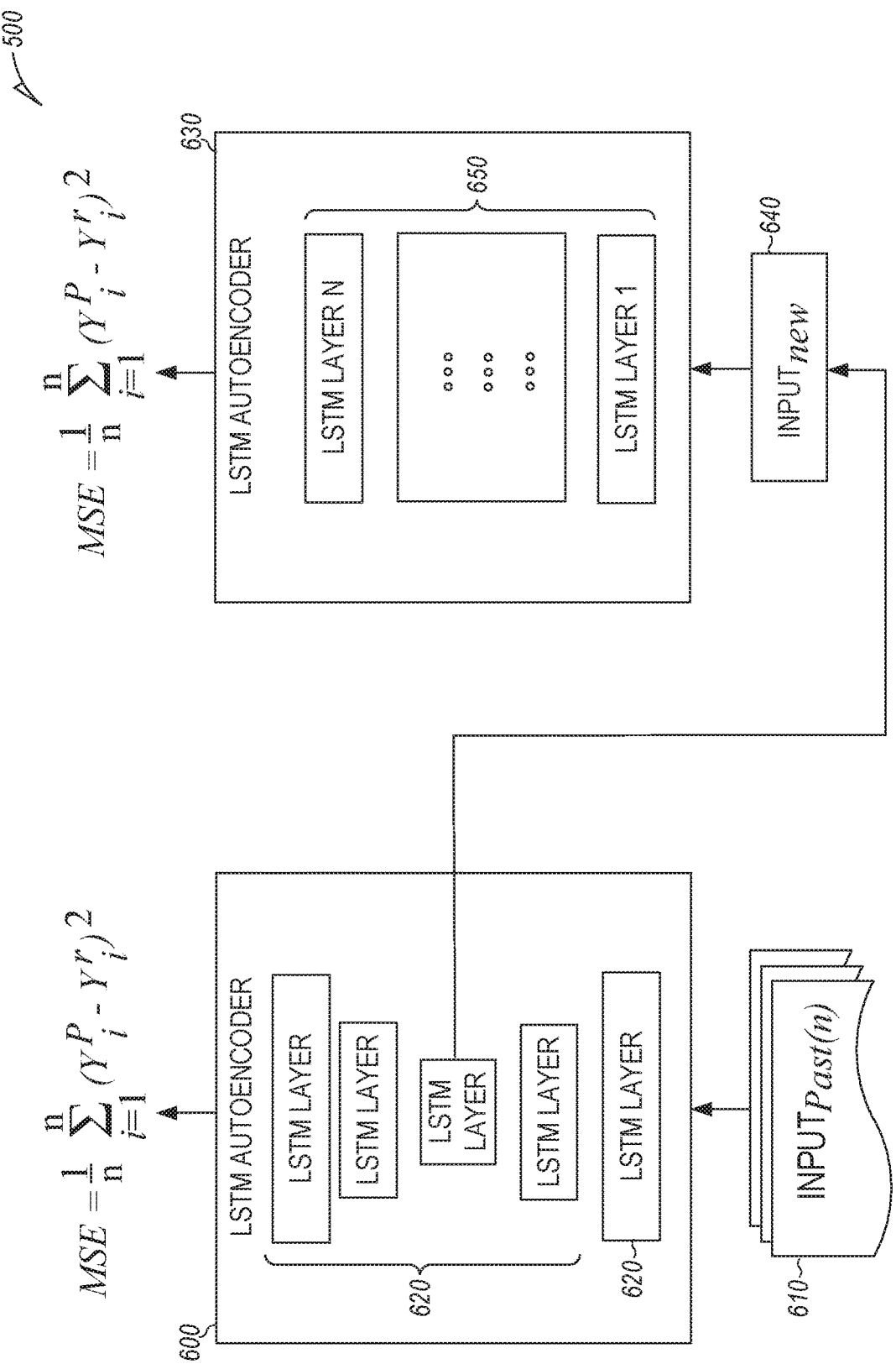
FIG. 6 illustrates a conceptualized circuit diagram of the respective stacks of the LSTM-based prediction model of FIG. 5 in a sample embodiment.

FIG. 6 illustrates the respective stacks of the LSTM 500, including an LSTM autoencoder 600 that receives past values as inputs 610, processes the inputs 610 through multiple LSTM layers 620, and feeds the results into a second LSTM stack 630 that averages incoming vectors and concatenates with new inputs 640 using multiple LSTM layers 650. Input features to the model are the capability clearing price, performance clearing price, mileage ratio, performance score of previous period, and mean of the regulation signal amplitude. It will be appreciated by those skilled in the art that autoencoders are neural networks used to learn an efficient representation (encoding) of the data by solving $f(x)=x$, where $f(x)$, or the encoded data, has less dimensionality than x. How well an autoencoder encodes the original data can be measured by an error function, such as the standard mean squared error (MSE) function:

$$\frac{1}{n}\sum_{i=1}^{n}(f(x_i)-x_i)^2$$

It will be appreciated that, in this case, the MSE also happens to be the objective function (aka cost, lost function) that is being minimized during training of the auto-encoder. However, after training, the same MSE function is also provided a measurement of the quality of encoding at each sample point (xi) and that becomes an input signal in the second LSTM stack 630. So, the objective in the first step is not only to produce the best encoding with the smallest MSE, but also to provide error metrics to be used in the next step.

In a sample embodiment, a multi-layer LSTM based autoencoder 600 is built to encode the input multi-variant time series where the exact dimension of the encoding is a hyper parameter of the network. In general, regular data can be expected to be well encoded by the LSTM autoencoder 600, thus having a lower root mean square (RMS); however, extreme events are badly captured by the LSTM autoencoder 600 and thus have a higher RMS. Both the encoded data as well as their RMS can be taken as input and fed into another multi-layer LSTM stack 630 and used to predict the targeted payout. While a binarized prediction may be taken directly from the second LSTM stack 630, further refinements are taken on the predictor to enable the flexibility of setting a cutoff threshold without having to re-train the overall model. The output of the model 500 is a prediction of the expected revenue payout of the next participation period. Other input features also may be incorporated, such as weather, time-varying operational cost, and the like.

This is only an example of a network, and there are many other ways to build a network to handle this task. For example, another possible network would be a wavelet net, auto-encoder-error-based rare-event classification. The key is that the network is capable of predicting the state of the energy grid based on historic data and then dispatch control signals to the datacenter based on this prediction.

Figure 7:
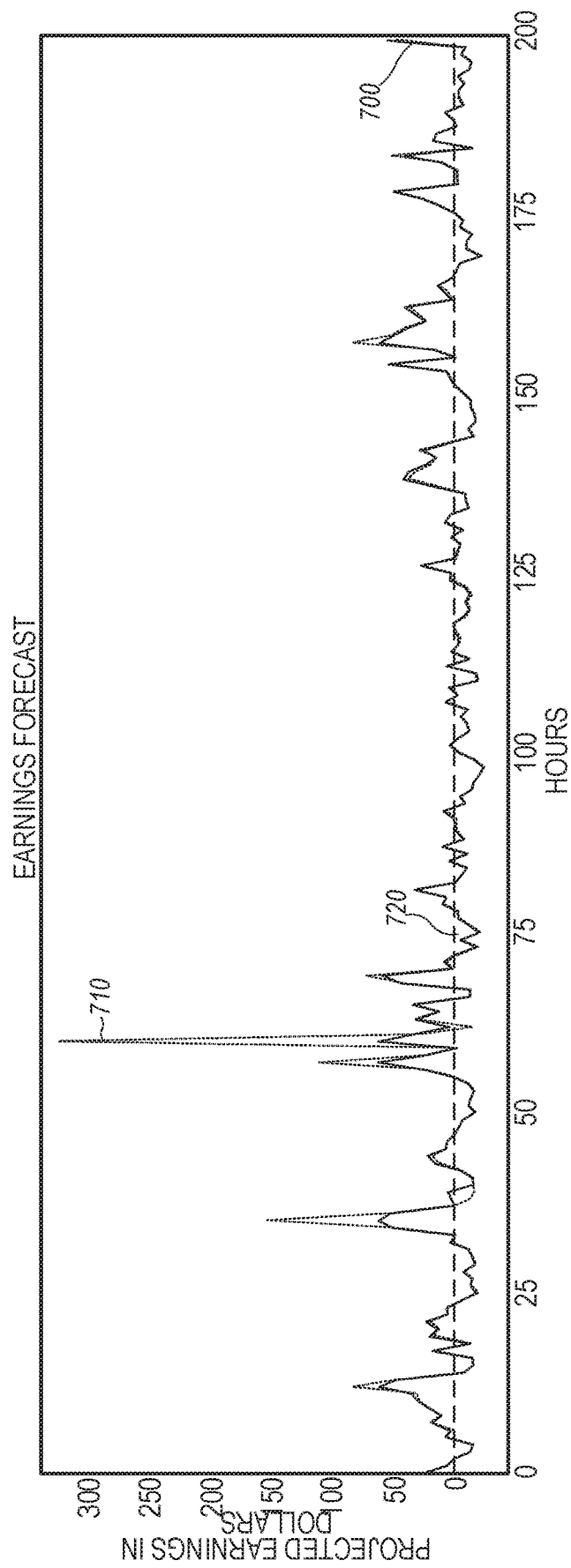
FIG. 7 illustrates a graph of an example result of the ML-based online control system's forecasting models using linear battery degradation model in a sample embodiment.

FIG. 7 illustrates an example result of the ML-based online control system's Linear and Rainflow forecasting models. As illustrated, the forecasting model 700 is missing some of the extreme values such as spike 710. The model may be turned into a binarized predictor by setting a threshold of operational cost whereby anything greater than the threshold would be True and anything less than the threshold would be False. Any period with a value above the threshold is deemed as profitable to participate, and any period with a value below the threshold is deemed to be unfavorable. In FIG. 7, the threshold 720 is set to 0, which means that the payout to participate is greater than battery degradation or not. The threshold 720 could also be set at different values, as desired. For example, if there are other additional issues that affect the battery life, its power output, etc., the threshold 720 can be set higher; if credit is obtained for participating, the threshold 720 could be set lower; if the additional cost/benefit is not constant, then the cost/benefit can be added as a feature in the ML model. As illustrated, after setting the threshold 720 to 0 and turning the prediction into a binarized classifier to predict when to participate in the regulation market, the results are quite promising. Excellent accuracy can be achieved for Rainflow battery models and for the illustrated Linear battery model.

ML-Based Online Control System

Figure 8:
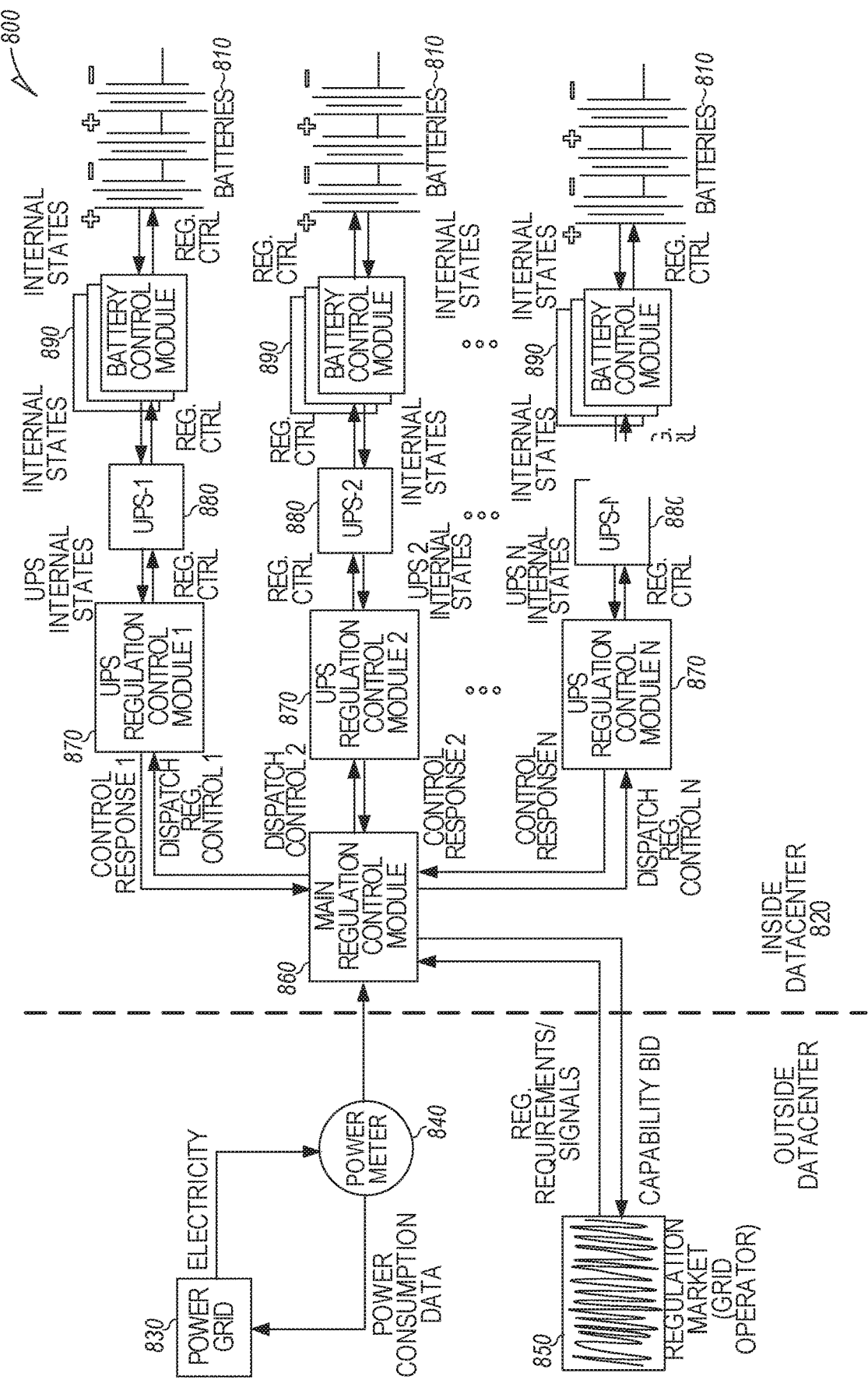
FIG. 8 illustrates a block diagram of an implementation of an ML-based online control system for providing regulation control signals to batteries in a datacenter.

FIG. 8 illustrates a sample diagram of an implementation of the ML-based online control system 800 for providing regulation controls to batteries 810 in a datacenter 820. As illustrated, all interactions of each datacenter 820 with the power grid 830 are hidden behind a power meter 840. The power meter 840 monitors the electrical power provided to the datacenter 820 and provides power consumption data back to the power grid 830 (e.g., for billing purposes). The datacenter 820 also receives frequency regulation control signals and market data from the grid operator 850. The datacenter's capability bid is provided to the grid operator 850 and follows the regulation signals as a unit. The grid operator 850 can monitor the datacenter's regulation response via the power meter 840 as power usages.

Within the datacenter 820, a main regulation control module 860 responds to the regulation signals and runs the afore-mentioned ML-based models to dispatch regulation control signals to each uninterruptible power supply (UPS) regulation control module 870. In sample embodiments, a cascade of controllers, whose topology depends on the exact topology of how information technology equipment and UPSs are connected, is used to optimize control dispatch and to aggregated responses by controlling the battery management at the battery, UPS, and/or datacenter level. The capability (magnitude) and control signal to each UPS regulation control module 870 at the UPS level does not need to be the same but should sum up to the response of the main regulation control module 860. A regulation control signal is provided to each UPS 880 from the corresponding UPS regulation control module 870, and each UPS 880 dispatches a regulation control signal to the battery control modules 890, which selectively control the batteries 810. The control can be different for each battery 810, but the sum of them should equal the control dispatched at the UPS level. At each level, a separate optimization is run based on its received regulation signal and internal status (state of charge, temperature, compute load, etc.) of the control components. In the embodiment of FIG. 8, the datacenter load is treated as constant. However, it will be appreciated that load forecasting, balancing, and load throttling could also be applied to further optimize the load on the system.

Figure 9:
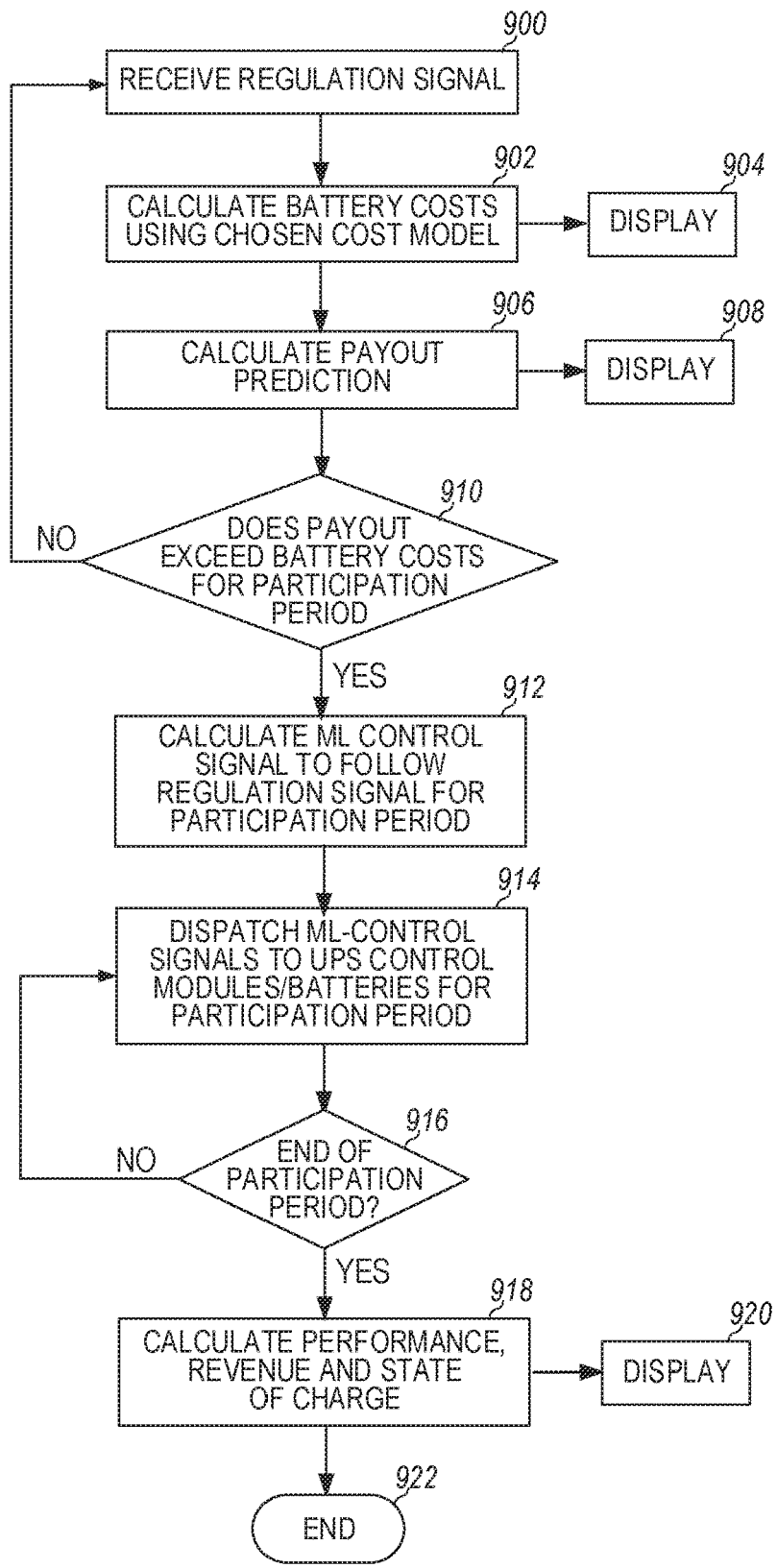
FIG. 9 illustrates a flow chart of a sample embodiment of the operation of the main regulation control module illustrated in FIG. 8.

FIG. 9 illustrates a sample embodiment of the operation of the main regulation control module 860. In sample embodiments, the illustrated operations are implemented in software and/or firmware of the processor of the main regulation control module 860. It will be appreciated that the main regulation control module 860 also performs other operations, such as determining the capability bid and distributing electricity to datacenter components, that are not part of this processing. Corresponding processing for generating the regulation control signals may be performed by the processors of the UPS regulation control modules 870 and/or battery control modules 890, as appropriate.

The main regulation control module 860 continuously receives the real-time regulation signal for the current participation period as indicated at 900. At 902, the main regulation control module 860 calculates the battery costs for a prospective participation period using the selected cost model. For example, the battery costs may be calculated using the Linear and/or or the Rainflow cost models described herein. However, it will be appreciated that other battery degradation cost models may be used. The results of the calculations are displayed on the dashboard display at 904.

The payout prediction for the prospective participation period is calculated at 906 and displayed on the dashboard display at 908. For example, the payout prediction is calculated using the LSTM (long short-term memory) based deep learning model 500 form input features to the model such as capability clearing price, performance clearing price, mileage ratio, performance score of previous period, and mean of the regulation signal amplitude as described herein with respect to FIG. 5 and FIG. 6.

At 910, the main regulation control module 860 determines whether the anticipated payout for the prospective participation period exceeds the calculated battery costs for the prospective participation period. If not, the main regulation control module 860 determines that it would not be profitable or cost-effective to participate in regulation of the grid during the prospective participation period. However, if the payout exceeds the set threshold for the battery costs for the prospective participation period, then the main regulation control module 860 prepares to move into a battery regulation mode to control the batteries 810 during the prospective participation period.

At 912, the main regulation control module 860 during the battery regulation mode calculates the ML-control signal to follow the regulation signal for the participation period. The calculated ML-control signal is dispatched to the UPS regulation control modules 870 and the battery control modules 890 at 914 for regulation of the charging/discharging of the batteries 810 during the participation period. The battery regulation is designed to provide stability to the electrical grid based on tracking of the regulation signal by the ML-control signal.

Once the participation period ends at 916, the regulation operators calculate the performance, revenue, and state of charge of the batteries 810 and sends the data back to the participant, who display the calculated information on the dashboard display at 920 before the process ends at 922.

It will be appreciated that the regulation signal is received at all times and that the calculations performed by the main regulation control module 860 may be performed continually or at discrete times. Also, the respective calculations may be presented to the dashboard display in a variety of display formats, including those described below with respect to FIGS. 10-22.

Dashboard

Figure 10A:
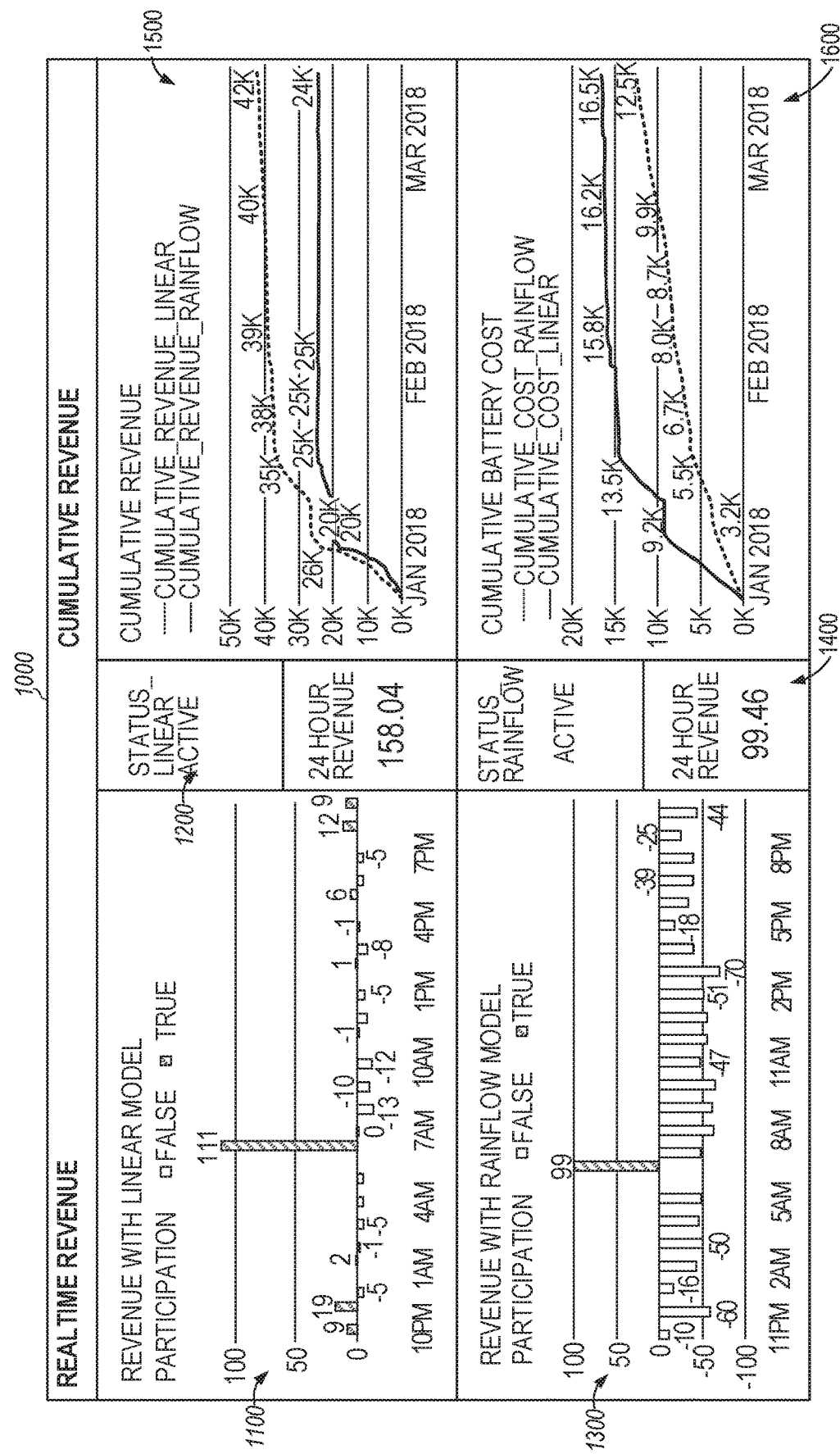
FIG. 10A illustrates a first screen that displays real-time and cumulative revenue and battery degradation cost modelling and FIG. 10B illustrates a second screen that displays performance and market data, the regulation signal, the battery response, and battery state of charge.
Figure 10B:
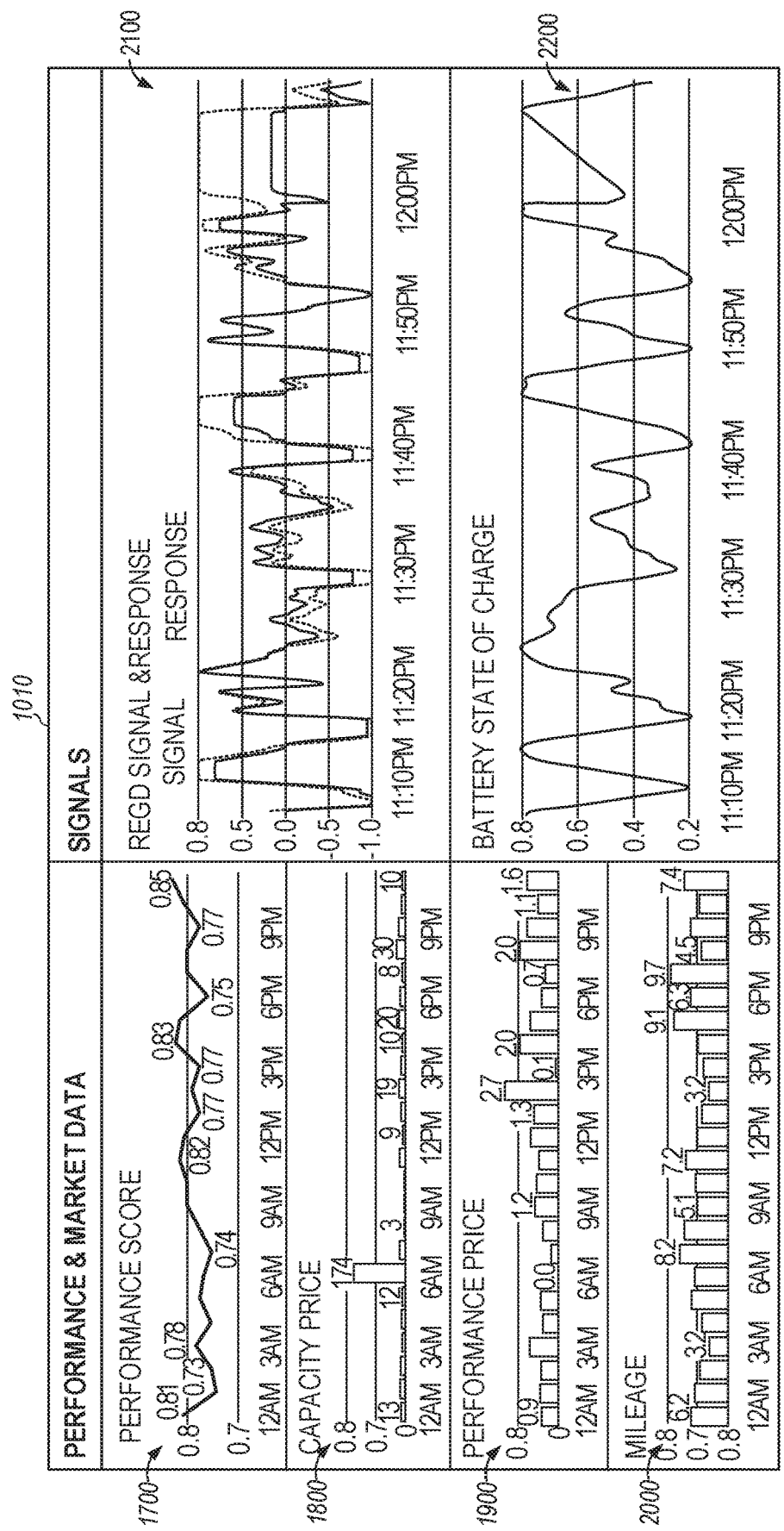

FIG. 10 illustrates a sample dashboard for monitoring operation of the frequency regulation energy market in a sample embodiment. The dashboard includes two screens. FIG. 10A illustrates a first screen 1000 that displays real-time and cumulative revenue data, while FIG. 10B illustrates a second screen 1010 that displays performance and market data, the regulation signal, the battery response, and state of charge as well as results of participation, revenue and battery cost modelling.

Figures 11, 12:
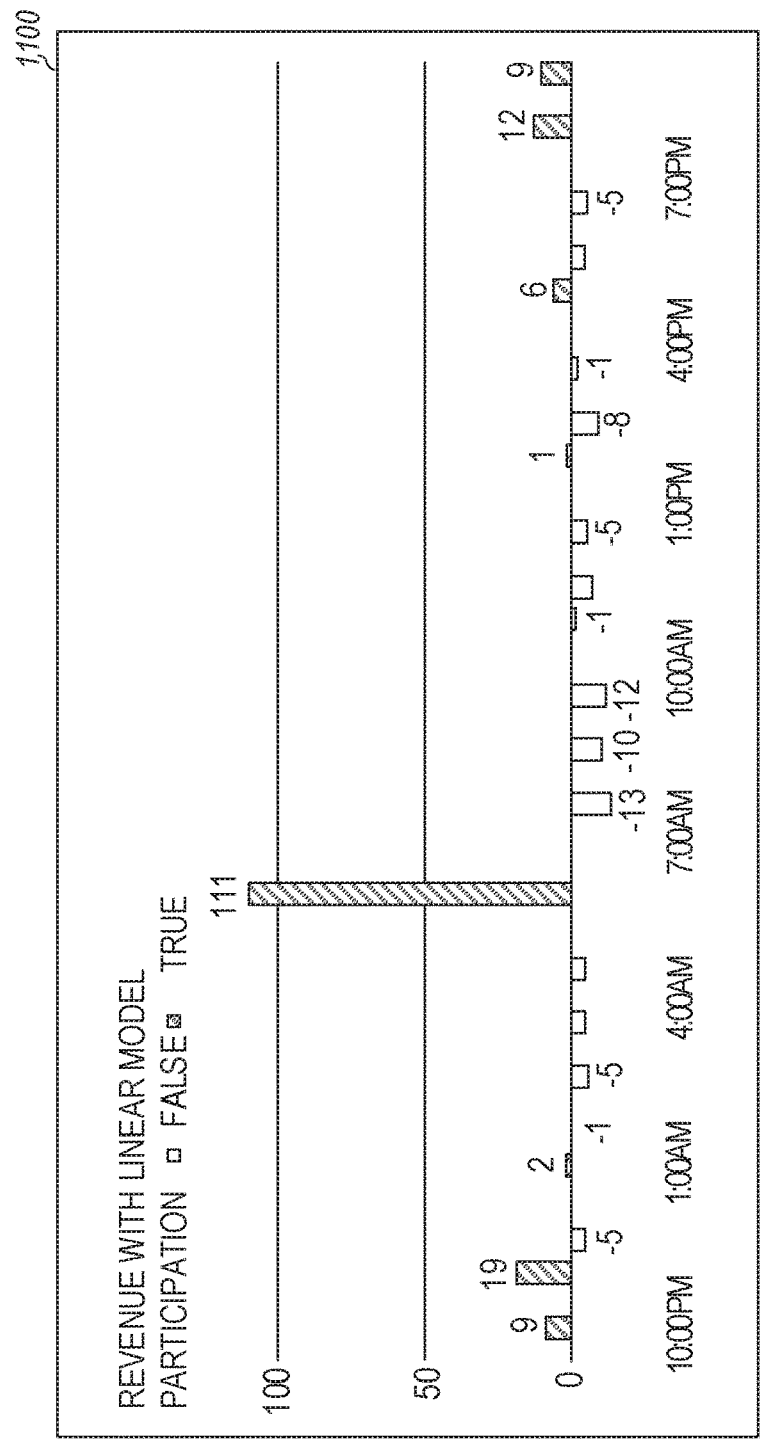
FIG. 11 illustrates a display of the Revenue With Linear Battery Degradation Model chart of FIG. 10A.
FIG. 12 illustrates a display of the Linear Battery Degradation Battery model Current Status chart of FIG. 10A.

FIG. 11 illustrates the Revenue With Linear Model chart 1100 of FIG. 10A. As illustrated in FIG. 11, the Revenue With Linear Model chart 1100 shows real-time results of participation modelling using the Linear battery cost model adjustment to revenue. The X axis illustrates the last 24 hours of operation, while the Y axis illustrates the revenue in US dollars adjusted to battery cost calculated using the Linear degradation model. The bars are colored based on system participation during an hour. If the prediction model classifies an hour as profitable, the bid is placed on the market and the bar for this hour is colored a first color (e.g., blue), while hours classified as non-profitable are colored a second color (e.g., grey).

FIG. 12 illustrates the Linear Model Current Status chart 1200 of FIG. 10A. As illustrated in FIG. 12, a card 1210 shows the current status of the system operation that uses the Linear degradation model for battery cost calculation. The card 1210 shows the possible current status values as Active or Deactivated at {datetime value}. For example, the system may be deactivated when a negative daily revenue threshold is reached. A card 1220 shows the cumulated revenue in US dollars for the previous 24 hours calculated using the Linear battery degradation cost model. Only hours when bids are placed and when the system operates on the market are summarized.

Figure 13:
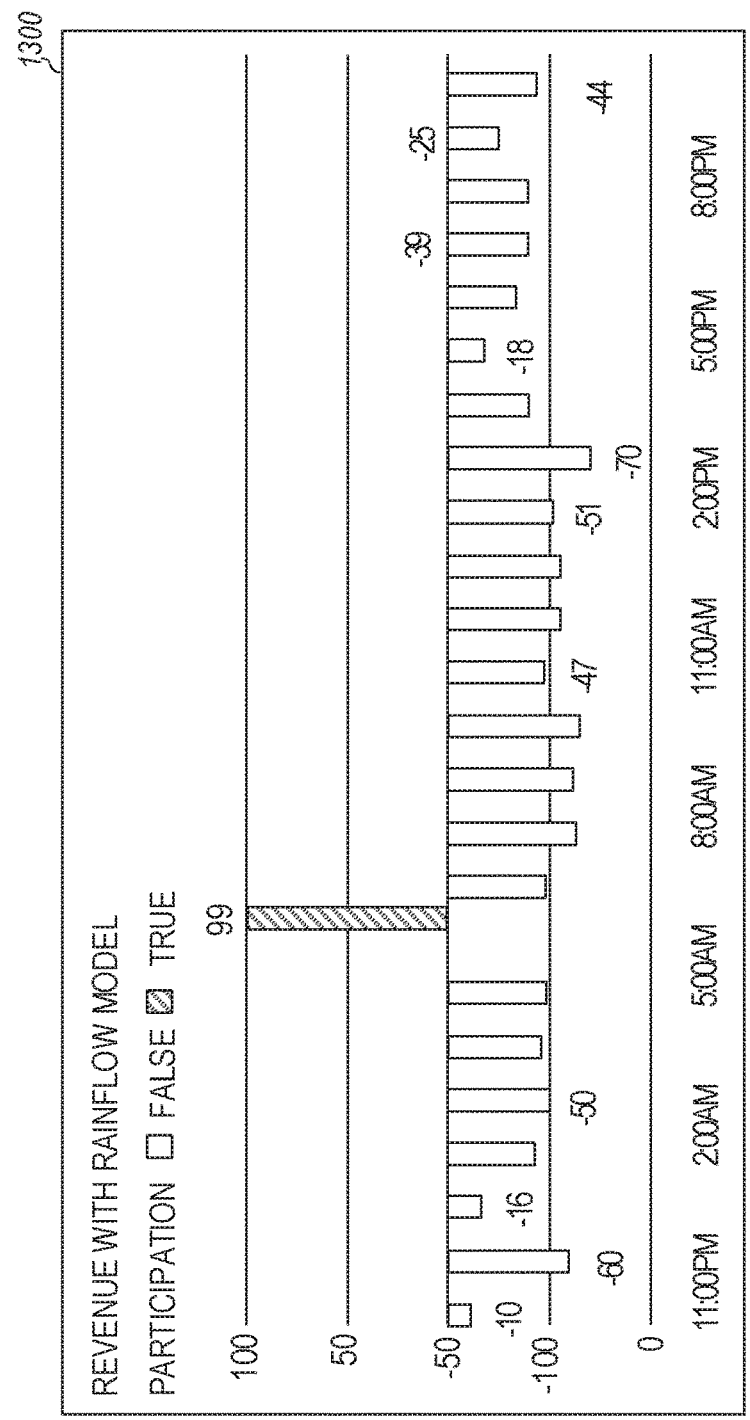
FIG. 13 illustrates a display of the Revenue with Rainflow Battery Degradation Model chart of FIG. 10A.

FIG. 13 illustrates the Revenue With Rainflow Model chart 1300 of FIG. 10A. As illustrated in FIG. 13, the Revenue With Rainflow Model chart 1300 shows real-time results of participation modelling using the Rainflow battery cost model adjustment to revenue. The X axis illustrates the last 24 hours of operation, while the Y axis illustrates the revenue in US dollars adjusted to battery cost calculated using the Rainflow degradation model. The bars are colored based on system participation during an hour. If the prediction model classifies an hour as profitable, the bid is placed on the market and the bar for this hour is colored a first color (e.g., orange), while hours classified as non-profitable are colored a second color (e.g., grey).

Figure 14:
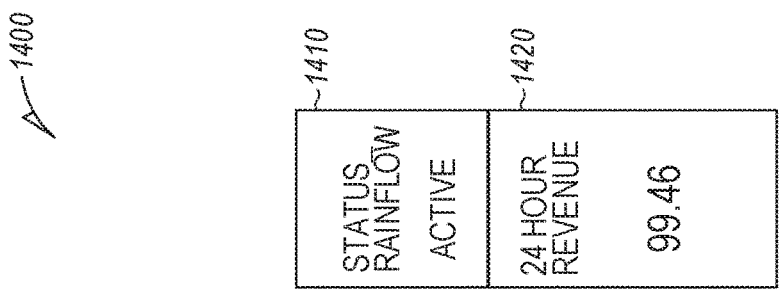
FIG. 14 illustrates a display of the Rainflow battery Degradation Model Current Status chart of FIG. 10A.

FIG. 14 illustrates the Rainflow Model Current Status chart 1400 of FIG. 10A. As illustrated in FIG. 14, a card 1410 shows the current status of the system operation that uses the Rainflow degradation model for battery cost calculation. The card 1410 shows the possible current status values as Active or Deactivated at {datetime value}. For example, the system may be deactivated when a negative daily revenue threshold is reached. A card 1420 shows the cumulated revenue in US dollars for the previous 24 hours calculated using the Rainflow battery degradation cost model. Only hours when bids are placed and when the system operates on the market are summarized.

Figure 15:
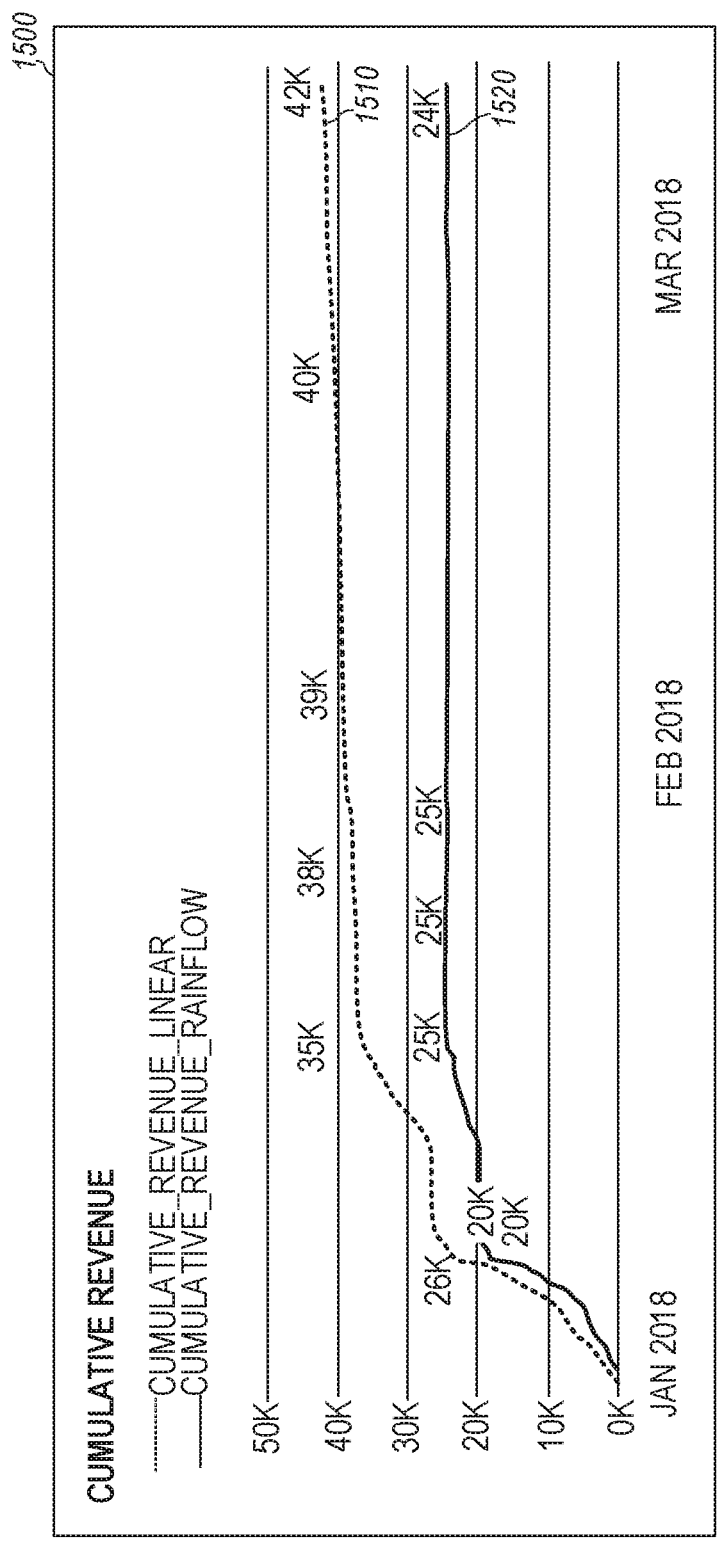
FIG. 15 illustrates a display of the Cumulative Revenue chart of FIG. 10A.

FIG. 15 illustrates the Cumulative Revenue chart 1500 of FIG. 10A. As illustrated in FIG. 15, the Cumulative Revenue chart 1500 shows cumulative results of operation on the frequency market using the two battery degradation cost models' adjustments to revenue. Only data for hours when the bids are placed and when a resource participates on the market are cumulated. The X axis illustrates a datetime starting from the first hour of system operation on the market up to current hour, while the Y axis illustrates the cumulated revenue in US dollars adjusted to the corresponding battery degradation cost model. The revenue data 1510 adjusted using the Linear battery degradation cost model is colored a first color (e.g., blue), while revenue data 1520 adjusted using the Rainflow battery degradation cost model is colored a second color (e.g., orange).

Figure 16:
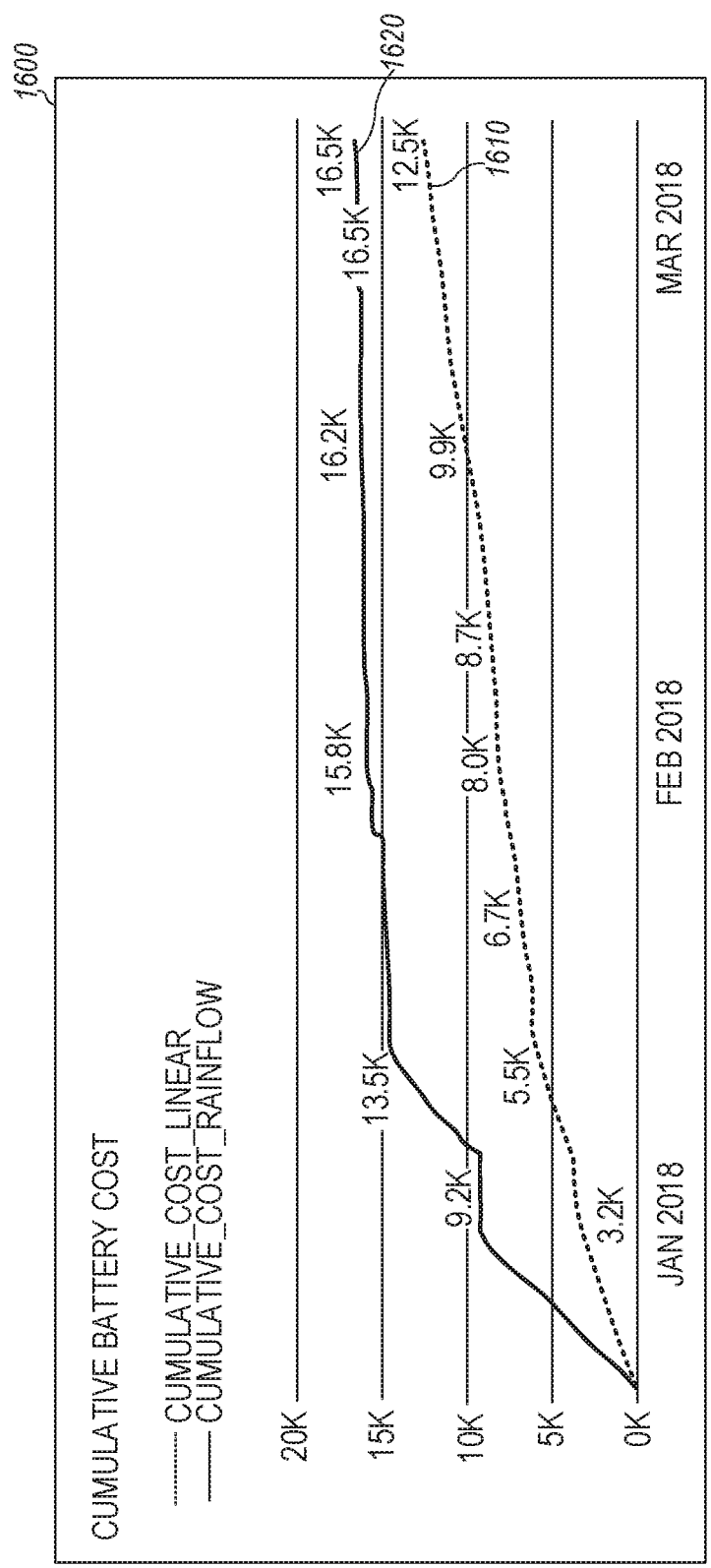
FIG. 16 illustrates a display of the Cumulative Battery Degradation Cost chart of FIG. 10A.

FIG. 16 illustrates the Cumulative Battery Cost chart 1600 of FIG. 10A. As illustrated in FIG. 16, the Cumulative Battery Cost chart 1600 shows cumulated battery degradation cost for the time of operation on the frequency market calculated with the two battery degradation cost models. Only data for hours when the bids are placed and when a resource participates on the market are cumulated. The X axis illustrates a datetime starting from the first hour of system operation on the market up to the current hour, while the Y axis illustrates the cumulated battery degradation cost in US dollars. The battery cost 1610 calculated using the Linear degradation model is colored a first color (e.g., blue), while the battery cost 1620 calculated using the Rainflow degradation model is colored a second color (e.g., orange).

Figure 17:
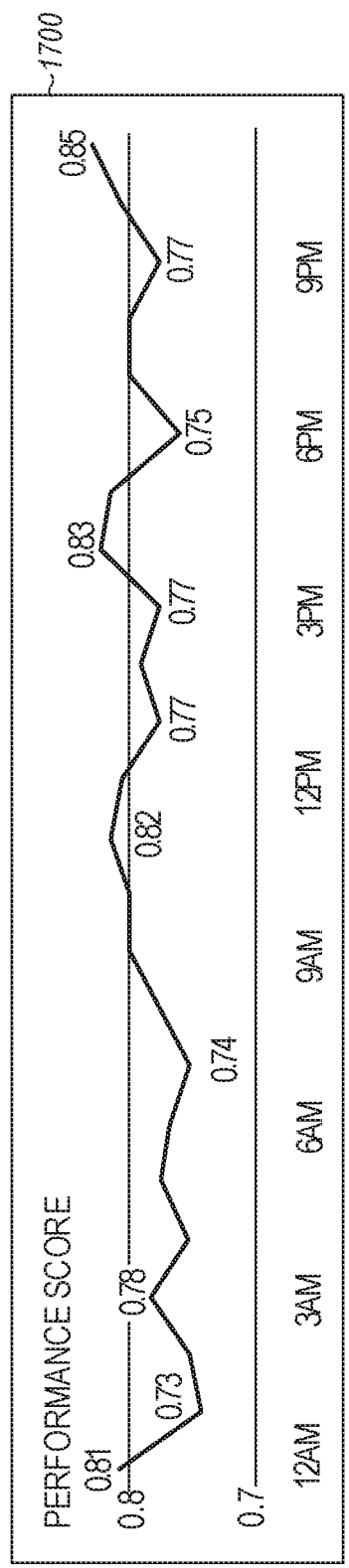
FIG. 17 illustrates a display of the Performance Score chart of FIG. 10B.

FIG. 17 illustrates the Performance Score chart 1700 of FIG. 10B. As illustrated in FIG. 17, the Performance Score chart 1700 shows the performance score of the resource for the previous 24 hours. The X axis illustrates the last 24 hours of operation, while the Y axis illustrates the performance score on a scale from 0 to 1. As noted above, the performance score depends on delay, accuracy and precision of the resource response for the RegD signal.

Figure 18:
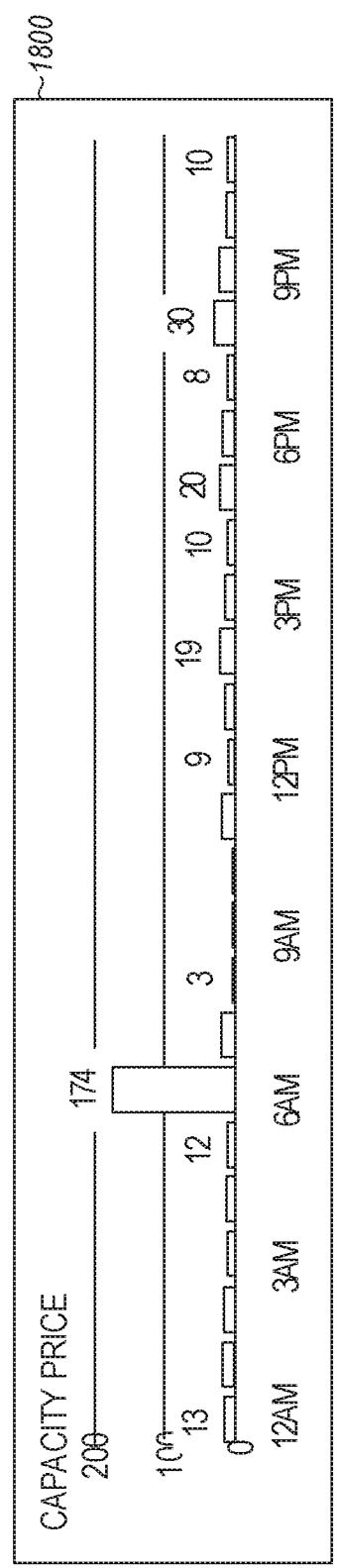
FIG. 18 illustrates a display of the Capacity Price chart of FIG. 10B.

FIG. 18 illustrates the Capacity Price chart 1800 of FIG. 10B. As illustrated in FIG. 18, the Capacity Price chart 1800 shows regulation market clearance capacity price (RMCCP) for 1 MWatt of capacity set by the energy market operator for the previous 24 hours. The X axis illustrates the last 24 hours of operation, while the Y axis illustrates the capacity price per 1 MW in US dollars.

Figure 19:
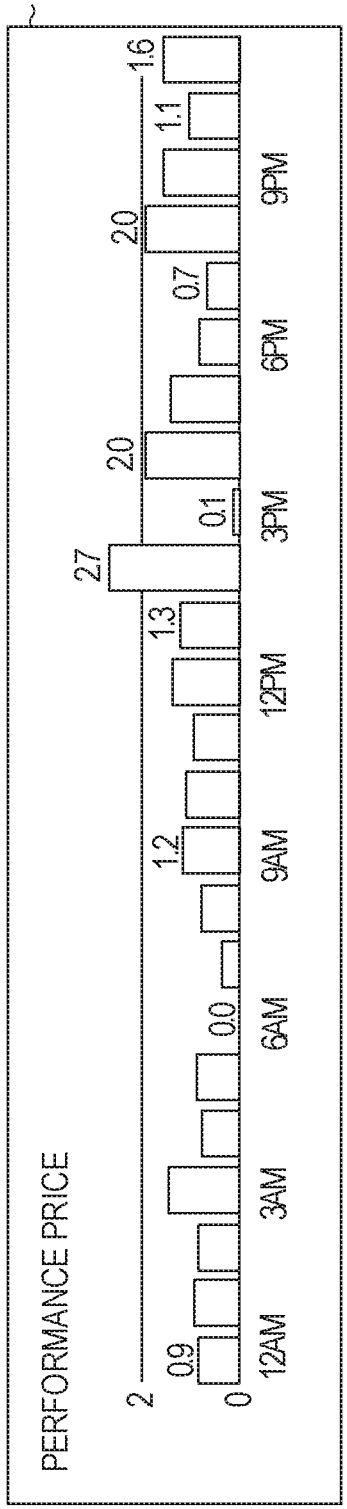
FIG. 19 illustrates a display of the Performance Price chart of FIG. 10B.

FIG. 19 illustrates the Performance Price chart 1900 of FIG. 10B. As illustrated in FIG. 19, the Performance Price chart 1900 shows the regulation market clearance performance price (RMCPC) set by energy market operator for the previous 24 hours. The X axis illustrates the last 24 hours of operation, while the Y axis illustrates the performance price per 1 MW of capacity that participates in the regulation market in US dollars.

Figure 20:
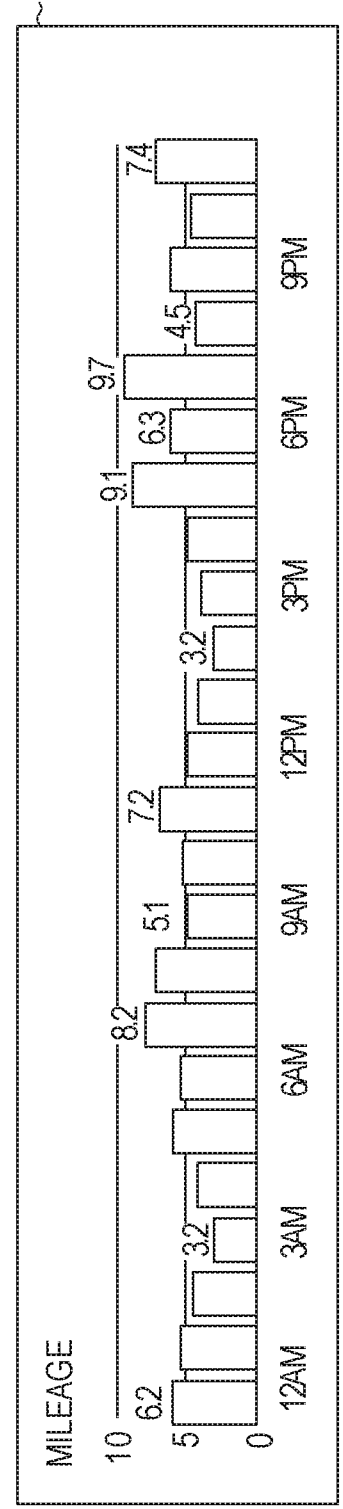
FIG. 20 illustrates a display of the Mileage chart of FIG. 10B.

FIG. 20 illustrates the Mileage chart 2000 of FIG. 10B. As illustrated in FIG. 19, the Mileage chart 2000 shows mileage that a resource of 1 MW capacity performs during an hour for the previous 24 hours. The X axis illustrates the last 24 hours of operation, while the Y axis illustrates the mileage per 1 MW of resource capacity that participates in the regulation market. By way of example, for an hour with 8 mileage, a 1 MW assigned resource will move up and down a total of 8 MW.

Figure 21:
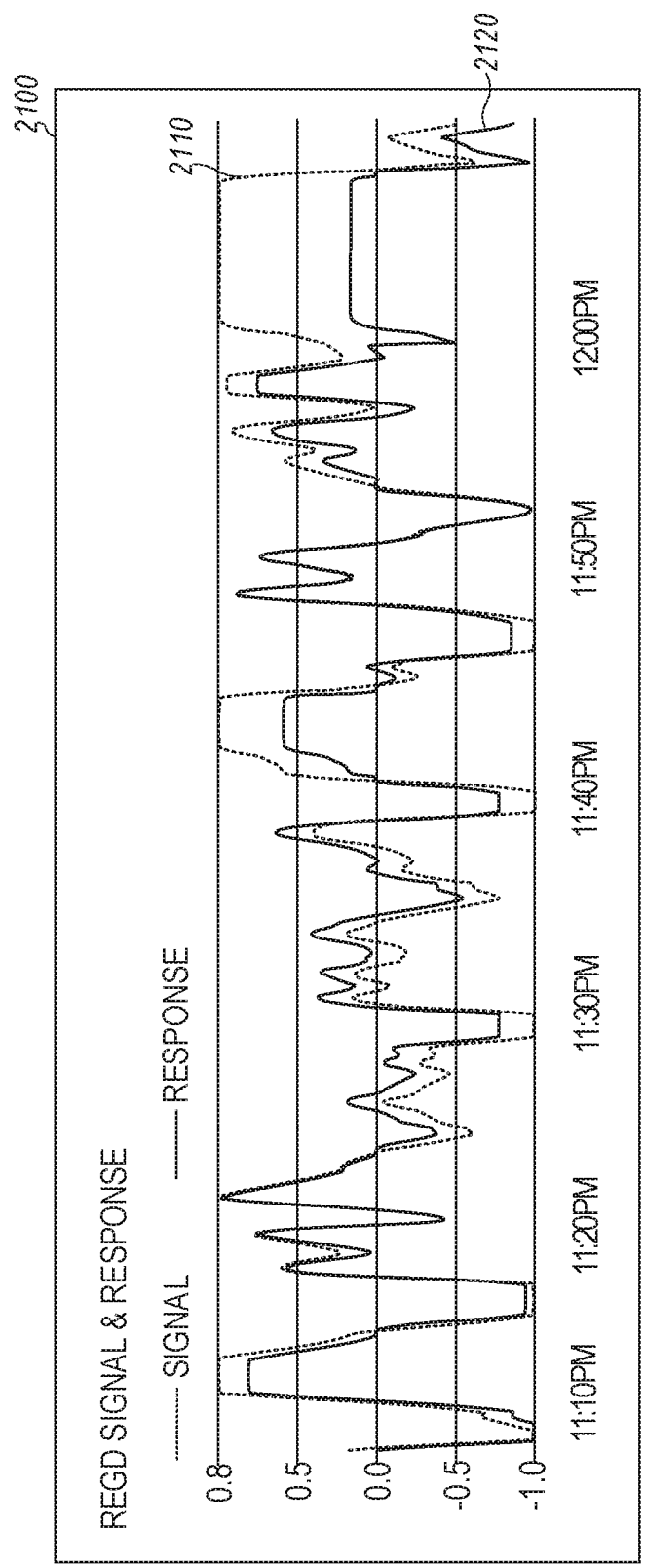
FIG. 21 illustrates a display of the RegD Signal and Response chart of FIG. 10B.

FIG. 21 illustrates the RegD Signal and Response chart 2100 of FIG. 10B. As illustrated in FIG. 21, the RegD Signal and Response chart 2100 shows the RegD regulation signal issued by the energy market operator as well as the resource response for the signal. The X axis illustrates the last hour of operation, while the Y axis illustrates the RegD signal and a resource response on a scale from −1 to 1 with 2 seconds frequency. The RegD signal 2110 is colored in a first color (e.g., red), while the resource response 2120 is colored in a second color (e.g., blue).

Figure 22:
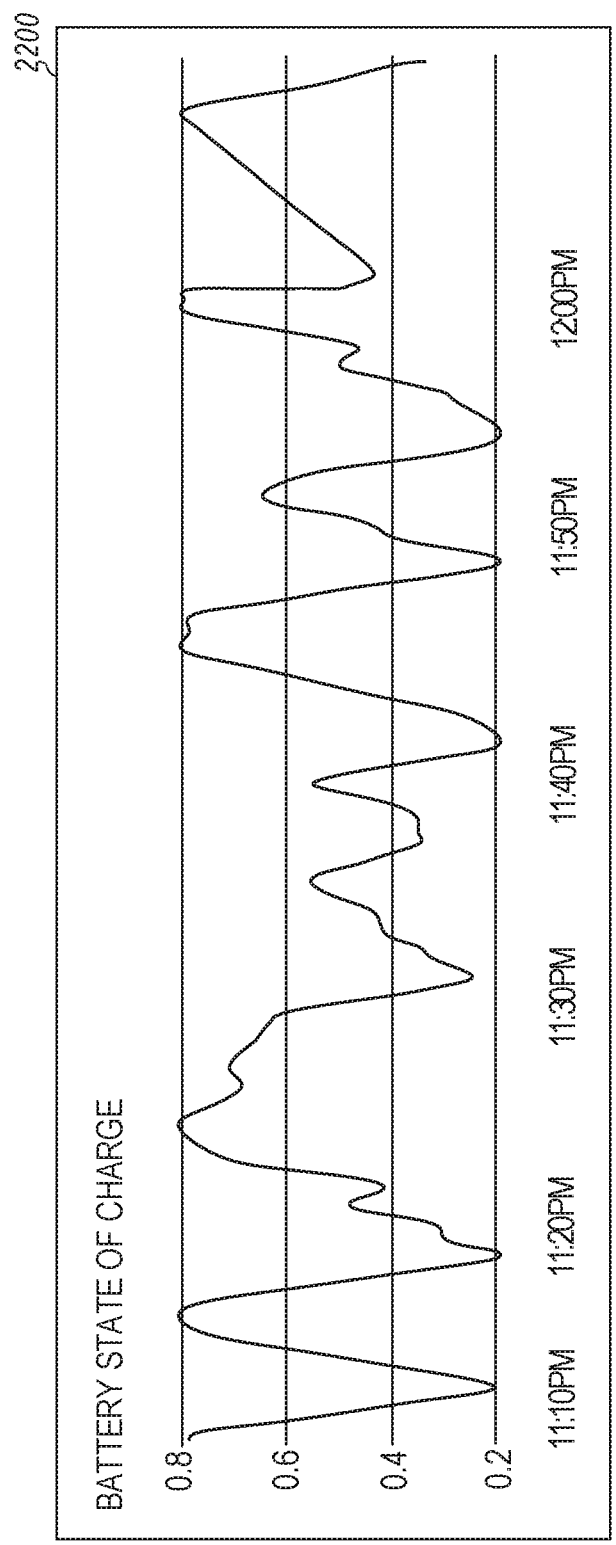
FIG. 22 illustrates a display of the Battery State of Charge chart of FIG. 10B.

FIG. 22 illustrates the Battery State of Charge chart 2200 of FIG. 10B. As illustrated in FIG. 22, the Battery State of Charge chart 2200 shows the state of charge of the battery while following the RegD signal. Limits of 0.2-0.8 are applied as the technical requirement for battery life consideration. The X axis illustrates the last hour of operation, while the Y axis illustrates the battery state of charge after the response to the RegD signal on a scale from 0.2 to 0.8 with 2 seconds frequency.

The system and method described herein with respect to FIGS. 1-22 has significant importance in terms of both the economics and sustainability of datacenter operation. The battery utilization described herein represents a significant opportunity to offset the running energy costs.

Power Grid Aware ML Devices

Overview

The datacenter embodiment described above with respect to FIGS. 1-22 provides active monitoring of the energy regulation signal and weather to forecast energy usage. The forecast energy usage may then be used to stabilize the grid and to monetize the energy usage at different times. Machine-learning (ML) techniques may be used to forecast favorable participation periods for each energy customer.

Further techniques described below expand the embodiments described above beyond data centers by providing a device with ML capability that can be attached, installed, or retrofitted into electronic appliances, electric cars and chargers, solar, wind and other renewable sources, lighting, cooling, air ventilation elements in building and homes, battery and mechanical based energy stores, and the like. The resulting system provides universal sensing and forecasting by further providing passive sensing (e.g., cycle counting) of the local environment to, for example, monitor neighborhood energy usage. Using this information, the system may provide additional functionality including power saving, enabling use of renewable energy sources, and the like for use by energy producers and energy storage devices as well as by consumers and aggregators of energy. The resulting system may be tiered from devices to local groups, neighborhoods, substations, grids, and national energy providers. Energy forecasting may be provided for multiple energy consuming products in the system. Reinforcement learning and transfer learning through a dynamic network ML platform enables the forecasting to be applied to virtually all energy consuming devices in the system.

Figure 23:
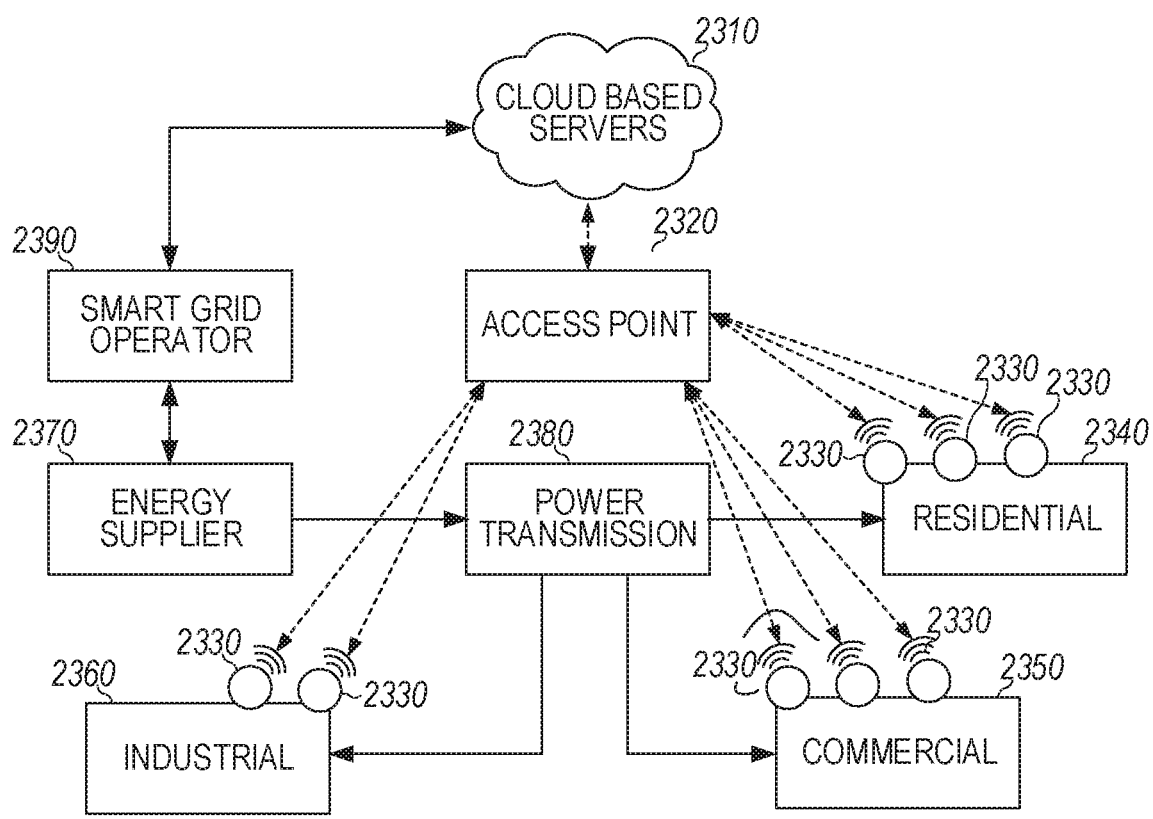
FIG. 23 illustrates a high-level view of a system for providing universal sensing and forecasting for energy producers and energy consuming devices as well as for consumers and aggregators of energy in sample embodiments.

FIG. 23 illustrates a high-level view of a system 2300 for providing universal sensing and forecasting for energy producers and energy consuming devices as well as by consumers and aggregators of energy in sample embodiments. In this system, cloud-based servers 2310 receive monitoring inputs via respective access points 2320 that relay data to/from power grid aware ML devices 2330 that are used to manage energy usage by residential customers 2340, commercial customers 2350, and industrial customers 2360 of the energy supplier(s) 2370, who supply power via the power grid transmission systems 2380. The energy supply from the energy suppliers 2370 may optionally be managed by one or more smart grid operators 2390 using power usage data provided by the cloud-based servers 2310. As in the data center embodiment described above, the system 2300 actively monitors the market signals and the weather. However, the power grid aware ML devices 2330 also passively monitor the energy usage by respective energy consuming devices by, for example, cycle counting to infer current frequency of the power grid, and monitoring the timing and amount of energy usage by neighboring devices. The captured data may be provided to software running on the cloud-based servers 2310 to perform calculations based on forecasting, reinforcement learning, and dynamic network ML-based transfer learning techniques adapted to optimize grid stabilization, power savings, monetization, and/or usage of renewable energy sources and the like by providing control signals to the energy producing components of the energy producer, energy storage provider, the consumer, and/or energy aggregators (e.g., grid operator). The power management also may be tiered for regulation of devices, local groups of devices, neighborhoods, substations, grids, all the way up to the national energy grid.

In sample embodiments, the ML devices 2330 are grid aware. In other words, the ML device 2330 can both receive an active grid signal, such as the RegD signal described above in PJM areas, and can passively impute grid status from its connection to the grid itself. The ML device 2330 is also aware of its surroundings. The ML device 2330 is aware of its peers (other devices that has the functionality described herein installed) in a tiered manner. These devices may communicate with each other either via x10, ZigBee, Wi-Fi, or other communication methods.

The ML device 2330 may dynamically dispatch functions of its electrical component (e.g., turn on/off or set operational range) and schedule charge/discharge and energy storage functions based on grid status, availability of energy, active market signals, or status of its tiered cohorts and its own operational rules. The ML device 2330 also may optimize the function of its attached electrical component by itself, based on pre-determined usage rules. The ML device 2330 may further update over time or change the pre-determined rules based on the operational data gathered, using either reinforcement learning or online learning schemes. The ML devices 2330 also may optimize usage based on grid status and the status of peer (cohort) devices and further update optimization rules based on operational data.

In sample embodiments, the ML devices 2330 may serve as sensors to the power transmission grid 2380 and alert grid operators 2390 and other necessary parties in case of grid anomalies, such as falling power lines. The ML devices 2330 also may share data with a regional power grid operator 2390 (if the device owner opts in) which allows for more comprehensive planning. In the sample embodiments, the ML devices 2330 allow better utilization of energy, especially to enable more renewable energy utilization. The ML devices 2330 also assist in stabilizing the power grid and provide capabilities for responding against fast changes to allow transient irregularities within a grid to be smoothed out. The ML devices 2330 also may serve as grid health beacons.

The ML capabilities of the ML device 2330 includes grid status forecasting, anomaly detection, tiered constraint optimization, distributed censoring, online learning, reinforcement learning, network flow optimization, dynamic hierarchical cluster and network partitioning, similar function suggestion, and transfer of knowledge (e.g., via vertex nomination).

The ML device 2330 described herein provides a holistic optimization approach that enables the ML device 2330 to be grid aware and environmentally aware and to dynamically adapt to fast changes. The ML device 2330 also may collect usage data as well as relevant grid and peer status data to dynamically update optimization rules to become more efficient over time (online learning). The ML device 2330 also may coordinate and schedule functions with peer devices by leveraging active or imputed market and grid inputs. The ML device 2330 uses machine learning to predict future grid status and act accordingly. The ML device 2330 also optimizes and dispatches functions of active (i.e. electricity generation), passive (i.e. consumption of electricity), and buffer (i.e. storage) components. The ML device 2330 may further adapt learned actions from similar devices (transfer learning). In sample embodiments described below, the above functions may be combined holistically within one ML device 2330.

Active Monitoring of Local Wiring Status

In sample embodiments, each ML device 2330 makes a short broadcast of its usage status when the device's operational status changes. For example, when a lamp is turned on/off, the compressor of a refrigerator goes on/off, electric car starts/finishes charging, a rooftop solar panel produces greater than or less than certain units (kW) of power, the usage status is broadcast. This status message can be passed to all other ML devices 2330 in the same network/zone either via x10 (https://en.wikipedia.org/wiki/X10_(industry-_standard)), ZigBee (https://en.wikipedia.org/wiki/ZigBee), Wi-Fi (https://en.wikipedia.org/wiki/Wi-Fi) or similar type of communications.

The status broadcast may include (but is not limited to) the following components:
1. A unique identifier (UID) of the ML device 2330;
2. A type identifier of the ML device 2330: energy storage device, energy generator, consumer device, etc.;
3. The time stamp of the broadcast; and
4. Consumption status: on/off.

Each ML device 2330 also may receive these types of communications and choose what information is relevant to keep. The ML device 2330 may build a complete map of its neighboring devices, their operational times, and kWatts/hour consumed by storing information from received broadcasts. In a simple example, a ML device 2330 may keep track of active power consumers in its local network at any given time by keeping a simple counter and incrementing and decrementing the counter based on received consumption/storage/generation status. The ML device 2330 also may monitor the number of devices in its network by keeping an account of the unique identifiers (UIDs) being broadcast. This account can be exact or approximate, depending on the memory capacity of the ML device 2330 and its needs for accuracy. When approximate accounting is used, the ML device 2330 can use probabilistic accounting methods such as a bloom filter (https://en.wikipedia.org/wiki/Bloom_filter) or a hyper-log-log (https://en.wikipedia.org/wiki/HyperLogLog), thus reducing the on-board memory need.

Passive Monitoring of Local Wiring Status

In other sample embodiments, when an electronic appliance turns on, there is a noticeable voltage drop that is detectable by all other connected devices sharing the same local wiring. For example, a light may dim when the refrigerator compressor turns on. By monitoring voltage changes and combining detected changes with an internal clock, a ML device 2330 may keep a time-stamped electricity consumption log local to itself. From this log, the ML device 2330 may infer the number of devices that are powered on at a given time and even infer the number of devices that are connected to the wiring, without being explicitly told. If the ML devices 2330 share their local logs with each other, or if the logs are aggregated centrally, then a more comprehensive usage map may be built from the data collected by the individual ML devices 2330.

Active and Passive Monitoring of Local Wiring Status

In further sample embodiments, the active and passive monitoring methods may be combined to detect faults and discrepancies in the system. For example, the passive monitor status may serve as the grand truth, and the difference between the active monitor status and the passive monitor status may be used to detect faulty devices. Discrepancies of collected data between different devises also may be used to detect anomalies.

Optimization of Energy Usage

The ML device 2330 described herein supports a variety of optimization goals. For example, the energy usage may be optimized for grid stabilization, energy conservation, cost reduction, renewable energy usage, or optimization of other user defined parameters. The optimization methods may be conventional or may be developed for particular applications. For example, optimization methods such as those described above for online control of data center batteries may be used, or constraint optimization solutions of the type described below in a sample embodiment may be used to provide dynamic optimization. The respective users may opt in (or not) to provide usage data to the a local network server or a central server of the cloud-based servers 2310 to facilitate wider energy management.

An example of the optimization of a single ML device 2330 or set of similar ML devices 2330 may be found in a data center UPS battery usage dispatch via an LSTM trained against an optimized solution derived from a convex solver following an active signal.

In another example, a plurality of ML devices 2330 may be managed to optimize a local network (household) of different types of devices. For example, several ML devices 2330 may use machine learning techniques to find a desirable state such as the optimal schedule for a set of common household devices: a dishwasher, washer, drier, electric AC/heat unit, electric vehicle (EV) charger, refrigerator, lighting etc. Such an optimization presents a combinatorial optimization problem (COP), with the additional difficulty that the costs associated with each component are dynamic and may vary with time. The associated costs for each component at a given time (t) can be driven by an active signal, for example dynamic electricity pricing during the day, or are inferred from a predictive model, such as estimated availability of renewables. In this optimization problem, there are N components (each consuming some amount of electricity) from which a schedule based on operational rules is to be generated that will get all components to desirable states by the end of a time period T. Thus, the COP framework may be used to establish a cost function for a set goal (e.g., maximum use of renewable energy) that is computed by summing up the energy usage (cost) of running each component that is being monitored.

For example, the desirable state for electric heaters would be a comfortable temperature range of 19-22° C. A desirable state for electric vehicle (EV) chargers could be having its batteries fully charged. A desirable state for a washer/driver could be having the laundries finished. There is an additional constraint that all devices must reach their desirable state within a given time-period, for example 24 hours. Also, due to the current limit in a household, only a small set of electronics can be operated at the same time, before the breaker kicks in.

The framework of learning the COP may be used with a graph broken into 3 steps, as follows:
1. Learn a representation (or embeddings) of nodes (e.g., ML devices 2330) and a partial graph that provides a schedule for respective devices in the graph to train the network as to what to add. The node embeddings may be learned with various conventional algorithms such as adjacent spectra embedding (ASE), Laplacian spectral embedding (LSE), node2vec or autoencoders. A graph representation may be learned using methods like graph2vec, taken as a normalized vector sum of all its node embeddings, or an average of the node embeddings, etc. An example of embedding may be found in the LSTM auto encoder described in datacenter case above. The first LSTM stack in fact generates an embedding.

2. With the embeddings learned in step 1, further learn to nominate a new node into the graph. For example, an attention-based decoder may be used for this step. Steps 1 and 2 should be repeated until no node remains.
3. Evaluate the complete solutions from step 2 against a greedy baseline solution and use this to inform the parameters in the next iteration via paradigms of reinforcement learning (e.g., use gradients to search the parameter space).

Figure 24:
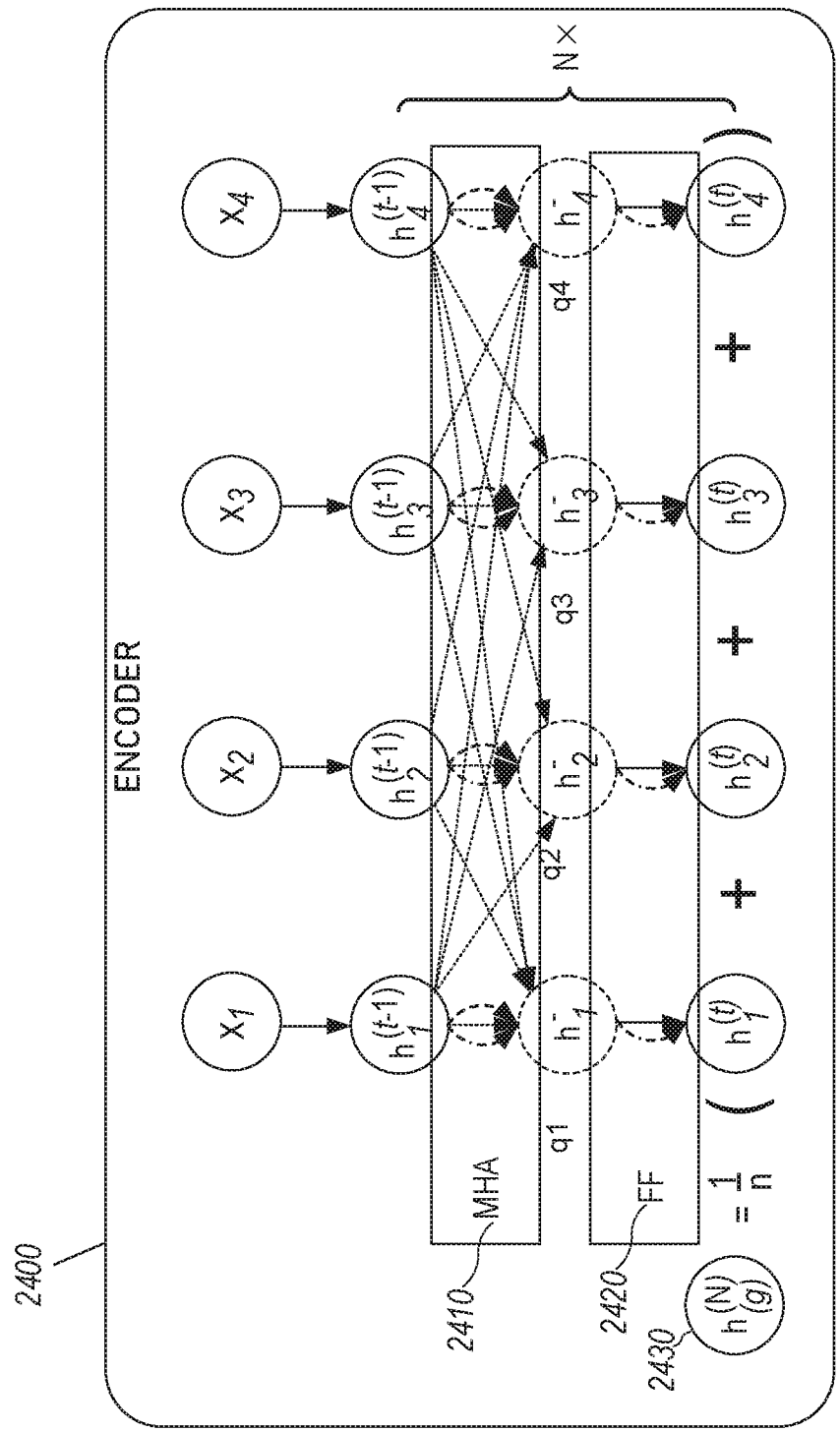
FIG. 24 illustrates an attention based encoder having input nodes embedded and processed by N sequential layers for use in ML-based energy usage optimization in sample embodiments.

An example of a model for learning COP with a graph framework to implement these three steps may be found in an article by Kool, et al. entitled "Attention, Learn to Solve Routing Problems," ICLR 2019 (https://arxiv.org/pdf/1803.08475.pdf), the contents of which are incorporated herein by reference. As described by Kool, et al., an encoder-based architecture of the type illustrated in FIG. 24 may be used to generate node and graph embedding. FIG. 24 illustrates an attention based encoder having input nodes embedded and processed by N sequential layers, each consisting of a multi-head attention (MHA) sublayer 2410 and a node-wise feed-forward (FF) sublayer 2420. The graph embedding 2430 is computed as the mean of node embedding.

Figure 25:
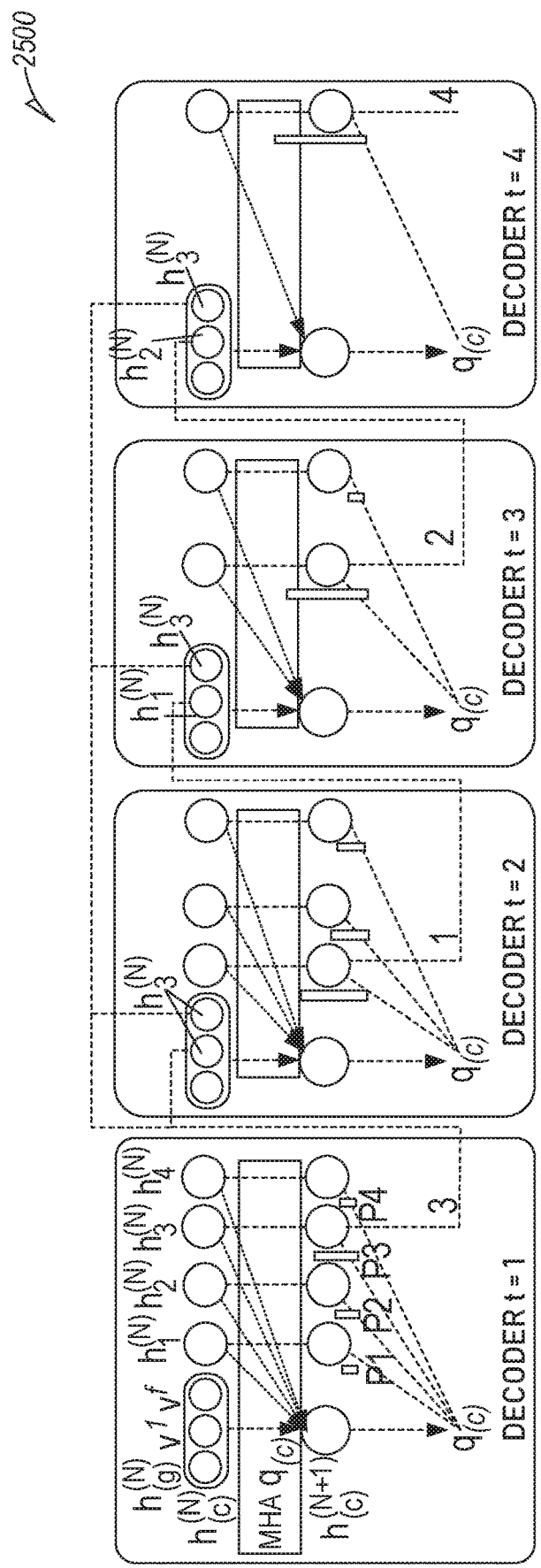
FIG. 25 illustrates an attention based decoder for the traveling salesman problem (TSP) for use in ML-based energy usage optimization in sample embodiments.

As illustrated in the decoder-based architecture shown in FIG. 25, a standard traveling salesman problem may be applied to scheduling to nominate a new node to add to the graph. FIG. 25 illustrates an attention based decoder 2500 for the traveling salesman problem (TSP). The decoder 2500 receives as input the graph embedding and node embeddings. At each time step t, the context consists of the graph embedding and the embeddings of the first and last (previously output) node of the partial tour, where learned placeholders are used if t=1. Nodes that cannot be visited (since they were already visited) are masked. The example in FIG. 25 shows how a tour $\pi=(3, 1, 2, 4)$ is constructed.

The reinforcement learner uses a policy gradient algorithm to speed up training. These modifications to the learning steps 1-3 noted above are not rule-based. For example, Algorithm 1 below (Reinforce with Greedy Rollout Baseline) is described by Kool et al. in the aforementioned article as useful to optimize the expectation of the cost (tour length for TSP) by reducing gradient variance.

Algorithm 1
REINFORCE with Rollout Baseline

1: Input: number of epochs E, steps per epoch T, batch size B, significance $\alpha$
2: Init $\theta$, $\theta^{BL} \leftarrow \theta$
3: for epoch = 1, ..., E do
4:    for step = 1, ..., T do
5:       $s_i \leftarrow$ RandomInstance( ) $\forall i \in \{1, ..., B\}$
6:       $\pi_i \leftarrow$ SampleRollout($s_i$, $p_\theta$) $\forall i \in \{1, ..., B\}$
7:       $\pi_i^{BL} \leftarrow$ GreedyRollout($s_i$, $p_{\theta^{BL}}$) $\forall i \in \{1, ..., B\}$
8:       $\nabla \mathcal{L} \leftarrow \sum_{i=1}^{B} (L(\pi_i) - L(\pi_i^{BL})) \nabla_\theta \log p_\theta(\pi_i)$
9:       $\theta \leftarrow$ Adam($\theta$, $\nabla \mathcal{L}$)

Algorithm 1
REINFORCE with Rollout Baseline

10:    end for
11:    if OneSidedPairedTTest($p_\theta$, $p_{\theta^{BL}}$) < $\alpha$ then
12:       $\theta^{BL} \leftarrow \theta$
13:    end if
14: end for With the greedy rollout as baseline b(s), the function $L(\pi)-b(s)$, where $L(\pi)$ is the expectation of the cost, is negative if the sampled solution $\pi$ is better than the greedy rollout, causing actions to be reinforced, and vice versa. This way, the model is trained to improve over its greedy self. Sampling replaces tree search for exploration and the model is rewarded if it yields improvement ('wins') compared to the best model. The evaluation at the end of each epoch ensures that the solution is always challenged by the best model.

Using such an optimization approach in a sample embodiment, an example solution for the optimization of renewable energy usage could learn the following operations:

1. Stop cooling the house at 9 am, when no one is home.
2. Start the washer/drier from 9 am-12 pm.
3. Charge the EV from 12 pm-2 pm.
4. Start to cool down the house from 2 pm-4:30 pm to 17° C. (a temperature that is lower than desired range of 19°-22° C.).
5. Turn off the air conditioning and let the temperature drift slowly upward as people return home.
6. Run the dishwasher from the electricity stored in the EV's batteries at 8 pm.
7. Run the air conditioning on the EV batteries at 9:30 pm but keep the house at 22° C.
8. Start charging the EV batteries slowly at 4 am, knowing that the EV needs to be fully charged at 8 am. As the day breaks, draw more power from the solar generators.

This example optimizes for use of renewable energy where each component follows operational rules (e.g., keep the house's temperature in the range of 19°-22° C., run the dishwasher between 8 pm and 6 am, charge the EV overnight, and run the washer/drier once per day).

Other types of optimization also may be treated the same way in another instantiation of the same framework. For example, a grid operator may desire to figure out a set of locations to place battery storages so that it will maximize grid stability. The obvious approach might be to co-locate the battery storages with the renewable generators. However, if the transmission line is impacted, it can make both the renewable generator and the stored energy unavailable. This can be framed as an influence maximization problem (for example, using the battery storages in the grid to maximize grid stability as described above). As proposed by Mittal, et al. in "Learning Heuristics over Large Graphs via Deep Reinforcement Learning," Association for the Advancement of Artificial Intelligence (https://arxiv.org/pdf/1903.03332.pdf), (2020), a deep learning framework known as GCOMB may be used to solve such combinatorial problems over graphs at scale. As described by Mittal, et al., the input to the training phase is a set of graphs and the optimization function $f(.)$ corresponding to the combinatorial problem being solved. The output of the training phase is a sequence of two different neural networks with their corresponding learned parameters. In the testing phase, the inputs are identical as in a greedy algorithm, which are the graph G 32 (V,E), the optimization function $f(.)$ and the budget b. The output of the testing phase is the solution set, which is constructed using the learned neural networks from the training phase.

The optimizations may be implemented in an aggregated ML device 2330 that operates as a controller or in a remote server in the cloud-based servers 2310. In the latter case, the collected data is pushed to the cloud for processing and management. The ML devices 2330 may perform device optimization for the connected devices (like the data center battery embodiment described above), may optimize devices in a local network, and may/or optimize different devices (e.g., dishwasher, dryer, air-conditioner, etc.) relative to each other by, for example, establishing an operational schedule.

Figure 26A:
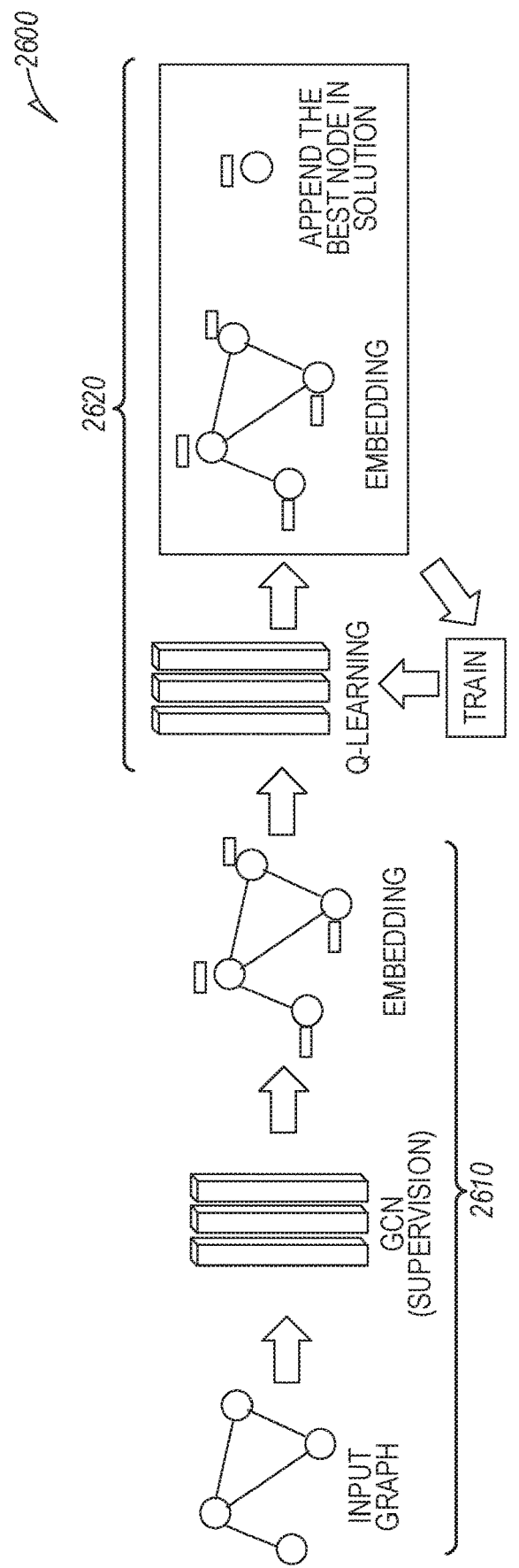
FIG. 26A illustrates a flow chart of the training phase of the GCOMB pipeline for identifying potential ML-based energy usage optimization solutions in a sample embodiment.

FIG. 26A illustrates a flow chart of the training phase of the GCOMB pipeline 2600 as described by Mittal, et al. For example, in the household appliance scheduling example above, each node represents a household appliance (dishwater, laundry machine, EV charger, solar panel, etc.). Scheduling the appliances would be the equivalent of building a graph in the TSP. As illustrated, the training phase may be divided into two parts: a network embedding phase 2610 through a Graph Convolutional Network (GCN) and a Q-learning phase 2620. Given a training graph and its solution set, the GCN generates embeddings of the nodes (electronics) based on their attributes (converts electronics from attribute space to vector space). The system then goes into a reinforcement learning loop including the Q-learning framework 2620 where the inputs are the embeddings. At each step, the system tries to find the next node (electronics) to add to form a scheduling graph. This process is repeated until no nodes are left, resulting in the schedules for the electronics. Further details may be found in Mittal, et al.'s paper, which is incorporated herein by reference.

Figure 26B:
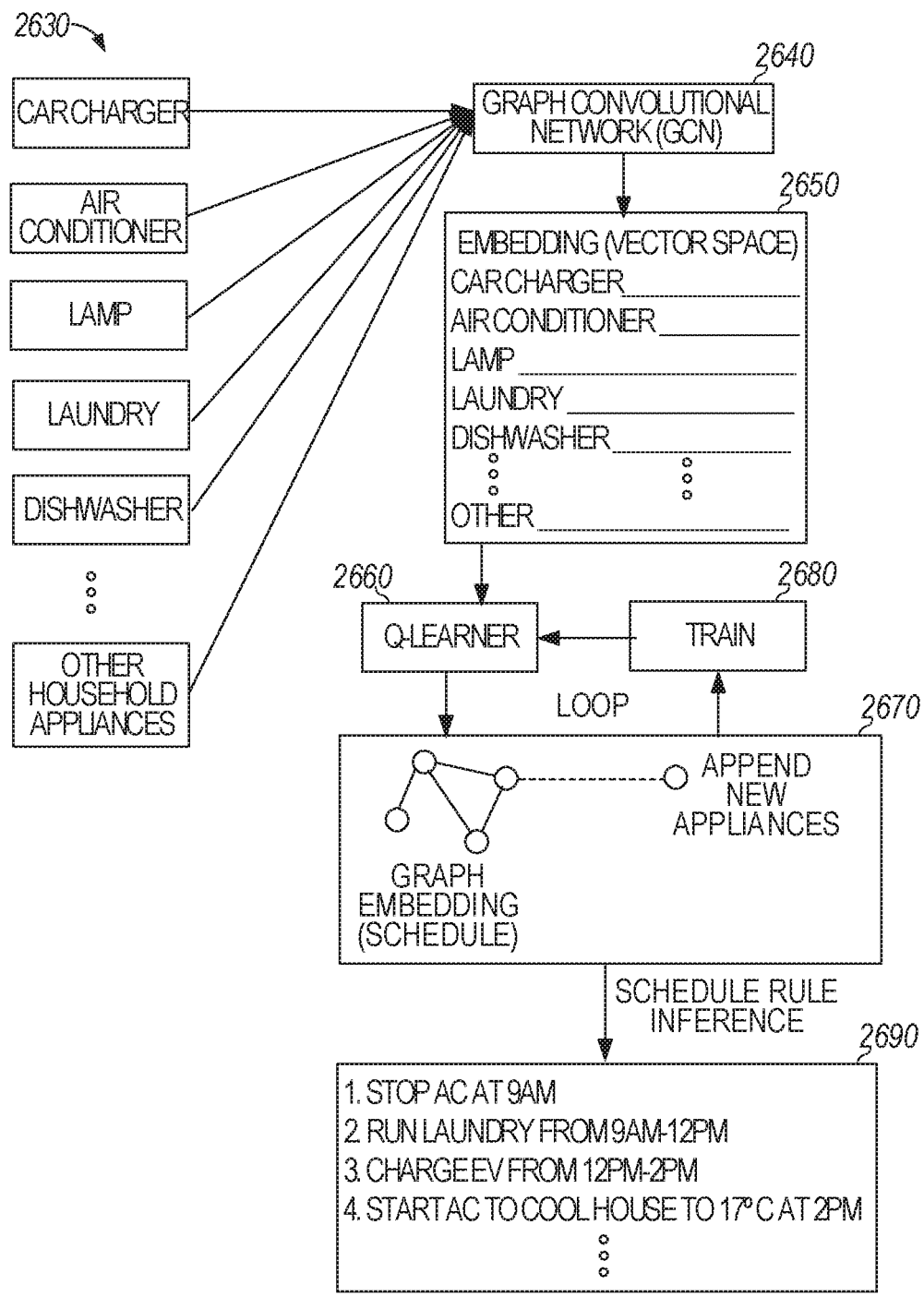
FIG. 26B illustrates a flow chart of the operation of ML devices implementing a GCOMB pipeline to manage household electrical devices in a sample embodiment.

FIG. 26B illustrates a flow chart of the operation of ML devices 2330 implementing a GCOMB pipeline to manage household electrical devices to implement the optimizations described above. As illustrated, the household electrical devices 2630 provide their attributes to a GCN 2640 that learns the network embeddings for the respective devices and creates an embedding 2650 in vector space. The embeddings 2650 are fed to Q-learning framework 2660, which predicts at 2670 the nodes that would collectively form a good solution set. At each step, the system tries to find the next node (electronics) to add to form a scheduling graph. This process is repeated until no nodes are left, resulting in the schedules for the electronics. These nodes are then used to train at 2680 the Q-learning framework 2660 to continue optimization in a feedback loop. The resulting schedule rule inference creates the schedule 2690 representing the energy usage optimization of the respective devices 2330. In sample embodiments, software implementing the GCOMB pipeline may be incorporated into ML controllers such as those described below with respect to FIG. 27 through FIG. 32.

Learned knowledge via embedding may be transferred by following the above methods. After embeddings are created for nodes, these learnings may be transferred from one problem component to another. For instance, if a new ML device 2330 is introduced where there is no prior operational guide attached to it, a set of operational rules may be suggested based on the same idea of vertex nomination where the new nodes' nearest neighbors in the embedding space may be identified and used to suggest the rules. The nearest neighbor may be found using a distance function, for example, a Euclidian or Cosine distance. Thus, if the example ML device 2330 is closest in distance to dishwashers in the embedding space, the ML device 2330 might be suggested to operate using the same parameters as dishwashers in the environment. In sample embodiments, a human would have the power to change or discard the suggestion. Also, the distance function may be applied in higher dimensions based on the representation of the data by the ML device 2330 as embeddings are usually more than 3 dimensions.

Sample Network Configurations for ML Devices

FIGS. 27-30 illustrate sample configurations of the ML devices 2330 described herein in different network configurations for implementing the energy usage optimizations described above.

Figure 27:
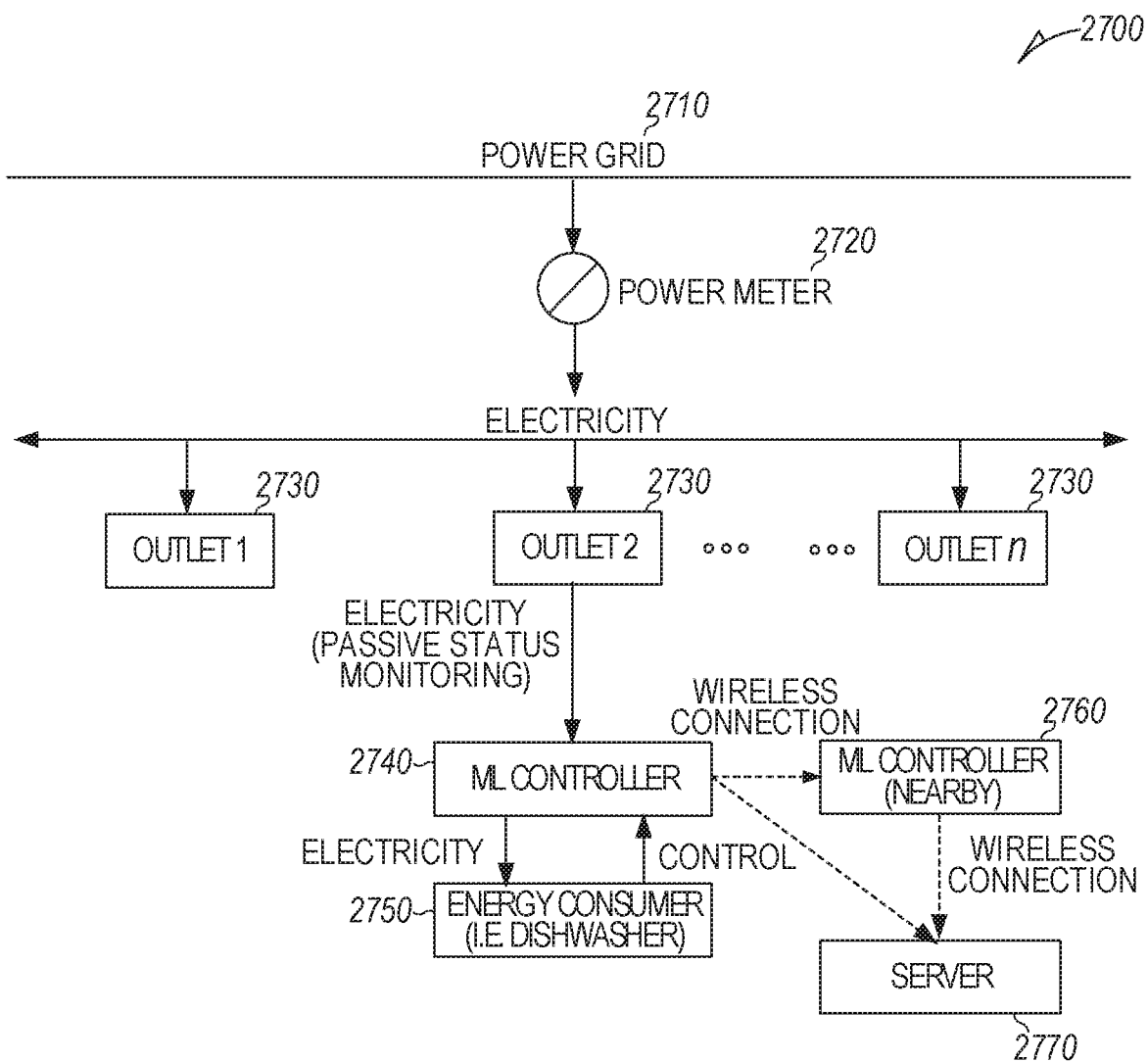
FIG. 27 illustrates a single household single consumer network implementing ML devices in a sample embodiment.

FIG. 27 illustrates a single household single consumer network 2700 implementing ML devices in a sample embodiment. As illustrated, the single consumer's home (e.g., detached single family home) is connected to the power grid 2710 via a power meter 2720 that monitors the consumer's energy usage. The electricity that passes through the power meter 2720 is routed through the house to electric outlets 1, 2, ... N 2730. As illustrated, one or more of the electrical outlets 2730 may have a ML controller 2740 that passively monitors the status of electricity usage of an associated energy consuming device 2750, such as a dishwasher, that is connected to that electrical outlet 2730 via the ML controller 2740. For example, the ML controller 2740 may count energy cycles and voltage drops that may occur when other devices on the same circuit turn on and start drawing more electricity. The electricity passes through the ML controller 2740 to the energy consuming device 2750, and control information, such as energy usage in kWatts/hour and timing of activation are provided as control signals back to the ML controller 2740 for use in monitoring and reporting the energy usage of the energy consuming device 2750. This information is also useful for the device to schedule the functioning of the electronic component attached to it. For example, it could suggest a time where the least amount of electronics in the same circuit are turned on, thus ensuring stability of that circuit.

In optional alternate configurations, the ML controller 2740 of FIG. 27 may communicate with one or more other nearby ML controllers 2760 that monitor other energy consuming devices (not shown) and/or a server 2770 via one or more wireless connections (e.g., Wi-Fi). The server 2770 may be located locally or remotely, for example, in the cloud-based servers 2310. In this latter case, the wireless connection would connect the ML controller 2740 to a node connected to the Internet for communication with the server 2770. In the alternative configuration, the control information from the monitored energy consuming device 2750 may be provided to the ML controller 2760 for use in regulating the frequency and timing of operation of connected energy consuming devices and/or to the server 2770 for processing (for example, by implementation of one or more of the optimization functions described above). better optimize their own functions. Also, the discrepancy between actively shared status and what has passively been monitored by each device could also give a clue regarding anomalies or malfunctions in the circuit.

Figure 28A:
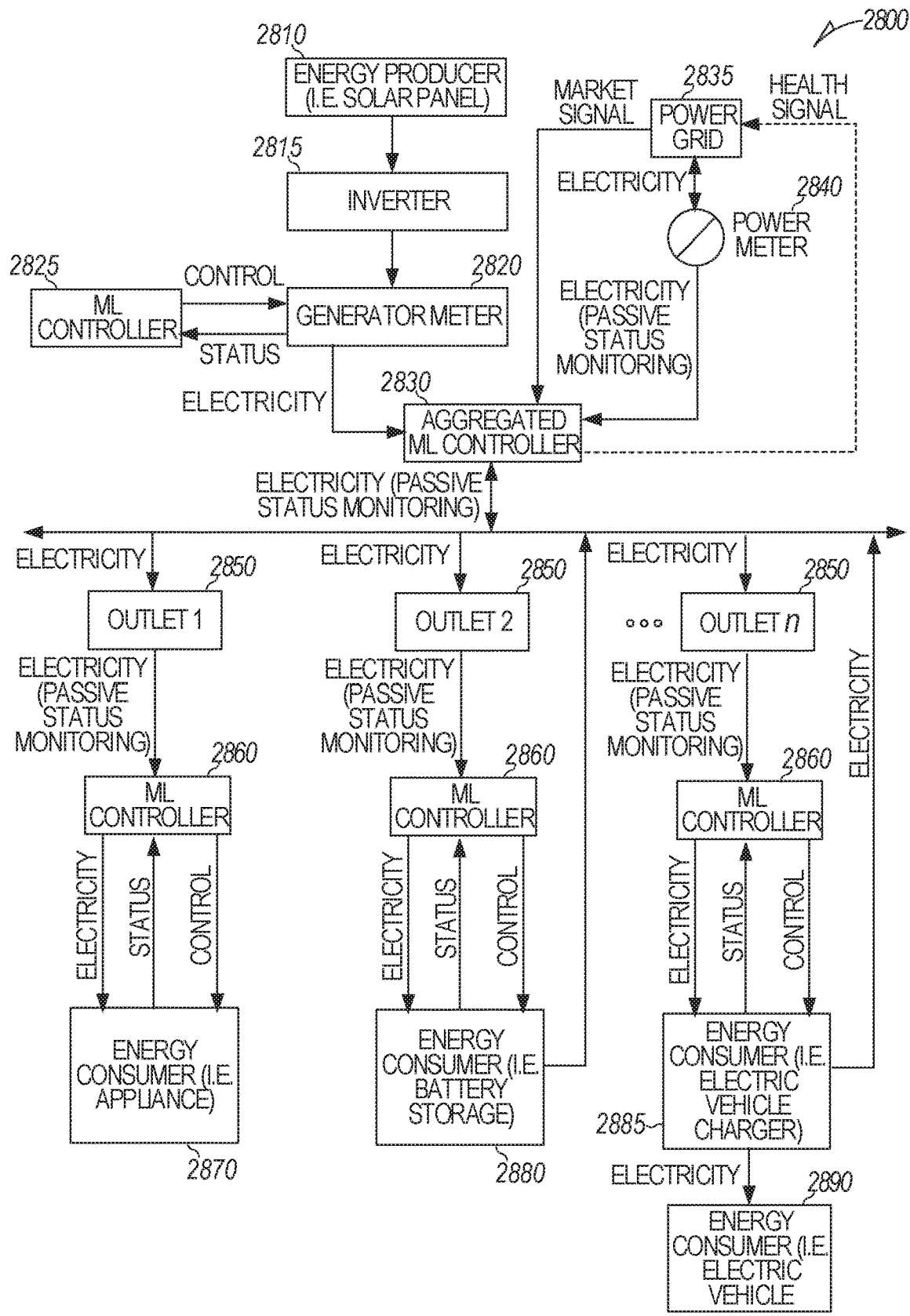
FIG. 28A illustrates a single household multi-consumer network implementing ML devices in a sample embodiment.

FIG. 28A illustrates a single household multi-consumer network 2800 implementing ML devices in a sample embodiment. In this embodiment, the single household further includes an energy producing source 2810 such as a solar panel. The energy produced by the energy producing source 2810 is inverted by inverter 2815 that converts the variable direct current (DC) output of the energy producing source 2810 into a utility frequency alternating current (AC) that can be fed into the electrical grid or used locally. A generator meter 2820 monitors the provided AC power and provides status signals to a ML controller 2825 that, in turn, provides control signals to the generator meter 2820 to, for example, regulate the usage of the renewable energy provided via the solar panels 2810. The generated electricity is provided to an aggregated ML controller 2830 that also receives electricity from the power grid 2835 via a power meter 2840 that monitors the electricity pulled from the power grid 2835. The electricity that passes through the power meter 2840 is provided to the aggregated ML controller 2830 along with passively acquired status data from the power meter 2840. A regulation market signal such as the PJM market signal described above may also be supplied to the aggregated ML controller 2830 from the power grid 2835. As illustrated in FIG. 28A, the aggregated ML controller 2830 optionally may process the market signal and the received electricity using the techniques described in the data center embodiment above to generate a health signal that indicates, for example, the stability of the electrical signals received from the power grid 2835.

It will be appreciated that the aggregated ML controller 2830 may switch the energy source from the power grid 2835 to solar panel 2810, or use a combination of the two, or even push electricity into the power grid 2835, based on the grid status (both active signal and passively monitored), solar panel production rate, house-hold consumption, and optimization goal. Another possible outside signal could be the dynamic electricity pricing.

The aggregated ML controller 2830 provides the electricity to the respective electric outlets 1, 2, . . . N 2850 in the consumer's home. As illustrated, one or more of the electrical outlets 2850 may have a ML controller 2860 that passively monitors the status of electricity usage of an associated energy consuming device such as appliance 2870 (e.g., dishwasher), an associated energy storage device 2880 (e.g., a battery), and an associated electrical charging device 2885 (e.g., an electric vehicle charger that charges an electrical vehicle 2890), where devices 2870, 2880, and 2885 are connected to respective electrical outlets 2850 via respective ML controllers 2860 that provide electricity and control signals to the devices 2870, 2880, and 2885 in response to received status data. In this example, both the energy storage device 2880 and the electric vehicle 2890 may inject electricity into the local electricity network. The solar panel 2810 can also inject electricity. In these examples, they can either inject into the circuit for house-hold consumptions (behind the meter) or even inject electricity back into the grid, if needed.

The aggregated ML controller 2830 also may regulate the local electricity network to maintain the quality of the electricity signal provided to the respective electrical outlets 2850. As in the embodiment of FIG. 27, the respective ML controllers 2860 may count energy cycles and voltage drops that may occur when other devices on the same circuit turn on and start drawing more electricity. The energy usage in kWatts/hour and timing of activation are provided as status signals back to the ML controller 2860 for use in monitoring and reporting the status of the respective devices 2870, 2880, and 2885. With this status, the device 2830 can thus schedule appliances, chargers, batteries and direct generated electricity from the solar panel and stored energy from the batteries and EV.

Figure 28B:
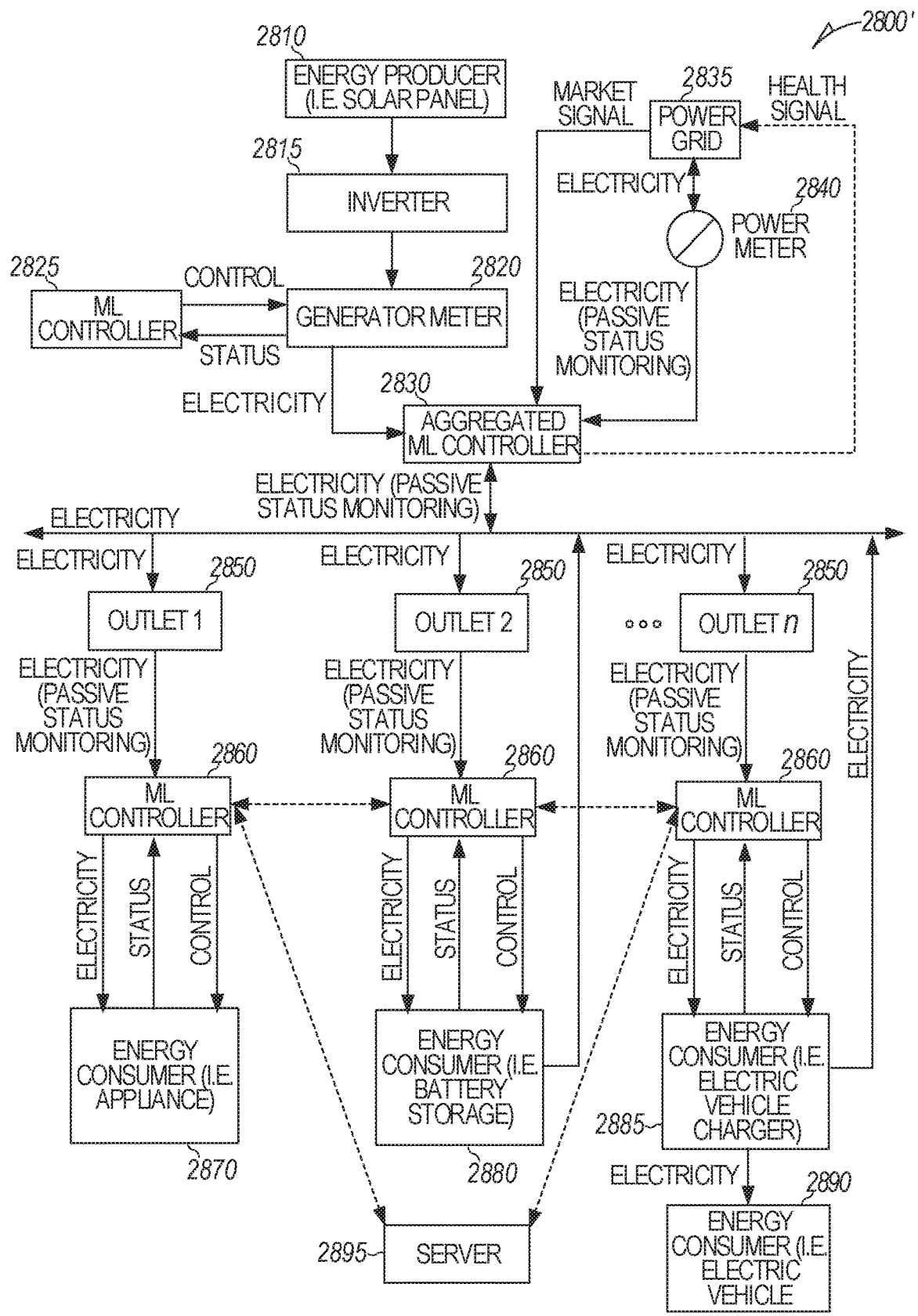
FIG. 28B illustrates an alternate configuration of a single household multi-consumer network implementing ML devices in a sample embodiment.

FIG. 28B illustrates an alternate configuration of a single household multi-consumer network 2800' implementing ML devices in a sample embodiment. In the configuration of FIG. 28B, the ML controllers 2760 may communicate with one or more other nearby ML controllers 2760 that monitor other energy consuming devices and/or a server 2895 via one or more wireless connections (e.g., Wi-Fi). The server 2895 may be located locally or remotely, for example, in the cloud-based servers 2310. In this latter case, the wireless connections would connect the ML controllers 2860 to a node connected to the Internet for communication with the server 2895. In this configuration, the control information from the monitored devices 2870, 2880, and 2885 may be provided to other respective ML controllers 2860 for use in regulating the frequency of the power grid and the timing of operation of respective connected energy consuming devices and/or to the server 2860 for processing (for example, by implementation of one or more of the optimization functions described above).

Figure 28C:
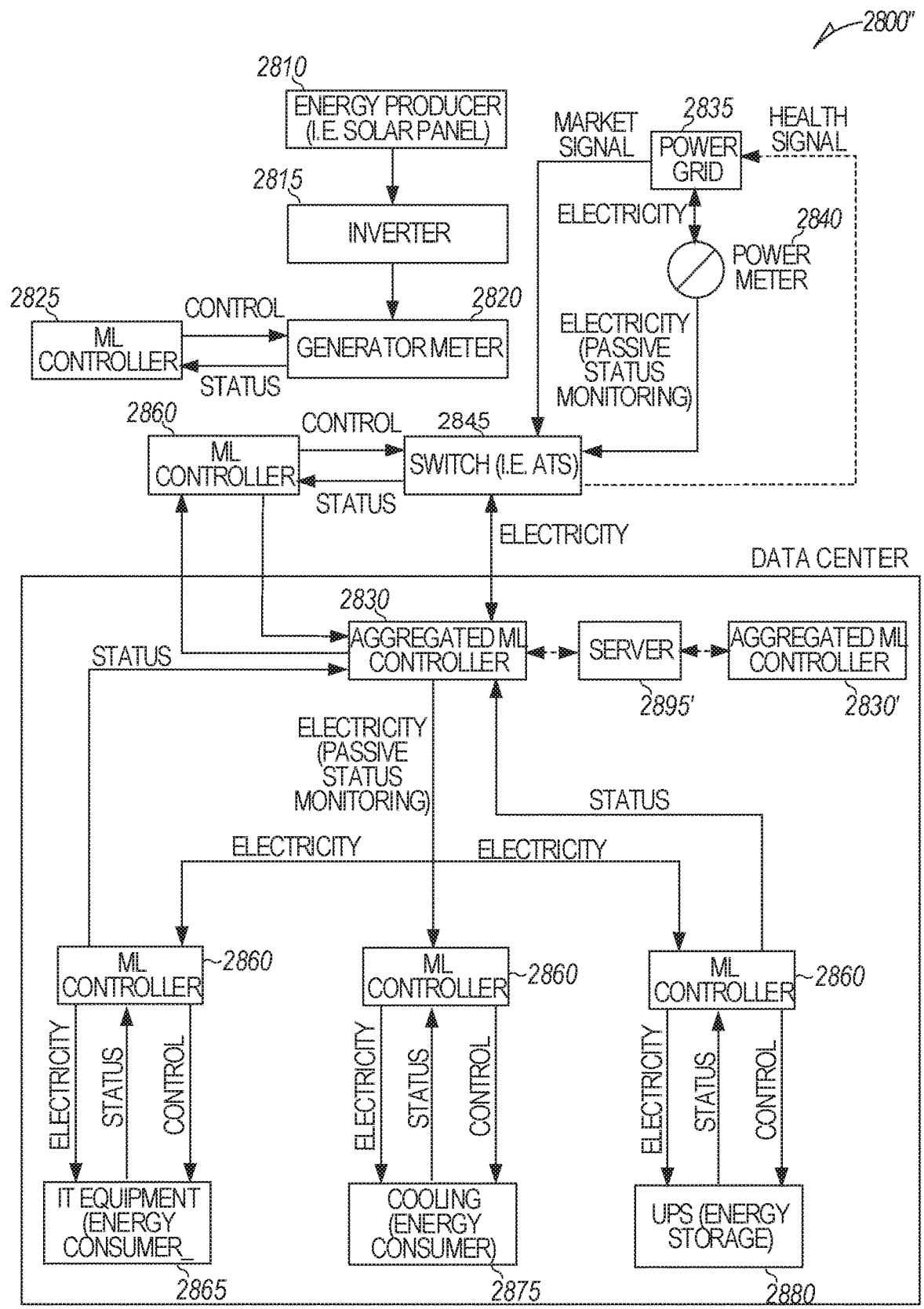
FIG. 28C illustrates a configuration of a data center implementing ML devices in a sample embodiment.

FIG. 28C illustrates another alternate configuration of a single household multi-consumer network 2800" implementing ML devices in a sample embodiment. In the configuration of FIG. 28C, the consumer network includes a data center implementing ML devices. In the embodiment of FIG. 28C, a switch 2845 (e.g., an automatic transfer switch that switches an electricity supply to a standby source) may be placed between the electricity sources 2810 and 2835 and the aggregated ML controller 2830, and an additional ML controller 2860 may monitor the status of the switch 2845 and provide control signals consistent with the optimization functionality implemented by the respective ML controllers 2860. The switch 2845 allows the datacenter to switch the power source from the power grid 2835 to the solar panel 2810, or to battery storage 2880, or use a combination of these sources. Switch 2845 also allows pushing of energy back onto the power grid 2835. The decision of which source and how much from the source depends on the power grid status, solar panel production, datacenter consumption, etc. As illustrated, the aggregated ML controller 2830 may communicate with a wired or wireless connection (e.g., Wi-Fi) with a server 2895' that, in turn, may communicate with one or more additional local aggregated ML controllers 2830' via a wired or wireless connection. Since the storage compacity on devices can be limited, the server 2895' may store historic monitoring status from all devices. The server 2895' may also provide a more holistic optimization since it has an overview and data from all devices. As also illustrated, the ML controllers 2860 monitor other energy consuming devices 2865 and 2875 as well as energy storage devices 2880. Based on the optimization goals set and the monitoring status gathered and stored, all the ML controllers 2860 may dispatch their connected components function. A grid stabilization example by providing frequency regulation is given above.

Figure 29:
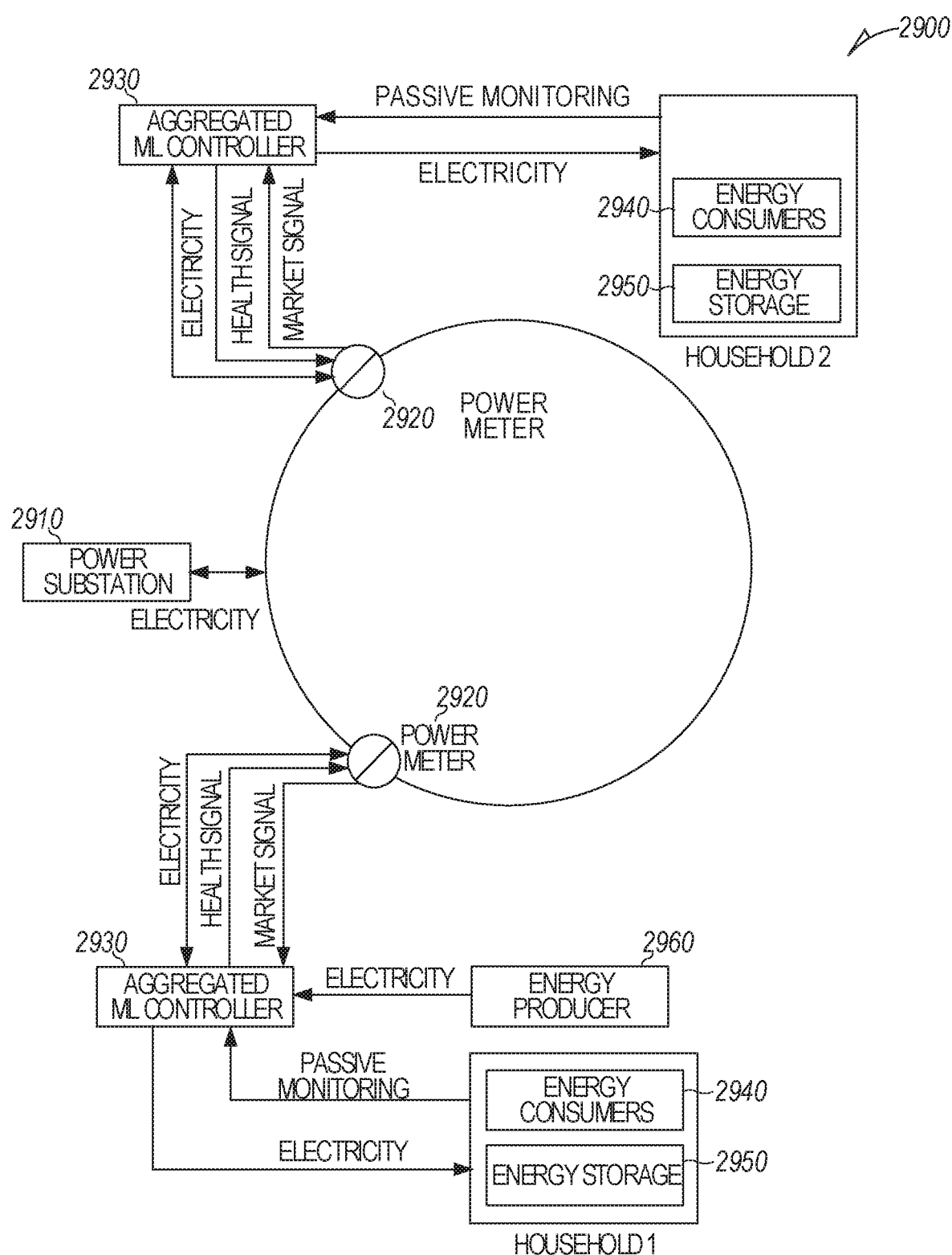
FIG. 29 illustrates a multi-household network from the viewpoint of the electricity power grid in a sample embodiment.

FIG. 29 illustrates a multi-household network 2900 from the viewpoint of the electricity power grid in a sample embodiment. In the embodiment of FIG. 29, a power substation 2910 provides electricity to a local power grid of network of homes or businesses. The respective households are connected to the power grid via power meters 2920 in a conventional manner. The respective power meters 2920 provide the market signal (e.g., PJM market signal) to the aggregated ML controller 2930 of the type described herein. In turn, the aggregated ML controller 2930 provides to the power grid via the power meter 2920 a health signal that indicates, for example, the stability of the electrical signals received from the power grid. In turn, the aggregated ML controller 2930 provides electricity to electricity consuming devices 2940 (e.g., heating/cooling units, electronics, appliances, ventilation, lighting, etc.) that are monitored by respective ML controllers (not shown) and provide passive monitoring signals back to the aggregated ML controller 2930. Similarly, the aggregated ML controller 2930 provides electricity to electricity storage devices 2950 (e.g., batteries, electronic vehicle charger, etc.) that are monitored by respective ML controllers (not shown) to provide passive monitoring signals back to the aggregated ML controller 2930 as well as electricity that may be injected into the local network and/or the power grid. Also, as shown for household 1, the aggregated ML controller 2930 may also receive electricity from a local energy producing device 2960, such as solar panels. In sample embodiments, the aggregated ML controllers 2930 may communicate with a local server (not shown) and/or cloud based server 2310 using techniques of the type described with respect to the embodiments of FIG. 27 and FIG. 28. In such a case, the server may receive energy usage monitoring data from multiple households to provide optimization techniques to the received data and to communicate appropriate control signals back to the respective aggregated ML controllers for control of energy usage by the respective households. In addition to the monitoring functionality, it will be appreciated that the respective ML controllers 2930 may optimize the function of respective downstream components based on available information.

Figure 30:
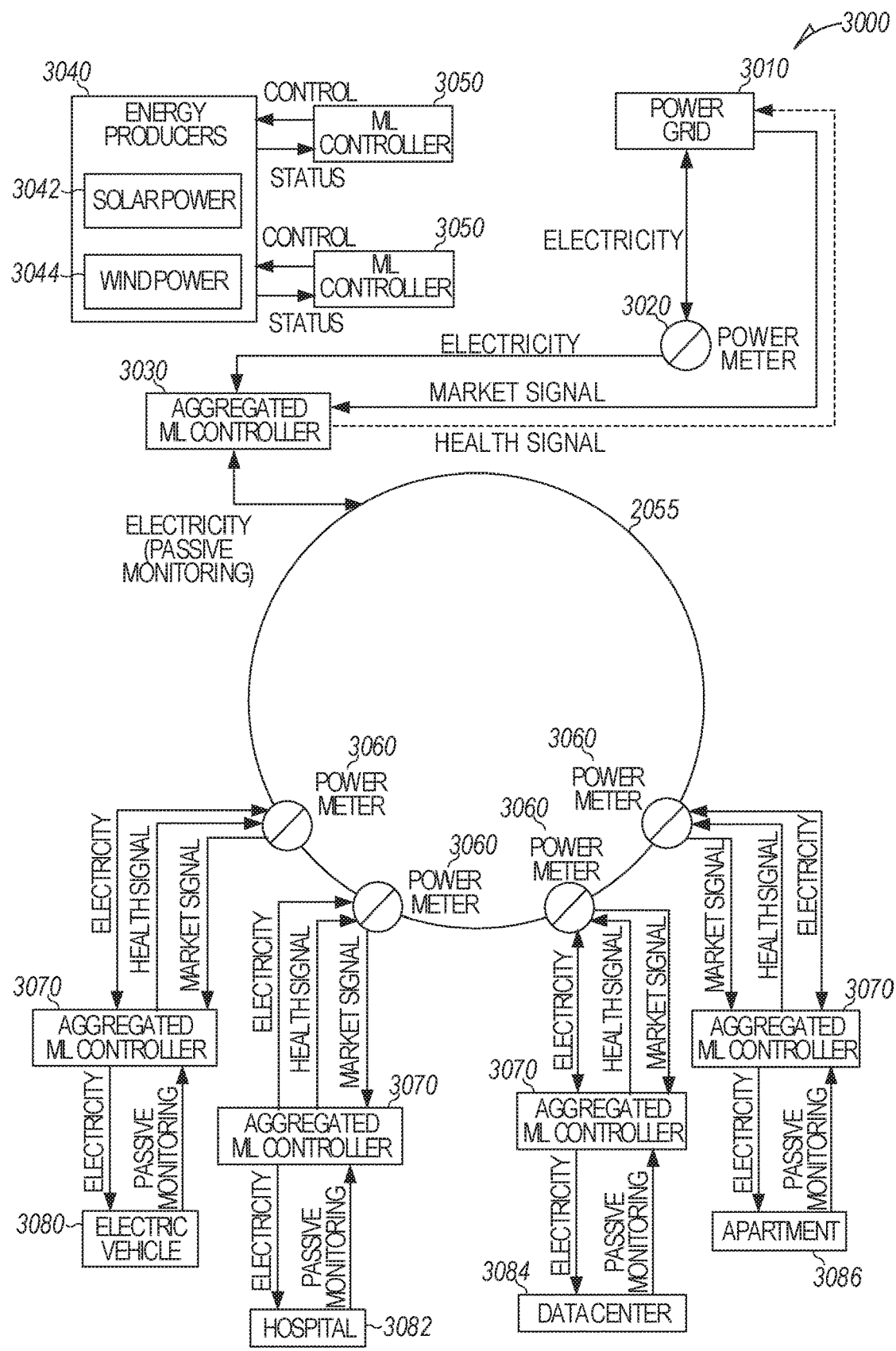
FIG. 30 illustrates a view of the electricity power grid implementing ML controllers to manage energy distribution and usage in a sample embodiment.

FIG. 30 illustrates a view of the electricity power grid 3000 implementing ML controllers to manage energy distribution and usage in a sample embodiment. As illustrated, the power grid 3010 provides electricity to an aggregated ML controller 3030. The power meter 3020 monitors the electricity usage for billing purposes. The aggregated ML controller 3030 receives the market signal (e.g., PJM market signal) from the power grid 3010 and provides to the power grid 3010 a health signal that indicates, for example, the stability of the electrical signals received from the power grid 3010. The aggregated ML controller 3030 also receives electricity from energy producers 3040, which may include solar power producers 3042, wind power producers 3044, and the like. The aggregated ML controller 3030 may also receive weather data and the high level market signal from the power grid 3010 for determining the appropriate load shedding and load throttling, dispatching of stored energy, instructing signal power plants to produce less or more energy, etc., using techniques of the type described above with respect to the data center embodiment. As in other embodiments, the energy producers 3040 provide status signals to associated ML controllers 3050 that, in turn, provide control signals to the energy producers 3040 for optimizing the energy production and distribution using the ML optimization techniques described herein.

The electricity from the power grid 3010 and the energy producers 3040 is monitored by the aggregated ML controller 3030 and provided to energy consumers connected to the local power grid 3055. Respective energy consumers are connected to the local power grid 3055 via respective power meters 3060. Each power consumer receives the electricity and market signal via its associated power meter 3060 and, in turn, provides a health signal back to the power meter 3060 for sharing with other aggregated ML controllers 3030 and 3070. Each aggregated ML controller 3070 provides the received electricity to electricity consuming devices such as an electric vehicle 3080 and/or to hospitals 3082, data centers 3084, apartments 3086, single family homes, businesses, etc. The energy usage and the state of the electricity signal are monitored by the respective aggregate ML controllers 3070 and the respective health signals based on the monitoring data is provided to the power meters 3060 for sharing with other aggregated ML controllers 3070 and 3030 as described above. In sample embodiments, the aggregated ML controllers 3030 and 3070 may communicate with each other and/or cloud based servers 2310 using techniques of the type described with respect to the embodiments of FIG. 27 and FIG. 28. In such a case, the servers 2310 may receive energy usage monitoring data from multiple aggregated ML controllers 3070 to provide optimization techniques to the received data and to communicate appropriate control signals back to the respective aggregated ML controllers 3070 for control of energy distribution and usage by the respective energy consumers.

Figure 31:
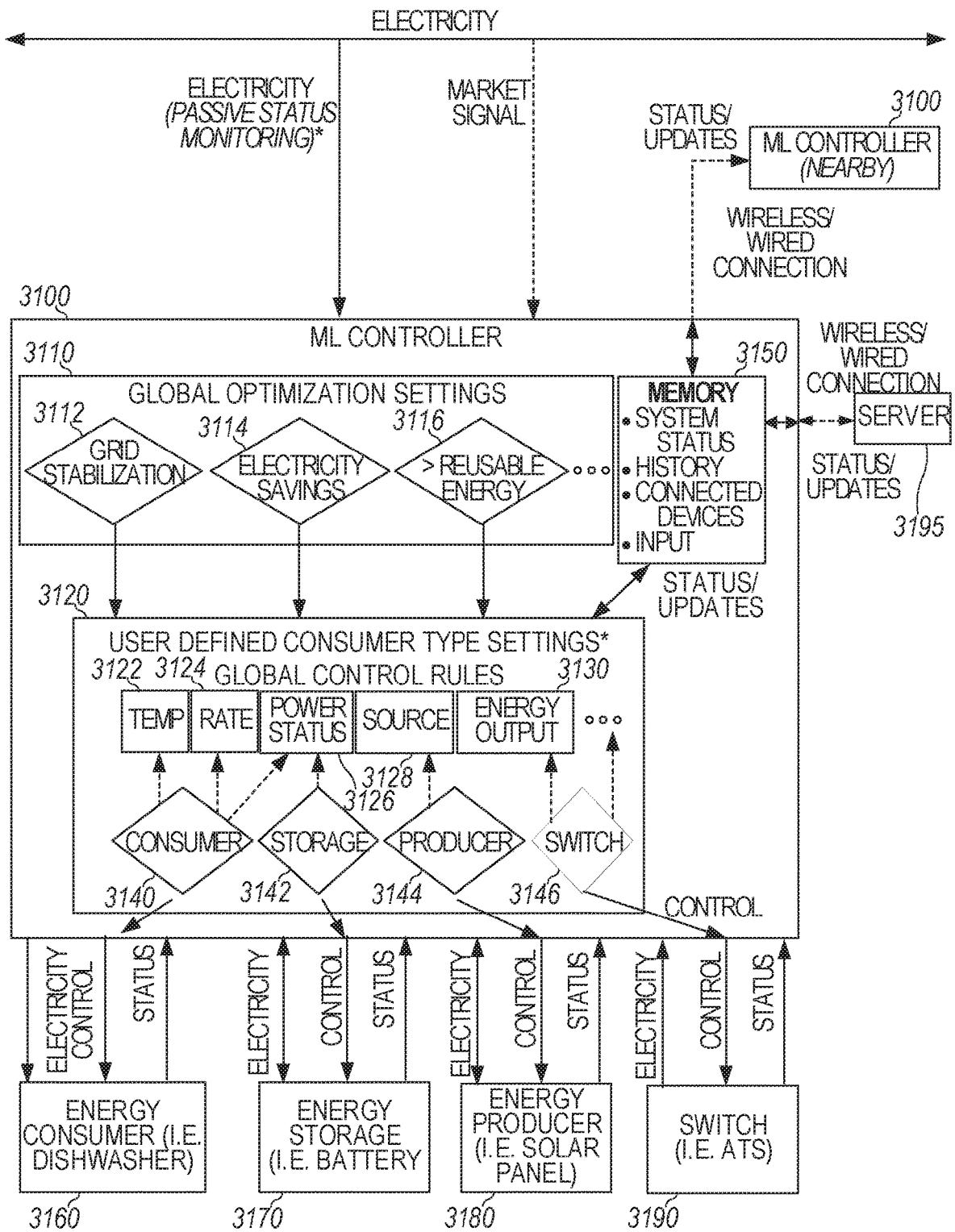
FIG. 31 illustrates a sample embodiment of a ML controller.

FIG. 31 illustrates a sample embodiment of a ML controller 3100. As described above, the ML controller 3100 is configured to passively and/or to actively monitor the status and electricity usage of associated devices. The ML controller 3100 may be software (e.g., loaded into a processor of an appliance) or a physical box (e.g., smart plug) that includes processing elements that implement machine learning routines for processing parameters derived from received status signals from attached energy consuming, energy generating, or energy storage devices in accordance with user-defined rules to produce control signals for the associated devices. The ML controller 3100 is also aware of its surroundings as it may detect the status of nearby devices from the status of the power line to which the ML controller 3100 is connected. For example, if a local device turns on and causes a temporary power drop on the power line, such as drop may be detected by the ML controller 3100.

As illustrated, the ML controller 3100 includes optimization settings 3110 that may be selected by the user. As noted above, such settings may include grid stabilization settings 3112, electricity savings settings 3114, maximizing reusable energy settings 3116, and the like. In sample embodiments, the settings are provided by the user to control the optimization by the optimization algorithms such as those described above with respect to FIGS. 24-26. In accordance with the provided optimization settings 3110, the ML controller 3100 generates user-defined consumer type settings (parameters) 3120. If the consumer type settings 3120 are not set by the user, default settings or aggregated ML controller settings will be used. The settings also may be inferred by transfer learning techniques. By way of example, the user-defined consumer type settings 3120 are implemented using rules relating to parameters such as temperature 3122, rate (e.g., kWatts/hour) 3124, and power status 3126 for an energy consumer 3140, power status 3126 for an energy storage device 3142, energy source 3128 identifying one or more energy producers 3144, and energy output 3130 under control of switch 3146, and the like. The ML controller 3100 enables separate optimizations for each ML controller 3100 as well as passive collaboration amongst the ML controllers 3100 through data sharing.

The ML-driven optimization processes use the provided optimization settings and associated rules and parameters in conjunction with monitored values like energy consumption by associated energy consuming devices, voltage drops, frequency cycle count, grid status, and the like. Monitored parameters may be provided to and drawn from a memory 3150 that keeps a log of system status, electrical usage history, a list of connected devices, respective inputs, and the like. These parameters are passively monitored from associated devices such as an energy consuming appliance 3160, an energy storage device 3170, and energy producing device (e.g., solar panel) 3180, and an ATS switch 3190, for example. The status updates may be stored in then memory 3150. The control signals generated by the ML-driven optimization routines are provided to the respective devices 3160-3190.

In alternative embodiments, the ML controller 3100 may be equipped with a transceiver (not shown) in order to communicate status/update data wirelessly (e.g., via Wi-Fi) or by wire to/from another nearby ML controller 3100 or with a local or remote server 3195 as described above with respect to FIGS. 27-28.

Figure 32:
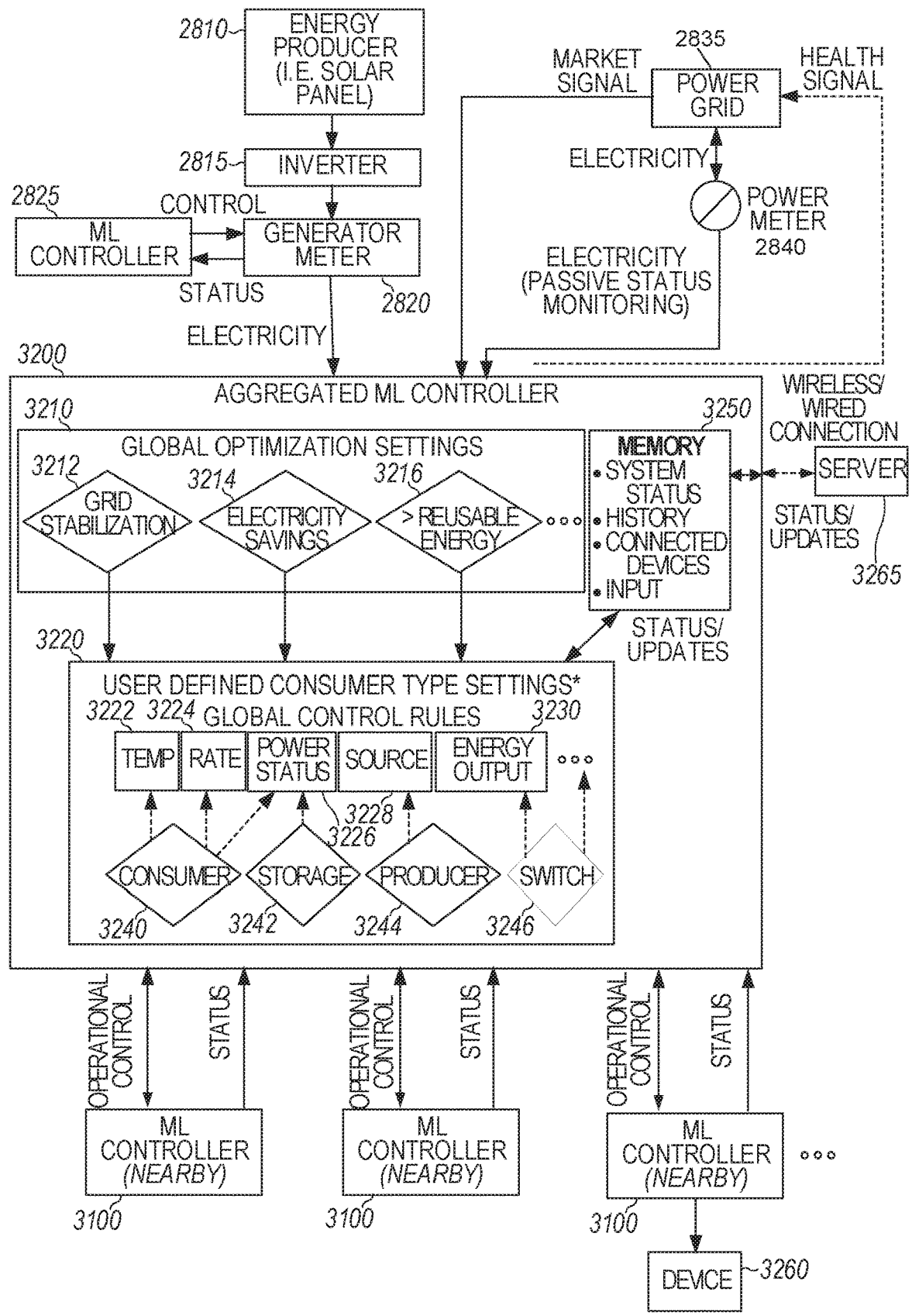
FIG. 32 illustrates a sample embodiment of an aggregated ML controller.

FIG. 32 illustrates a sample embodiment of an aggregated ML controller 3200. As in the embodiments of FIGS. 28A-28C above, the aggregated ML controller 3200 may monitor electricity received from the power grid 2835 and local energy producers such as a solar panel 2810 via power meter 2840 and generator meter 2820, respectively. The aggregated ML controller 3200 operates in essentially the same manner as the ML controller 3100 except that the memory 3250 must be larger to accept data from multiple sources, the control rules 3220 are global control rules that apply across all monitored devices, and the optimization is generalized across all types of devices (e.g., energy consumers, energy producers, and energy storage devices). The aggregated ML controller 3200 receives status data from nearby ML controllers 3100 either through wired or wireless connections (e.g., Wi-Fi) and provides operational control signals derived from the monitored parameters by the ML optimization routines. The operational control data is processed by the respective ML controllers 3100 to, in turn, provide control signals to connected devices such as device 3260.

In alternative embodiments, the aggregated ML controller 3200 may be equipped with a transceiver (not shown) in order to communicate status/update data wirelessly (e.g., via Wi-Fi) or by wire to/from a local or remote server 3265 as described above with respect to FIGS. 27-28. The aggregated ML controller 3200 operates the same as the ML controller 3100 except that is communicates with and aggregates inputs from other ML controllers 3100.

In sample embodiments, each ML controller 3100 and/or each aggregated ML controller 3200 may implement a transfer learning system whereby each new device added to the device network may receive suggestions from the ML controller 3100 and/or aggregated ML controller 3200 as to how to optimally connect to the power grid. In such cases, the ML controller 3100 and/or aggregated ML controller 3200 may transfer knowledge and rules data to the new device for its initial operation.

Figure 33:
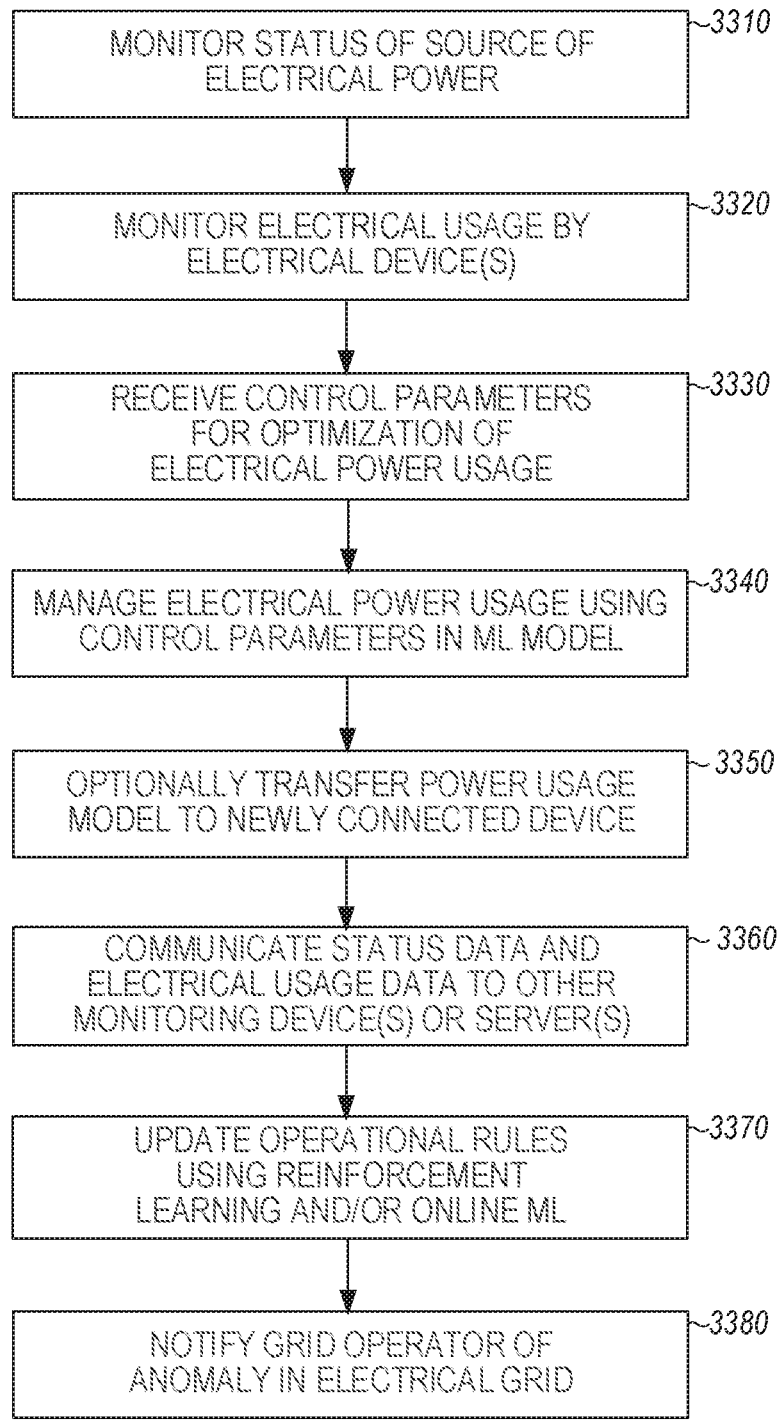
FIG. 33 illustrates a method of managing energy usage of electrical devices using ML controllers and/or aggregated ML controllers in sample embodiments.

FIG. 33 illustrates a simplified flow chart of the operation of a sample embodiment of a method for managing energy usage of electrical devices including a control module that monitors status of a source of electrical power to one or more electrical devices and processes the electrical usage of the one or more electrical devices in a machine learning model that creates a predictive usage model that predicts demands by the one or more electrical devices for the electrical power and that predicts availability of the electrical power at the times the electrical power is demanded by the one or more electrical devices. The system may optimize renewable energy utilization, power grid stabilization, cost of electrical power usage, and the like.

As illustrated in FIG. 33, the method 3300 of managing energy usage of electrical devices includes the operations of monitoring the status of a source of electrical power to one or more electrical devices (3310) and monitoring electrical usage of the one or more electrical devices that receive electricity from the source of electrical power (3320). The control parameters for optimization of electrical power usage are received by the one or more electrical devices (3330), and electrical power usage by the one or more electrical devices is managed using the control parameters, the status of the source of electrical power, and the electrical usage of the one or more electrical devices (3340). In sample embodiments, a machine learning model manages the electrical power usage at operation 3340 by creating a predictive usage model for the source of electrical power and for the electrical devices that predicts demands by the one or more electrical devices for the electrical power and that predicts availability of the electrical power and of renewable power at the times the electrical power is demanded by the one or more electrical devices. The predictive usage model may include a long short-term memory machine learning based prediction model that forecasts demand on the source of electrical power by the one or more electrical devices from historical data. In sample embodiments, managing the electrical power usage includes selecting the control parameters to optimize renewable energy utilization, power grid stabilization, smoothing out of transient irregularities in the source of electrical power, and/or cost of electrical power usage by the one or more electrical devices. Operation 3340 may further include scheduling electrical charge and/or discharge functions and energy storage functions of the electrical device(s) based on the status of the source of electrical power, the electrical usage of the one or more electrical devices, and/or operational rules established using the control parameters.

The electrical power usage model optionally may be transferred to a newly connected electrical device for initial processing (3350). Status data of the source of electrical power and electrical usage data of the one or more electrical devices also may be communicated to other monitoring devices, to a local server, and/or to a cloud server (3360) for further processing. Also, reinforcement learning and/or online machine learning may be used to update operational rules established using the control parameters over time based on changes in the status data of the source of electrical power and electrical usage data of the one or more electrical devices over time (3370). At 3380, an electrical grid operator may be notified of an anomaly in the electrical grid upon detection of a grid anomaly in status data of the source of electrical power.

System Configuration

Techniques described herein may be used with one or more of the computer systems described herein and/or with one or more other systems. For example, the various procedures described herein may be implemented with hardware or software, or a combination of both. For example, the processor, memory, storage, output device(s), input device (s), and/or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 34:
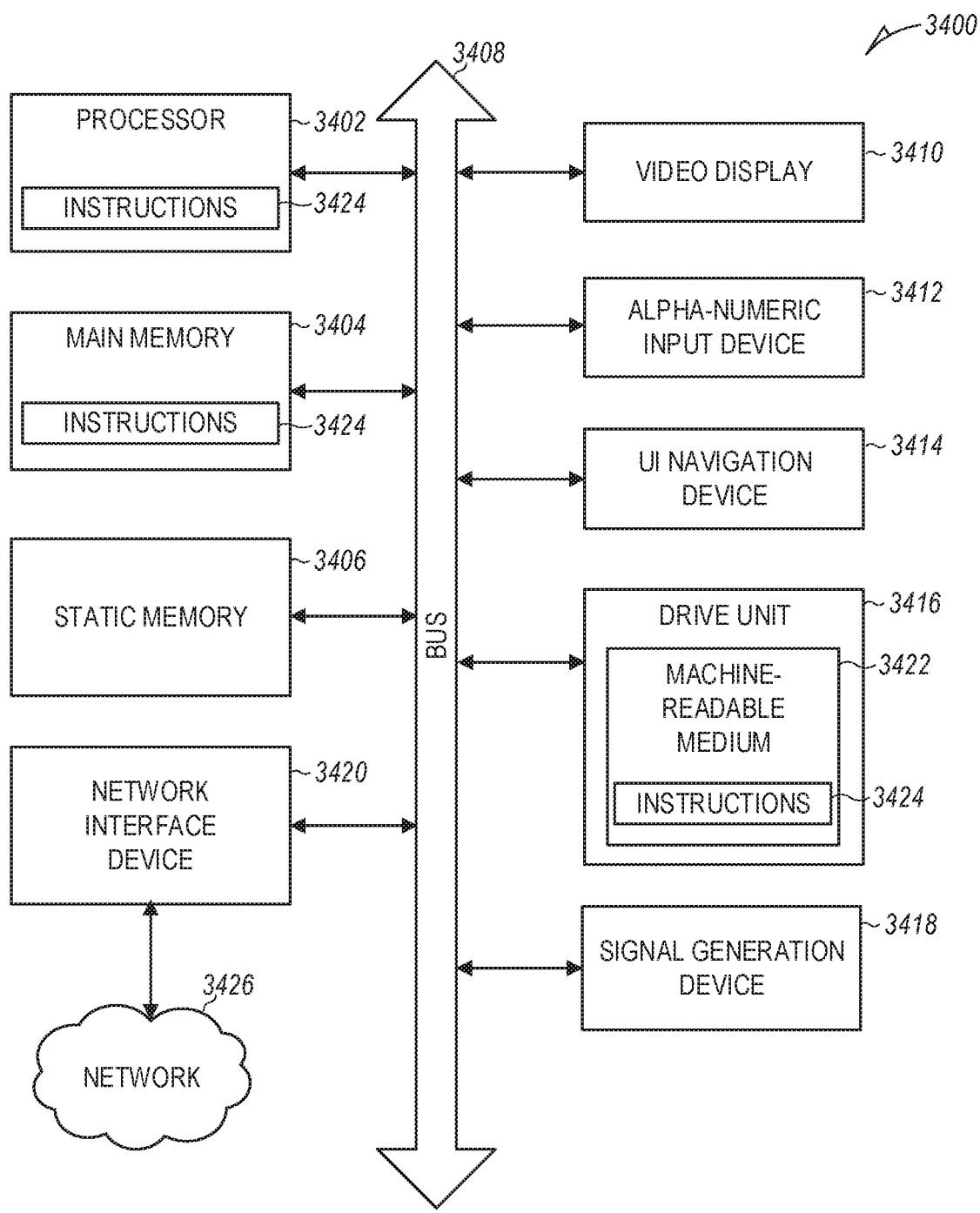
FIG. 34 illustrates a block diagram of an example of a machine upon which one or more embodiments may be implemented.

FIG. 34 illustrates a block diagram of an example of a machine 3400 upon which one or more embodiments of the main regulation control module 860 may be implemented. In alternative embodiments, the machine 3400 may operate as a standalone device or may be connected (e.g., networked) to other machines. In a networked deployment, the machine 3400 may operate in the capacity of a server machine, a client machine, or both in server-client network environments. In an example, the machine 3400 may act as a peer machine in peer-to-peer (P2P) (or other distributed) network environment. In sample embodiments, the machine 3400 may be used in embodiments of the ML controller and/or the aggregated ML controller and may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 3400 may serve as a workstation, a front-end server, or a back-end server of a communication system. Machine 3400 may implement the methods described herein (e.g., FIGS. 5, 6, 9 and 33) by running software that includes instructions that, when processed, implement the methods described herein. Further, while only a single machine 3400 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 3400 may include a hardware processor 3402 (e.g., a central processing unit (CPU), a graphics processing unit (GPU), a hardware processor core, or any combination thereof), a main memory 3404 and a static memory 3406, some or all of which may communicate with each other via an interlink (e.g., bus) 3408. The machine 3400 may further include a display unit 3410 (shown as a video display), an alphanumeric input device 3412 (e.g., a keyboard), and a user interface (UI) navigation device 3414 (e.g., a mouse or pen). In an example, the display unit 3410, input device 3412 and UI navigation device 3414 may be a touch screen display. The machine 3400 may additionally include a mass storage device (e.g., drive unit) 3416, a signal generation device 3418 (e.g., a speaker), and a network interface device 3420. The machine 3400 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 3416 may include a machine readable medium 3422 on which is stored one or more sets of data structures or instructions 3424 (e.g., software) embodying or utilized by any one or more of the techniques or functions described herein. The instructions 3424 may also reside, completely or at least partially, within the main memory 3404, within static memory 3406, or within the hardware processor 3402 during execution thereof by the machine 3400. In an example, one or any combination of the hardware processor 3402, the main memory 3404, the static memory 3406, or the drive unit 3416 may constitute machine readable media.

While the machine readable medium 3422 is illustrated as a single medium, the term "machine readable medium" may include a single medium or multiple media (e.g., a centralized or distributed database, and/or associated caches and servers) configured to store the one or more instructions 3424. The term "machine readable medium" may include any medium that is capable of storing, encoding, or carrying instructions for execution by the machine 3400 and that cause the machine 3400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 3424 may further be transmitted or received over communications network 3426 using a transmission medium via the network interface device 3420. The machine 3400 may communicate with one or more other machines utilizing any one of several transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, x10, Zig-Bee, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 3420 may include one or more physical jacks (e.g., Ethernet, coaxial, or phone jacks) or one or more antennas to connect to the communications network 3426. In an example, the network interface device 3420 may include a plurality of antennas to wirelessly communicate using single-input multiple-output (SIMO), multiple-input multiple-output (MIMO), or multiple-input single-output (MISO) techniques. In some examples, the network interface device 3420 may wirelessly communicate using Multiple User MIMO techniques.

Examples

Certain embodiments are described herein as numbered examples 1, 2, 3, etc. These numbered examples are provided as examples only and do not limit the subject technology.

Example 1 is a computer-implemented method of managing operation of electrical devices, comprising: monitoring status of at least one source of electrical power to one or more electrical devices; monitoring electrical usage at each of the one or more electrical devices that receive electricity from the at least one source of electrical power; receiving control parameters for optimization of operation of each of the one or more electrical devices; and managing electrical power usage by each of the one or more electrical devices using a machine learning model that forecasts status of the at least one source of electrical power and generates operational rules for each of the one or more electrical devices from historical values of the control parameters, the status of the at least one source of electrical power, and the electrical usage of each of the one or more electrical devices.

Example 2 is a method as in Example 1, wherein managing electrical power usage comprises generating instructions based on a predictive machine learning model for managing the at least one source of electrical power and the electrical devices, the predictive machine learning model forecasting status of the at least one source of electrical power, predicting demands by the one or more electrical devices for the electrical power, and predicting availability of the electrical power at the times the electrical power is demanded by the one or more electrical devices.

Example 3 is a method as in any preceding Example, wherein the predictive machine learning model comprises a long short-term memory machine learning based prediction model that forecasts demand on the at least one source of electrical power by the one or more electrical devices from historical data.

Example 4 is a method as in any preceding Example, further comprising transferring learned rules from the predictive machine learning model to a newly connected electrical device.

Example 5 is a method as in any preceding Example, further comprising communicating at least one of status data of the at least one source of electrical power and electrical usage data of one electrical device to at least one of another electrical device and a cloud server.

Example 6 is a method as in any preceding Example, wherein monitoring electrical usage comprises passively monitoring a status of at least one of a neighboring electrical device, a household electrical circuit, a neighborhood, a substation, and a power grid.

Example 7 is a method as in any preceding Example, further comprising scheduling at least one of electrical charge and discharge functions and energy storage functions of the one or more electrical devices based on at least one of the status of the at least one source of electrical power, the electrical usage of the one or more electrical devices, and the operational rules.

Example 8 is a method as in any preceding Example, further comprising using at least one of reinforcement learning, online machine learning, and transfer learning methods to update operational rules established using the control parameters over time based on changes in the status data of the at least one source of electrical power and electrical usage data of the one or more electrical devices over time.

Example 9 is a method as in any preceding Example, further comprising notifying an electrical grid operator of detection of an anomaly in the electrical grid upon detection of at least one of a faulty transmission line, a faulty transformer, and a faulty substation or an anomaly in status data of the at least one source of electrical power.

Example 10 is a method as in any preceding Example, wherein managing the electrical power usage includes selecting the control parameters to optimize at least one of renewable energy utilization, power grid stabilization, smoothing out of transient irregularities in the at least one source of electrical power, cost of electrical power usage by the one or more electrical devices, and a user-specified optimization goal.

Example 11 is a control module for managing operation of one or more associated electrical devices, comprising: a first input that receives status data including control parameters relating to performance of the one or more associated electrical devices in relation to user-defined rules; a second input that receives optimization settings and the user-defined rules for optimizing at least one of power generation, power usage, and power storage of the one or more associated electrical devices based on user-defined priorities; and a processor that executes instructions to manage at least one of power generation, power usage, and power storage by the one or more associated electrical devices using a machine learning model that generates operational rules for the one or more electrical devices from historical values of the control parameters and the optimization settings to optimize at least one of power generation, power usage, and power storage by the one or more associated electrical devices according to the user-defined rules.

Example 12 is a control module as in Example 11, wherein the processor executes the instructions based on a predictive machine learning model that forecasts status of at least one source of electrical power, predicts demands by the one or more associated electrical devices for the electrical power, and predicts availability of the electrical power at the times the electrical power is demanded by the one or more associated electrical devices.

Example 13 is a control module as in Examples 11-12, wherein the predictive machine learning model comprises a long short-term memory machine learning based prediction model that forecasts demand on the at least one source of electrical power by the one or more associated electrical devices from historical data.

Example 14 is a control module as in Examples 11-13, wherein the processor further executes the instructions to transfer learned rules from the predictive machine learning model to a newly connected electrical device.

Example 15 is a control module as in Examples 11-14, wherein the processor further executes the instructions to communicate status data of the at least one source of electrical power and the one or more associated electrical devices to at least one of another control module and a cloud server.

Example 16 is a control module as in Examples 11-15, wherein the processor monitors power usage by passively monitoring a status of at least one of a neighboring electrical device, a household electrical circuit, a neighborhood, a substation, and a power grid.

Example 17 is a control module as in Examples 11-16, wherein the processor further executes the instructions to schedule at least one of electrical charge and discharge functions and energy storage functions of the one or more associated electrical devices based on at least one of the status of the at least one source of electrical power, the electrical usage of the one or more associated electrical devices, and operational rules.

Example 18 is a control module as in Examples 11-17, wherein the processor further executes the instructions to use at least one of reinforcement learning, online machine learning, and transfer learning methods to update operational rules established using the control parameters over time based on changes in the status data of the at least one source of electrical power and electrical usage data of the one or more associated electrical devices over time.

Example 19 is a control module as in Examples 11-18, wherein the processor further executes the instructions to notify an electrical grid operator of detection of an anomaly in the electrical grid upon detection of at least one of a faulty transmission line, a faulty transformer, and a faulty substation or an anomaly in status data of the at least one source of electrical power.

Example 20 is a control module as in Examples 11-19, wherein the processor further executes the instructions to select the control parameters to optimize at least one of renewable energy utilization, power grid stabilization, smoothing out of transient irregularities in the at least one source of electrical power, cost of electrical power usage by the one or more associated electrical devices, and a user-specified optimization goal.

Alternative implementations of the system as described herein are contemplated. For example, the system as described herein may be implemented in other configurations besides a datacenter, such as households, public buildings, hospitals, dedicated battery storage facilities, renewable energy facilities, and the like. Thus, the system as described herein is not to be limited to the systems described in specific examples. These and other implementations are included within the context of the disclosed embodiments as set forth in the following claims.

In the above Detailed Description, various features may be grouped together to streamline the disclosure. However, the claims may not set forth every feature disclosed herein as embodiments may feature a subset of the features. Further, embodiments may include fewer features than those disclosed in a particular example. Also, although the subject matter has been described in language specific to structural features and/or methodological acts, it is to be understood that the subject matter defined in the appended claims is not necessarily limited to the specific embodiments, features, or acts described above. Rather, the specific embodiments, features, and acts described above are disclosed as example forms of implementing the claims. Thus, the following claims are hereby incorporated into the Detailed Description, with a claim standing on its own as a separate embodiment.

What is claimed is:

1. A computer implemented method of managing operation of electrical devices, comprising:
   monitoring status of at least one source of electrical power to one or more electrical devices;
   monitoring electrical usage at each of the one or more electrical devices that receive electricity from the at least one source of electrical power;
   receiving control parameters for optimization of operation of each of the one or more electrical devices; and
   managing electrical power usage by each of the one or more electrical devices using a machine learning model that forecasts status of the at least one source of electrical power and generates operational rules for each of the one or more electrical devices from historical values of the control parameters, the status of the at least one source of electrical power, and the electrical usage of each of the one or more electrical devices.

2. The method of claim 1, wherein managing electrical power usage comprises generating instructions based on a predictive machine learning model for managing the at least one source of electrical power and the electrical devices, the predictive machine learning model forecasting status of the at least one source of electrical power; predicting demands by the one or more electrical devices for the electrical power, and predicting availability of the electrical power at the times the electrical power is demanded by the one or more electrical devices.

3. The method of claim 2, wherein the predictive machine learning model comprises a long short-term memory machine learning based prediction model that forecasts demand on the at least one source of electrical power by the one or more electrical devices from historical data.

4. The method of claim 2, further comprising transferring learned rules from the predictive machine learning model to a newly connected electrical device.

5. The method of claim 1, further comprising communicating at least one of status data of the at least one source of electrical power and electrical usage data of one electrical device to at least one of another electrical device and a cloud server.

6. The method of claim 1, therein monitoring electrical usage comprises passively monitoring a status of at least one of a neighboring electrical device, a household electrical circuit, a neighborhood, a substation, and a power grid.

7. The method of claim 1, further comprising scheduling at least one of electrical charge and discharge functions and energy storage functions of the one or more electrical devices based on at least one of the status of the at least one source of electrical power, the electrical usage of the one or more electrical devices, and the operational rules.

8. The method of claim 1, further comprising using at least one of reinforcement learning, online machine learning, and transfer learning methods to update operational rules established using the control parameters over time based on changes in the status data of the at least one source of electrical power and electrical usage data of the one or more electrical devices over time.

9. The method of claim 1, further comprising notifying an electrical grid operator of detection of an anomaly in the electrical grid upon detection of at least one of a faulty transmission line, a faulty transformer, and a faulty substation or an anomaly in status data of the at least one source of electrical power.

10. The method of claim 1, wherein managing the electrical power usage includes selecting the control parameters to optimize at least one of renewable energy utilization, power grid stabilization, smoothing out of transient irregularities in the at least one source of electrical power, cost of electrical power usage by the one or more electrical devices, and a user-specified optimization goal.

11. A control module for managing operation of one or more associated electrical devices, comprising:
- a first input that receives status data including control parameters relating to performance of the one or more associated electrical devices in relation to user-defined rules;
- a second input that receives optimization settings and the user-defined rules for optimizing at least one of power generation, power usage, and power storage of the one or more associated electrical devices based on user-defined priorities; and
- a processor that executes instructions to manage at least one of power generation, power usage, and power storage by the one or more associated electrical devices using a machine learning model that generates operational rules for the one or more electrical devices from historical values of the control parameters and the optimization settings to optimize at least one of power generation, power usage, and power storage by the one or more associated electrical devices according to the user-defined rules.

12. The control module of claim 11, wherein the processor executes the instructions based on a predictive machine learning model that forecasts status of at least one source of electrical power, predicts demands by the one or more associated electrical devices for the electrical power, and predicts availability of the electrical power at the times the electrical power is demanded by the one or more associated electrical devices.

13. The control module of claim 12, wherein the predictive machine learning model comprises a long short-term memory machine learning based prediction model that forecasts demand on the at least one source of electrical power by the one or more associated electrical devices from historical data.

14. The control module of claim 12, wherein the processor further executes the instructions to transfer learned rules from the predictive machine learning model to a newly connected electrical device.

15. The control module of claim 12, wherein the processor further executes the instructions to communicate status data of the at least one source of electrical power and the one or more associated electrical devices to at least one of another control module and a cloud server.

16. The control module of claim 12, wherein the processor monitors power usage by passively monitoring a status of at least one of a neighboring electrical device, a household electrical circuit, a neighborhood, a substation, and a power grid.

17. The control module of claim 12, wherein the processor further executes the instructions to schedule at least one of electrical charge and discharge functions and energy storage functions of the one or more associated electrical devices based on at least one of the status of the at least one source of electrical power, the electrical usage of the one or more associated electrical devices, and operational rules.

18. The control module of claim 12, wherein the processor further executes the instructions to use at least one of reinforcement learning, online machine learning, and transfer learning methods to update operational rules established using the control parameters over time based on changes in the status data of the at least one source of electrical power and electrical usage data of the one or more associated electrical devices over time.

19. The control module of claim 12, wherein the processor further executes the instructions to notify an electrical grid operator of detection of an anomaly in the electrical grid upon detection of at least one of a faulty transmission line, a faulty transformer, and a faulty substation or an anomaly in status data of the at least one source of electrical power.

20. The control module of claim 12, wherein the processor further executes the instructions to select the control parameters to optimize at least one of renewable energy utilization, power grid stabilization, smoothing out of transient irregularities in the at least one source of electrical power, cost of electrical power usage by the one or more associated electrical devices, and a user-specified optimization goal.

* * * * *